United States Patent Office 3,299,438
Patented Jan. 17, 1967

3,299,438
SWITCHING SYSTEM COMMON CONTROL
Ivan V. Coleman, Naperville, Lester L. Smith, McHenry, and Willard A. Rust, Park Ridge, Ill., assignors to Automatic Electric Laboratories, Inc., Northlake, Ill., a corporation of Delaware
Filed Oct. 24, 1963, Ser. No. 318,646
8 Claims. (Cl. 179—18)

This invention relates to a link-access selective switching system, being concerned more particularly with a system of the character arranged and adapted for interconnecting a number of data communication lines. A system of this type is disclosed in the copending patent application of F. B. Sikorski and K. K. Spellnes, Serial No. 244,058, filed December 12, 1962, now Patent No. 3,226,488, for a link-access selective switching system arranged for interconnecting a number of data communication lines, having a frequency range capability of up to 15 times the 0–4000 c.p.s. range normally used in telephone systems, individually with each other in any desired pairings as indicated by the digits of the received number.

The problems encountered in telephone systems in providing a high grade of transmission quality while switching through numerous lines, take on greater meaning when applied to a high-frequency switching system wherein the various stations must be checked for frequency compatibility. These difficulties are not encountered in private systems wherein the various stations are fully compatible. This is essentially a new problem to be overcome in a commercial switched network.

Accordingly, it is a primary object of the present invention to provide means for selectively connecting stations in a data transmission communication system with capabilities of handling high speed data to each other.

Another object of this invention is to provide facilities capable of economically analyzing the calling and called stations capabilities.

Another object is to provide a new and improved data switching control system.

The overall network consists of a nationwide microwave system that spans the nation and connects all major cities on a switched basis. Data, in all forms, is conveyed over this network by means ranging from 2 kilocycle low-speed, narrow-band circuits to 48 kilocycle high-speed, wide-band circuits. All of these channels are on a switched, call-up basis. Both digital and analog signals can be accommodated.

The switching center connected to this network is similar in many respects to the cross-bar common control, however, it utilizes a high speed dry reed crosspoint matrix. Two matrices composed of such dry reed switches are used in a switchboard, a line group matrix and a register matrix. Each unit is built up from an array of crosspoints in a manner such as to make possible a non-blocking interconnection for tandem traffic. It is also possible to provide for a reasonable small congestion in connection with originating and terminating traffic to local lines. The degree of congestion or grade of service may be varied. The matrices are construced in stages whereby they may be easily expandable in groups of ten lines.

The register matrix stage provides for connection between incoming trunks or originating lines to either a dial pulse register or a multi-frequency register. The registers are connected to senders and translating equipment for proper handling of the traffic.

The line group matrix has three stages and interconnects calling line or trunk circuits to called circuits. The first or A stage is a reducing stage for lines in that it has in a typical office, 100 input circuits and only 19 outputs. The B stage of the line matrix is capable of switching any one of the 19 A stage outlets to any one of the 19 C stage inputs. The C stage takes 19 inputs and expands them to 100 outlets to line circuits.

Another, slightly different, line matrix unit which handles trunks is also provided. The A stage expands 10 trunk inputs to 19 outlets, with the C stage just reversed, and is therefore non-blocking on tandem calls.

The terminating equipment is similar in some respects to line and trunk circuits previously designed for telephone systems. However, new features have been added to incorporate the extreme frequency and noise limitations. Every transmission terminating circuit has two distinct parts, a control circuit and a transmission path switching circuit. The split control and transmission parts of a circuit are also evident in the connector circuit which provides for the signalling of the called line.

The marker for this system is divided into two segments, an originating marker and a terminating marker. The originating marker controls the operation of the register matrix and the terminating marker controls the operation of the line stage.

The register-sender is associated with every incoming line or trunk call. Both dial pulse and multifrequency receiving types are provided. The register marker determines the appropriate register-sender for the calling line and connects it to the line though the register matrix. The marker supplies the calling line identity and class to the register and then releases. The register returns dial tone to the calling party or a start-send signal to incoming trunks.

The register-sender accepts the dial pulsed or multifrequency sent digits, which it with the aid of an associated translator process for connection to the requested terminal station. The register-sender will, after the terminating marker has extended the call to the indicated terminal within the office, outpulse the required digits and then release itself. On a locally originated call a ticketer will be called in for transfer thereto of the accumulated data pertinent to the call for the billing purposes.

The translator for the broadband switching system must fulfill a set of requirements for a new and hitherto unavailable type of switched communication service. The salient features of this new service are variable bandwidth communication with the bandwidth used to be selected by the subscriber on each call, and a ""repertory dialing"" service, permitting frequently called stations to be dialed by an abbreviated address code.

A ticketer circuit is included in each locally originated connection to accumulate the data for billing.

A connector circuit is included in each locally terminated connection to ring the called party and to supervise the connection.

In the exemplary embodiment set forth herein the crosspoint relays are so-called reed relays wherein the contacts are sealed in glass envelopes with the relay windind wound around all of the envelopes of the contacts comprising the relay. A typical reed type relay is disclosed in the copending application of George S. Lychyk and Arvo Taliste filed July 28, 1961, Serial No. 127,648, now Patent No. 3,128,356, while the matrix arrangements of these relays is disclosed in the copending application of Peter K. Gerlach, George J. David and Rudolph O. Stoehr filed August 21, 1961, Serial No. 132,897, now Patent No. 3,193,731.

According to the invention, all trunk line-switching groups contain the same number of lines, and each link of any trunk line-switching group extends to a separate link-switching group which can effect any desired connections between links thereof, no blocking can occur for the lack of an available idle link path if the number of links for each switching group is one less than twice the number of"

lines in a switching group. For the example herein illustrated, where each trunk line-switching group comprises ten trunks, nineteen switching links per switching group provide completely non-blocking service for the interconnection of the communication channels of the data processing or computing systems.

The invention has been disclosed as embodied in a typical multi-group situation wherein separate communication connections are made on a non-blocking link-access basis from desired trunk lines of one group to trunk lines of another group, and wherein local line connections are made on a partial blocking basis with other local lines.

A feature of the invention is that the translator in providing a terminal number translation supplies a direct and immediate connection to the "pull" lead of the called outlet in the main switching matrix for use by the terminating marker.

Another feature of this invention is the use of a single timer for timing the various operations during the setting up of a connection, and the means for resetting and passing it along from one function to another.

Another feature of this invention is a matrix within the translator operated upon receipt of the call digits to compare the bandwidth capabilities of the calling and called station for compatibility.

Still another feature of this invention is means whereby a call may be completed upon the receipt of only an abbreviated number.

The foregoing and other objects and features of this invention and the manner of attaining them will become more apparent and the invention will best be understood, by reference to the following description of an embodiment of the invention taken in conjunction with the accompanying drawings, comprising FIGS. 1 to 37, wherein.

General

Figure 36:
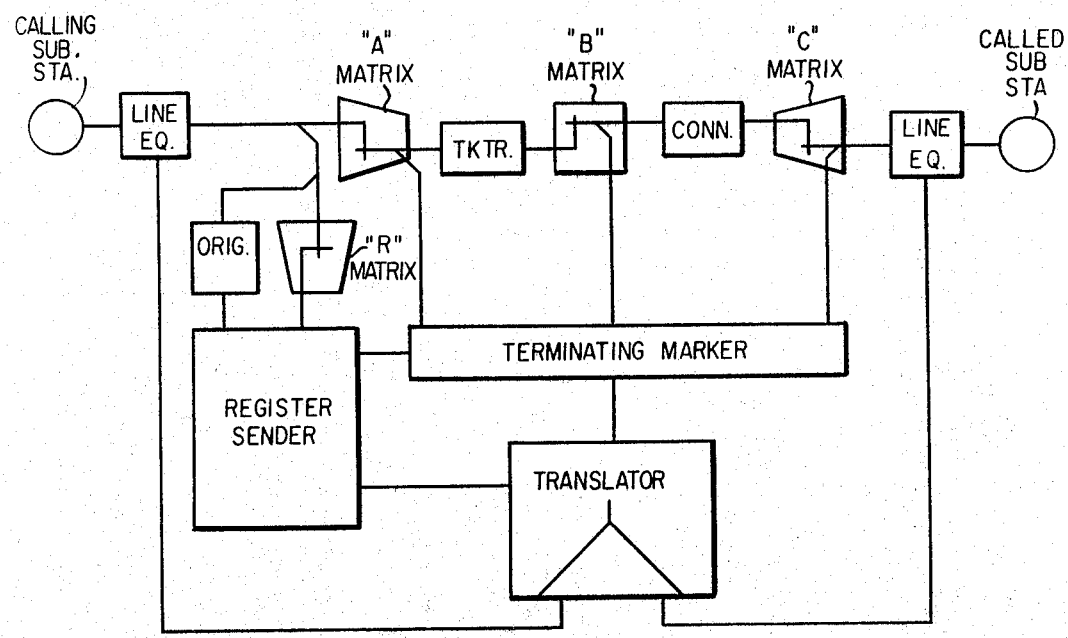
FIG. 36 is a simplified block diagram of the complete exchange showing only the major components.
Figure 37:
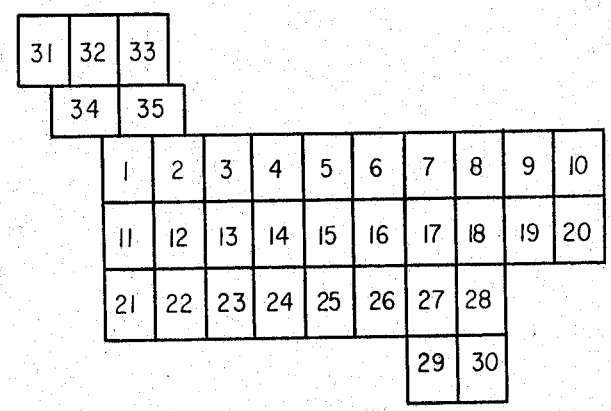
FIG. 37 shows how to combine FIGS. 1 to 35 to form a unitary system.

Referring to FIG. 36 when a calling subscriber lifts the handset at the calling station the control relays in his particular line circuit are seized. These relays call the originating marker in to set up the connection through the register matrix "R." The call passes through reed capsules into a register-sender, at which point dial tone is applied to the line. The routing is received from the common control equipment including the translator, as is also the connection set up through the line matrix consisting of its "A" stages, the "B" stages and the "C" stages with the aid of the terminating marker. The translator in addition to supplying the routing, augments the terminating marker functions by marking the called line terminal. The final connection is through the A stage, past a ticketer for a locally originated call which records the time, and then through the switching B stage reed capsules. A momentary delay at the connectors switching reed capsules, is encountered, while control relays ring the called station. As the called subscriber answers, switch through and a high speed run to the called party's line circuit quickly completes the connection. The brief stop at the connector enables the calling part to talk with the called party.

DESCRIPTION

Figure 31:
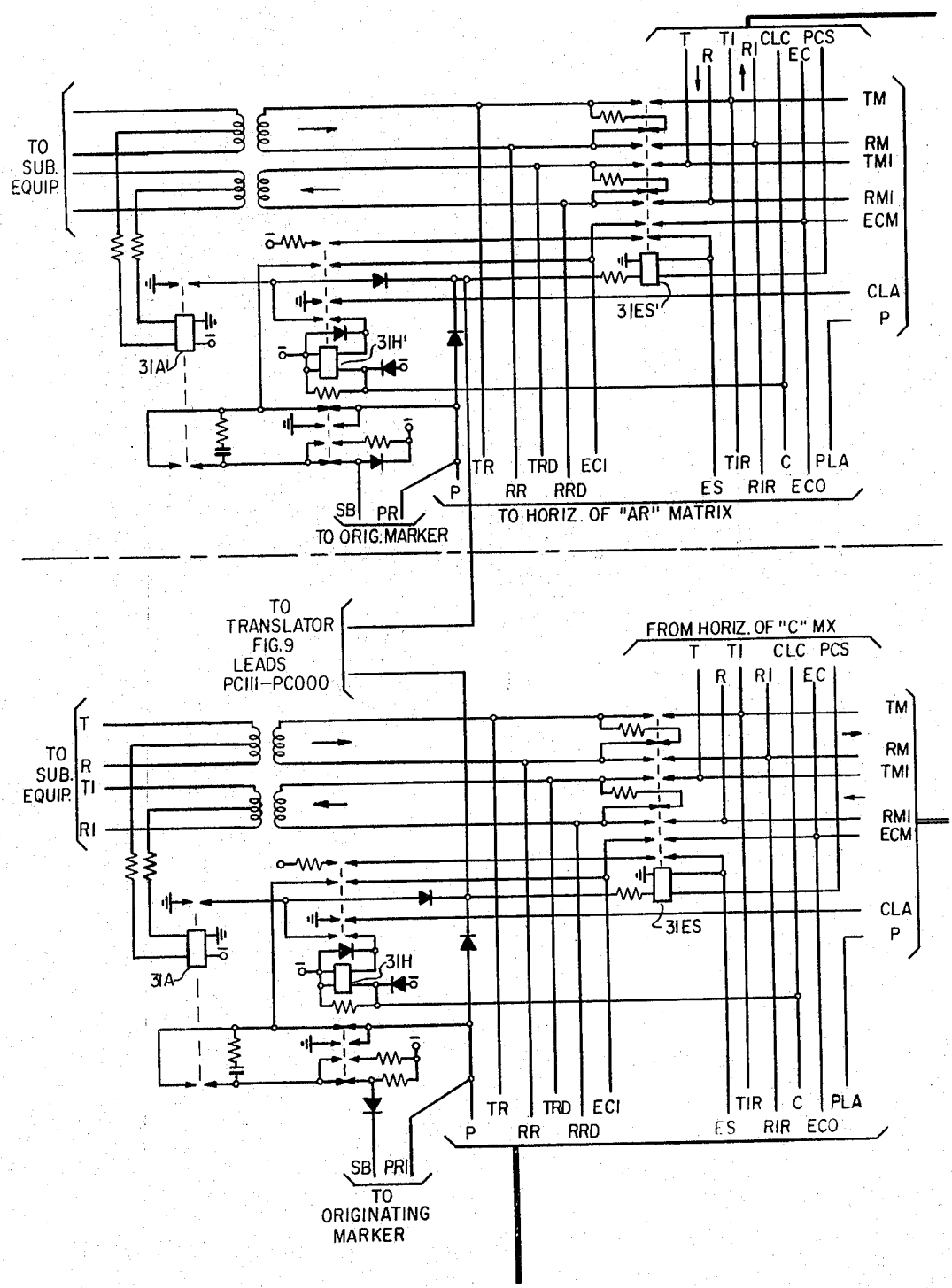
FIGS. 31 to 34 show in detail the line circuit and crosspoint line matrix and register matrix components of the system.

A subscriber lifts his handset and seizes the control relays in his particular line circuit FIG. 31; these relays call the originating marker in to set up the connection through the register matrix 34AR. The call passes through a repeating coil, past line termination resistors, through reed capsules into a register, at which point dial tone is applied to the line. The routing is received from the common control equipment including the translator, as is also the connection set up through the line matrix consisting of its "A" stages FIG. 32, the "B" stages FIG. 32 and the "C" stages FIG. 33 with the aid of the marker shown on FIG. 36. The final connection is through the A stage, past a ticketer 32T1–32T19 for a locally originated call which records the time, and then over switching B stage reed capsules. A momentary delay at the connectors 33C1–33C19 switching reed capsules, is encountered, while control relays ring the called station. As the called party answers, switch through and a high speed run to the called party's line circuit quickly completes the connection. The brief stop at the connector enables the calling party to talk with the called party. Change over to data transmission is under the complete control of the two parties.

In the A stage of the line matrix, since only 19 of the 20 outlets are used, the call could have been routed to an all trunks busy tone via the 20th outlet.

Termination equipment

The basic line circuit used in broadband has the following functions: initiate the start action to the originating marker at start of call; provide direction current simplex line supervision and pulsing, if dial pulsing is used, to a subscriber station over four-wire transmission path; provide termination on idle lines; prevent switch through of calling line to line matrix till path setup is complete; provide single frequency signaling options as required; provide line lockout; and provide off-hook supervision over extra control lead.

This line circuit is universally used by all subscribers having up to 16 kc.p.s. data or voice transmission equipment and is shown in FIG. 31. It is broken into two parts, as for example in the calling line shown in the lower portion of FIG. 31, the calling line components carry the same designations followed by a prime mark, the control relays 31A and 31H and the transmission switch through relay 31ES, to eliminate possible sources of noise. Most of the control leads through the line matrix either originate or terminate in the line circuits; calling party release holding and high to low resistance on-hook to off-hook supervision are sent via control leads, hold lead 31ES and extra control lead EC1 respectively from these circuits.

An interesting subscriber feature is the 48 kc.p.s. line circuit, provided with the highest frequency facility available. A subscriber using this facility has two sets of four-wires coming to his premises; one may be termed the high frequency set and the other the order wire. To originate a call, a subscriber uses the order wire, that is for key or dial pulsing or talking to the called party. After setting up the call and switching to the data mode of operation, the subscriber may transmit high speed data over the high frequency facility and may transmit either low speed data or voice over the order wire.

Since all transmission circuits through the line matrix are only four wires each, some method of mixing the high frequency and order wire signals is necessary. This is accomplished by using a high frequency filter which passes high frequency signals to the data set of four-wires and a low frequency filter which passes low frequency signals to the order wire. Of course the filters block all unwanted signals from either set of wires.

In the trunks both 16 kc.p.s. and the 48 kc.p.s. circuits provide similar features of the line circuits plus the additional two-way guarding features required. The data link and the order wire are again split for interoffice trunking as in the 48 kc. line circuit.

General Matrix System Concept

The broadband matrix is constructed with basic building blocks, combining them, and forming the total system. The basic building block consists of a six make contact dry reed switch. Fifty such devices plug into a printed circuits card, giving a matrix suitable to interconnect any one of 10 input circuits to any one of five output circuits. This matrix card is interwired with other similar cards to provide the switching matrices of the exchange.

MATRIX

The reed capsule which consists of movable springs of magnetic material is enclosed in a hermetically sealed glass capsule. The springs are plated with a precious metal, usually gold alloy, at the area of spring overlap providing the desired electrical contact when the reed capsule is magnetically actuated. The reed capsule improves the life characteristics of a pair of switching contacts by providing a favorable operating environment.

Six of the reed capsules are inserted into a molded bobbin which is the basic frame. The bobbin gives form to the coil windings, supports a diode which is part of the matrix circuitry, and holds printed circuit terminals for plug-in mounting in a printed circuit card. The size of this six-reed capsule unit is approximately seven cubic inches.

Because of gold plated contacts, low contact resistance is achieved, and due to the glass capsule enclosure high open circuit resistance is obtained. The open circuit to the closed circuit resistance ratio is normally in excess of a million million times. Because the coil surrounds the reed contacts, a low noise pickup and cross talk level are realized and also since the reeds are light in weight and have low inertia, very high speed operation results. Typically, operate or connect time is less than three milliseconds and release or disconnect time less than one millisecond.

Fifty such crosspoints are plugged into and soldered to a two-layer printed circuit card approximately 8½ inches by 16 inches. The top layer of printed wiring comprises the vertical matrix connections and the bottom layer closest to the card is for the horizontal interconnections. The two wiring layers are separated by a thin Mylar film, and all layers are bonded to the printed circuit card. Around the periphery of the card, are 300 wire-wrap terminals arranged in groups of ten per circuit. An aluminum frame provides support to the unit.

In the entire switching system, only a single matrix card is used with three variations in the coil windings of the crosspoints.

Figure 32:
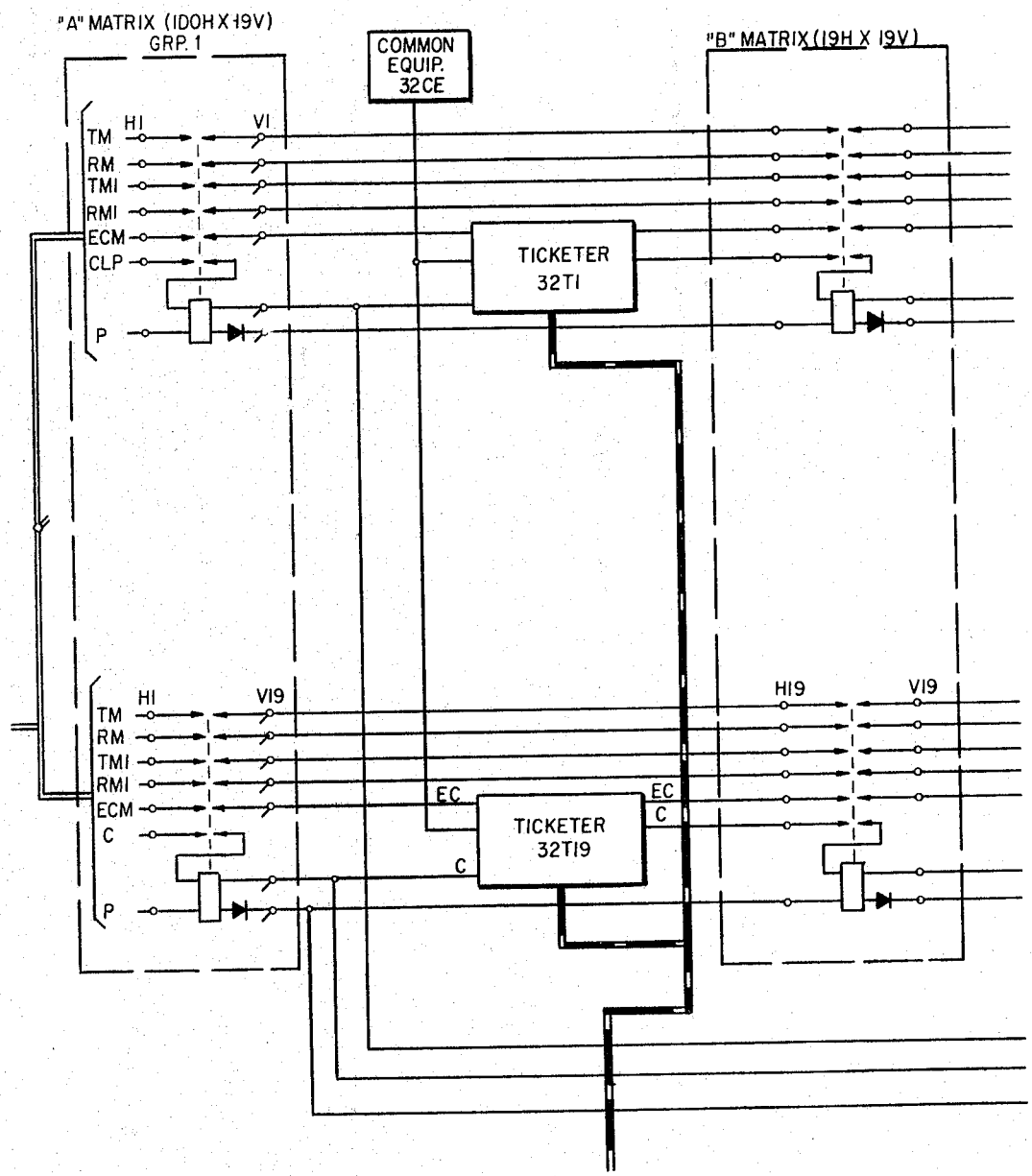

The operation of a crosspoint matrix may be studied in FIGURE 32 of the "A" matrix, by applying a negative potential to the vertical P or pull lead and a ground to a horizontal P lead; a unique crosspoint coil may be energized. As the reed capsule contact is activated, a holding path is established through the operated contact and a second winding of the coil via the "C" lead. Five more leads and contacts per crosspoint are extended through the matrix. These leads handle the four-wire transmit and receive transmission path and an extra control lead. The diodes in series with the pull winding of each coil prevent more than one crosspoint from operating, when the pull potential is applied.

If several FIGURES 32 were side by side, and the vertical input of the second connected to the horizontal output of the first, more than one crosspoint may be operated in series, to provide several stages of switching. Actually, two stages of unique crosspoints may be pulled in series. Thus by using combinations of the basic matrix card, any size matrix stage having $n$ input and $m$ outputs can be constructed. If 50 cards are wired in series horizontally, the result is a single matrix switching stage having one thousand input circuits and five output circuits.

In the broadband system, two matrix switching units are used. The first matrix is a single stage, similar to the previous example, that connects calling line circuits to register-senders. The first stage, or A stage of the register-sender connect matrix, termed AR matrix shown in FIG. 34, may connect as many as 1000 line or trunk circuits to 5 registers. However, due to the large number of information leads which must be connected, two crosspoints are operated in parallel. These crosspoints are held only while a register is in operation or being used, and are operated by the originating marker.

The second or line matrix is composed of two parts having three stages and interconnects calling line or trunk circuits to called circuits as shown in FIGURE 31. The first or A stage is a reducing stage for lines in that it has 100 input circuits and only 19 outputs, the twentieth output path is utilized for sending special tones back to the calling station. Trunking calculations were made assuming 1.5 calls per busy hour, an average holding time of 3.5 minutes per call and a grade of service of 1/1000 for the example shown.

The B stage of the line matrix is capable of switching any one of the 19 A stage outlets to any one of 19 C stage inputs. The C stage takes 19 inputs and expands them to 100 outlets to line circuits.

The second part of the line matrix has two slightly different line matrix units which handle trunks and special services. Both access the same B stage just described but have different size A and C stages. The trunk A stage expands 10 trunk inputs to 19 outlets with the C stage just reversed, and is therefore non-blocking on tandem calls.

To construct the A stage of the line matrix, assuming 100 lines in the total system, all that is necessary is to interwire 10 cards in series horizontally by 4 cards in series vertically using a total of 40 cards. The C stage would be the mirror image of the A stage and would also require 40 cards.

The B stage, however, is more complex to construct. If only one A stage subgroup of 100 lines plus 19 outlets is used, a switching B stage of only one crosspoint per A stage outlet is required, and this is superfluous. Now, if there is more than one A stage subgroup, a switching B stage matrix will take form and will have as many inputs as subgroups. In fact, the B stage will consist of 19 square matrix units, with the size of each square determined by the number of subgroups.

Figure 33:
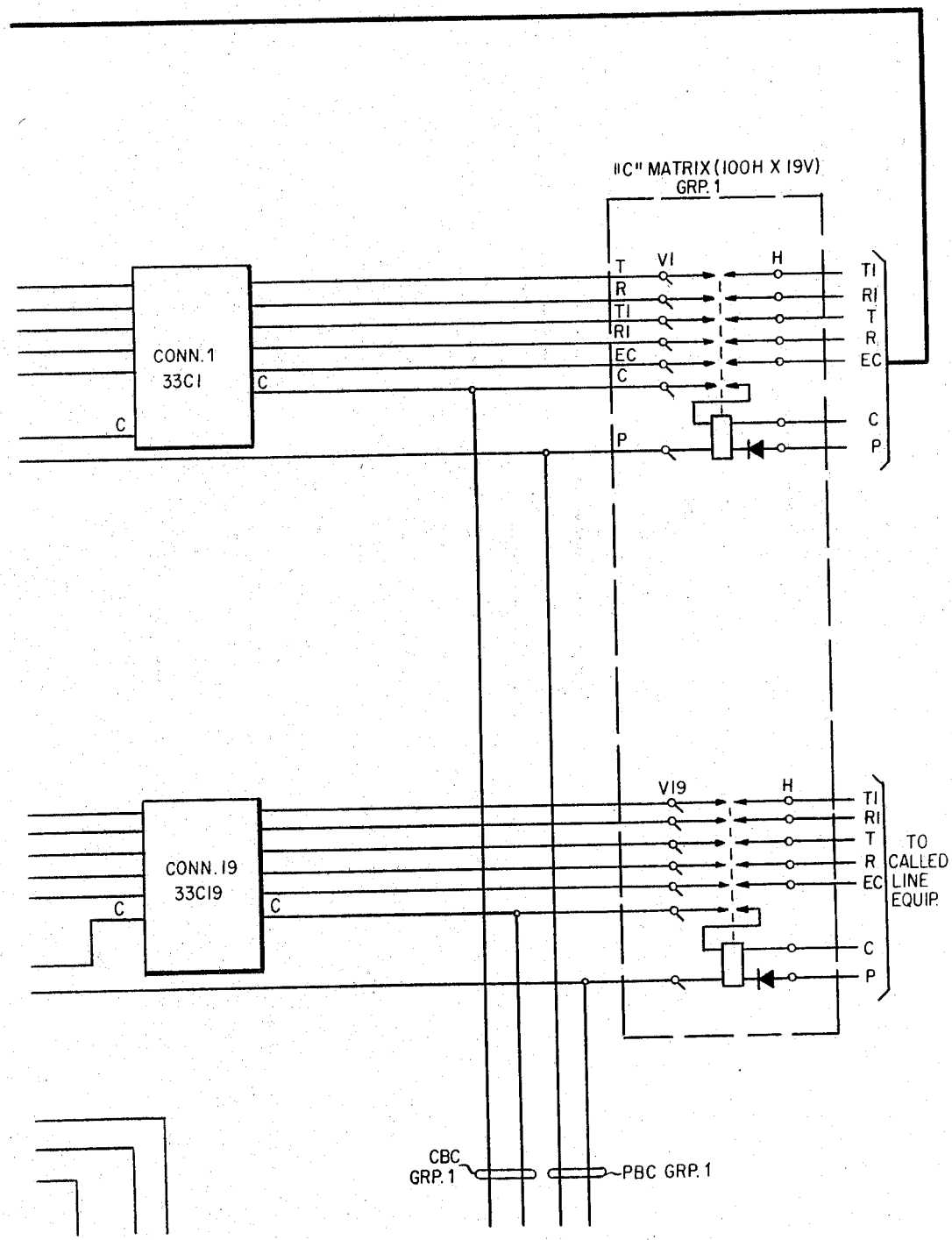

For example: for a 1000 line office, there would be 10 subgroups of 100 lines each to the A stage or 10 subgroups of 19 links from the A to the B stage. The B switching stage would then contain 19 square matrix arrays each with 10 inputs and 10 outputs. This requires a total of 2 cards, connected in series vertically, per array or 38 cards for the B stage. Operating and holding paths for the line matrix are shown in FIGURES 31, 32 and 33.

A typical broadband office might consist of 200 lines, 50 trunks and 15 special service trunks or a total of 8 subgroups. This would require approximately two hundred fifty-four cards for the line matrix, fifty-four cards for the register matrix and a total of 15,400 crosspoints for this hypothetical switching center.

Originating Marker Operation

Figure 34:
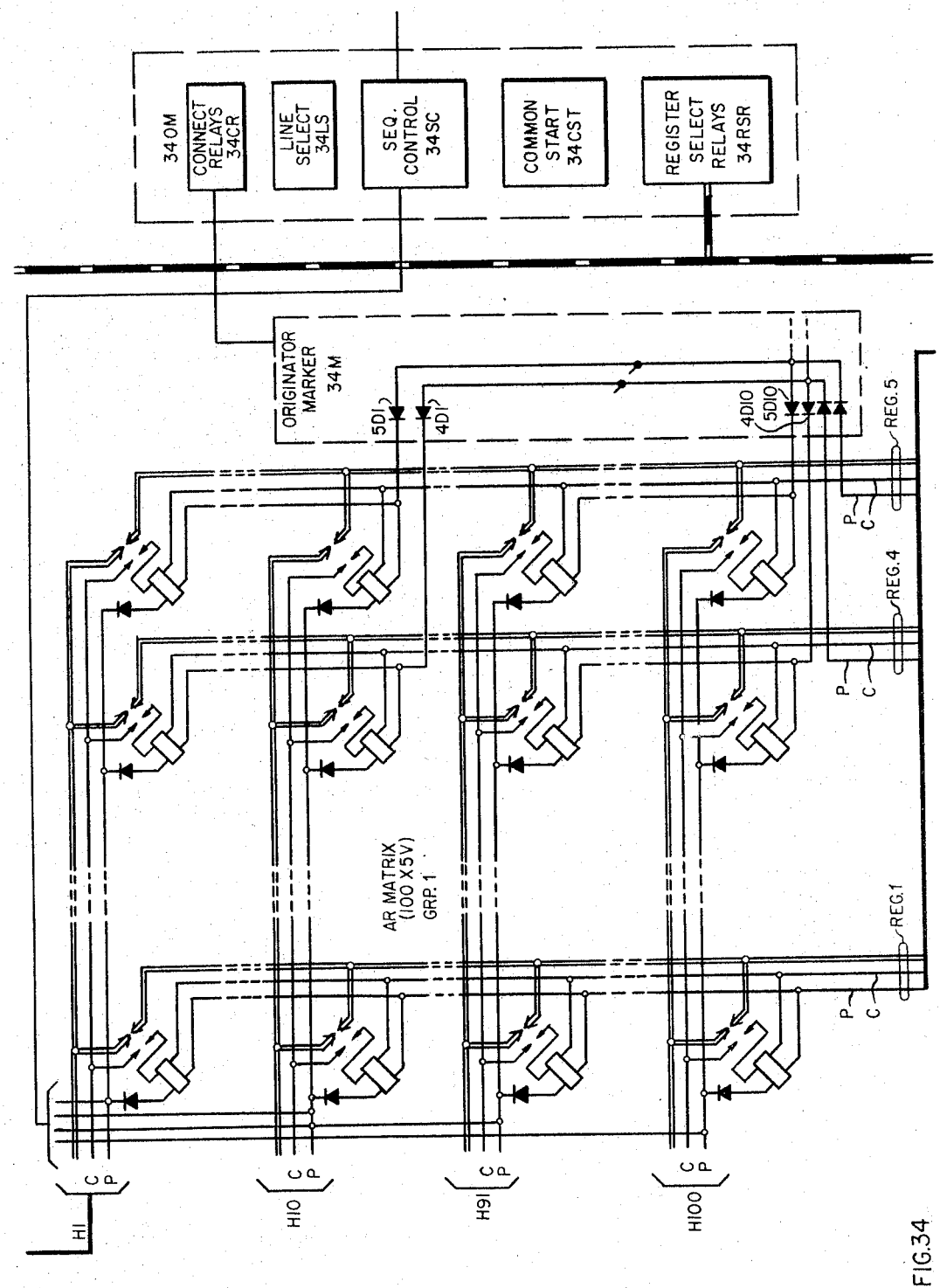

FIGURE 34 illustrates the originating marker 34M in block form. The marker common start circuit 34CST, marker sequence control circuit 34SC, and the line select relays 34LS will serve a maximum of 1000 lines or trunks. The register-select relays 34RSR, the 100-line diode tree inlet identifier, and the connect relays 34CR are provided in accordance with the number of lines, trunks, and registers that are equipped in a particular office.

In order to close a line requesting service through to a register via the register matrix, it is necessary to specifically identify this line so that the pull potential may be applied to the correct correed relays in the matrix. The diode tree 5D1–5D10 is used to close the start signals through to the line-select relays 34LS, which then select the line to be served. As the line requesting service is completely identified by the line-select relays, it is able to provide the line identity for ticketing purposes to the register, which stores it until the information is needed by the ticketer serving the call.

Simultaneous with the line-selection process, the register-select relays 34RSR hunt an idle register. As ultimately, the use of two types of registers will be required (multi-frequency or dial pulse receiving), the register-select relays 34RSR are arranged to hunt for either type of register as directed by the marker-sequence control circuit 34SC.

When line selection is completed and an idle register has been selected, the calling line equipment number and the classification of the originating party as to line or trunk is furnished to the register. When the register acknowledges receipt of this information, the pull potential is supplied to the matrix relays and the calling party is connected to the register.

Figure 35:
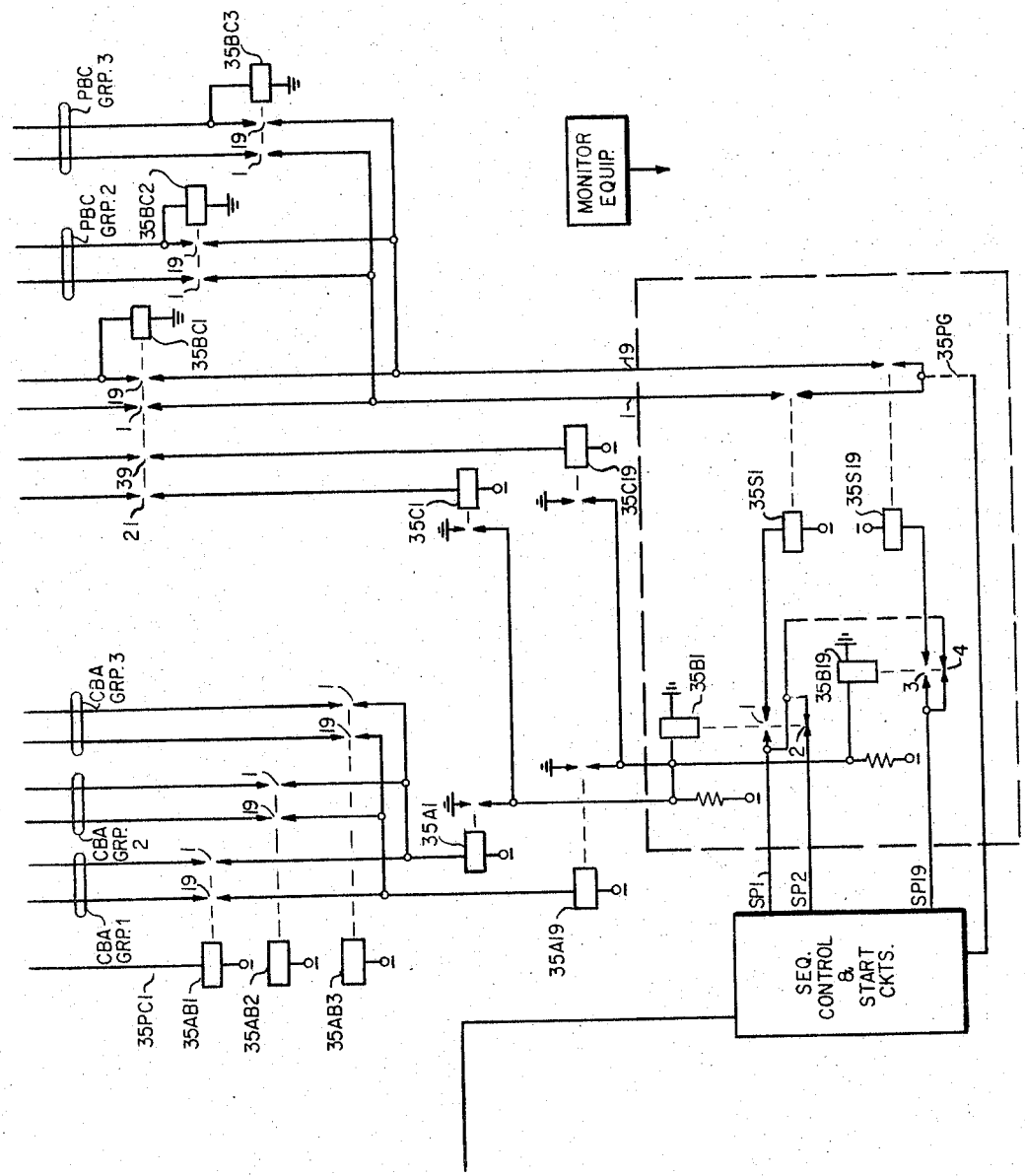
FIG. 35 shows in schematic form the details of the terminating marker.

A sequence circuit 34SC is provided to serve both the originating 34OM and terminating marker of FIG. 35. In the case of the originating marker, the sequence circuit enables the line-identity circuit to provide equal service to each line or trunk in the office. It also provides sequence control to the register-selection circuit in order to distribute traffic evenly among the available registers.

REGISTER-SENDER OPERATION

Line to Line

*Seizure* (Operated: Relay 6ATC)

The circuit is seized by a ground potential on lead 1DR, from the originating marker, closing a circuit via contacts 18K3, 4TS4, 3BB6, and 4BA5 to the winding of relay 3ST. Relay 3ST operates, locks to lead 1DR, grounds lead 1ST at contacts 3ST1 to the monitor circuit and to relay 1MC and at contacts 3ST6 completes a circuit from ground at contacts 4TS1 to relays 4BA and 4AA. Relay 4BA operates, closes a circuit to relay 7BS at contacts 4BA2, closes ground from contacts 4BA4 via the first winding of relay 3BB to lead 3ECH, and closes battery via resistor 4R10 and coil of relay 4CH to lead 3C2. Relay 7BS operates, lights lamp 7SUPY from ground of contacts 7BS1, and closes lead 1CH1 to 1CH0 at contacts 7BS2 for a possible all-registers-busy condition. Relay 1MC operates, closes the circuits to the calling equipment number relays 1EH0–1EH7, 2ET0–2ET7, and 2EU0–2EU7 according to the two out of five code presented by the originating marker via the corresponding leads, also closing the circuits to relays 3LC, 3MF (MF addressing only) or 3DP(4) (DP addressing only), and closes lead 1PLG to lead 1P to pull the "AR" matrix. The equipment number relays operate and lock. Relay 4AA operates.

Relay 3LC operates, locks, and closes the circuit at contacts 3LC3 to the motor magnet of rotary switch 5SS via its interrupter spring contacts 5SS1, contacts 3BB2, lead 5SS1, and rotary switch wipers of level A lead 5SSA and contacts 4BA1. Rotary switch 5SS steps its wipers to bank position 2. Relay 3MF or 3DP operates, locks, and closes a circuit to relay 1RN. Relay 1RN operates and grounds lead 1LRN at contacts 1RN1 to indicate the calling equipment number has been recorded. The "pull complete" signal for the "AR" matrix is ground returned on lead 3C2 closing a circuit to relay 4CH. Relay 4CH operates and closes ground via resistance 4R8 to lead 3C1. Resistance battery via lead 3ECH closes a circuit to the first winding of relay 3BB. Relay 3BB operates its "X" contacts 3BB5, locks, operates fully, and grounds lead 1HLH as a "hold lead held" signal to the originating marker.

Ground is removed from lead 1DR opening the circuit of relay 3ST. Relay 3ST restores, grounds lead MR to mark the circuit busy, closes the holding circuit of relay 4AA to resistance battery on lead 3ECH, opens the circuit to the first winding of relay 3BB, opens the circuit of relay 1MC, removes ground from lead 1ST, removes the short circuit from relay 3DT, closes the circuit to relay 15MG if this is on MF call only, and closes a circuit to the second winding of relay 6DTC via bank level H of rotary switch 5SS for timing. Relay 1MC restores and releases the originating marker circuit. Relay 3DT operates and closes dial tone to the calling party via lead 3RD. If MF addressing is used, relay 5MG operates and closes the circuit to the M.F. receiver via the "AR" matrix.

Addressing

*M.F. Addressing* (Operated: Relays 1RN, appropriate ones of (1EH0–1EH7, 2ET0–2ET7, 2EU0–2EU7), 3MF, 3LC, 4AA, 3DT, 3BB, 4BA, 4CH, 15MG, 6DTC and 6ATC)

After the calling party receives dial tone the M.F. signals are sent via leads 13TH and 13RH to leads 15IP2 and 15IP1. The two frequencies as sent to the M.F. receiver are converted to ground marks, according to the two out of five code, over leads 15A, 15B, 15C, 15D, 15E and 15F. Inter-digital battery is returned via the lead 15G.

Figure 1:
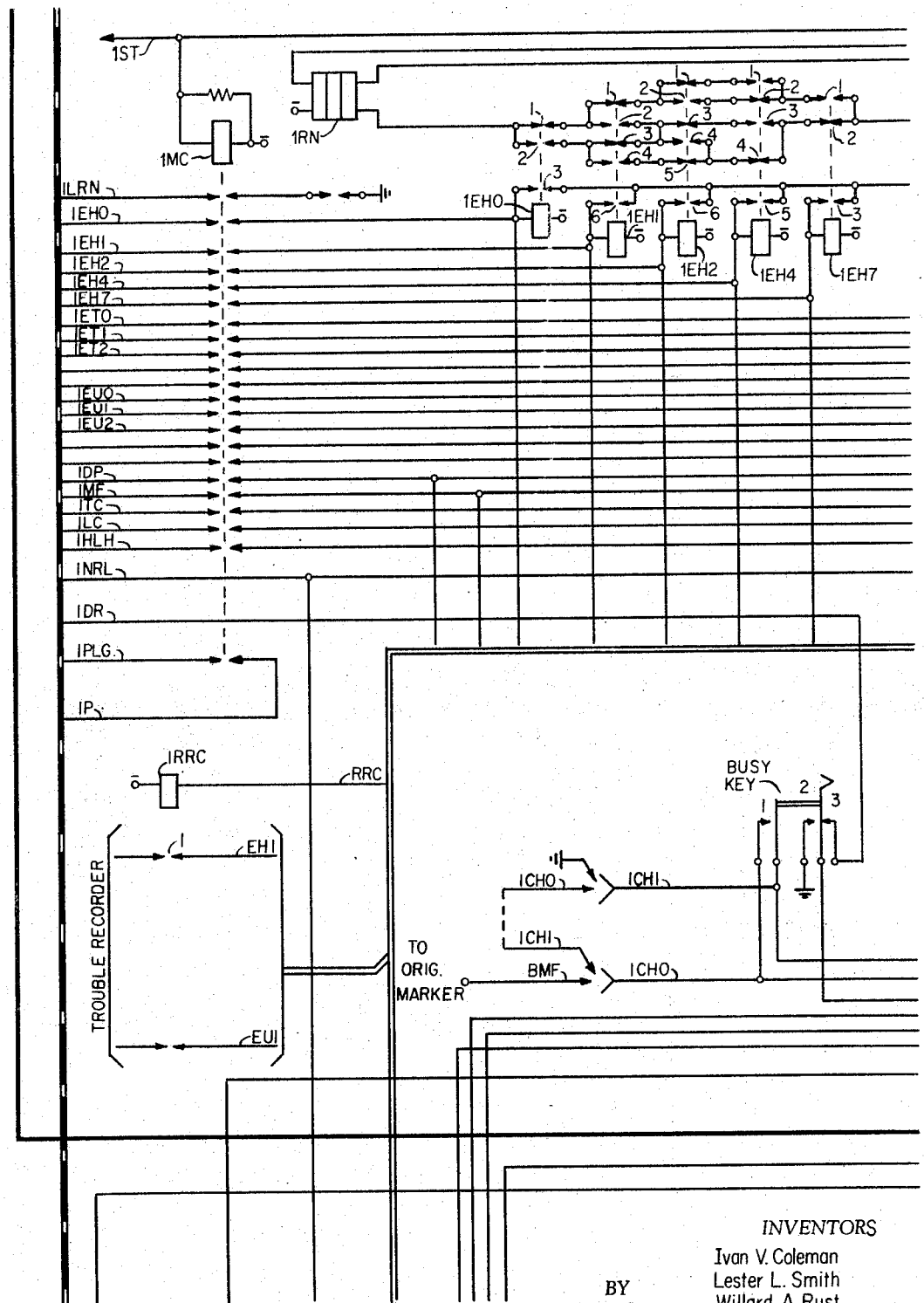
FIGS. 1 to 24 show the details of the register-sender.
Figure 2:
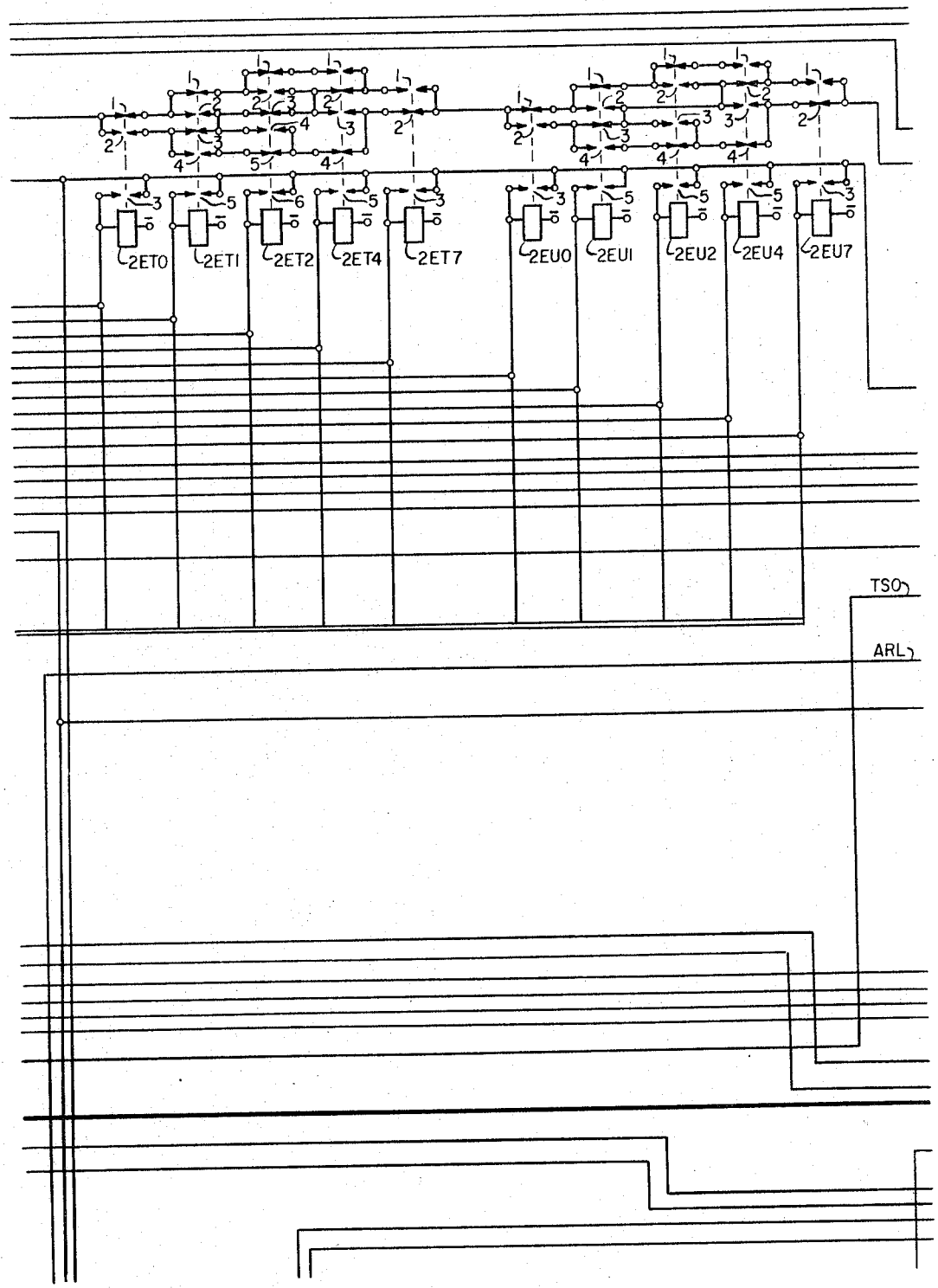
Figure 3:
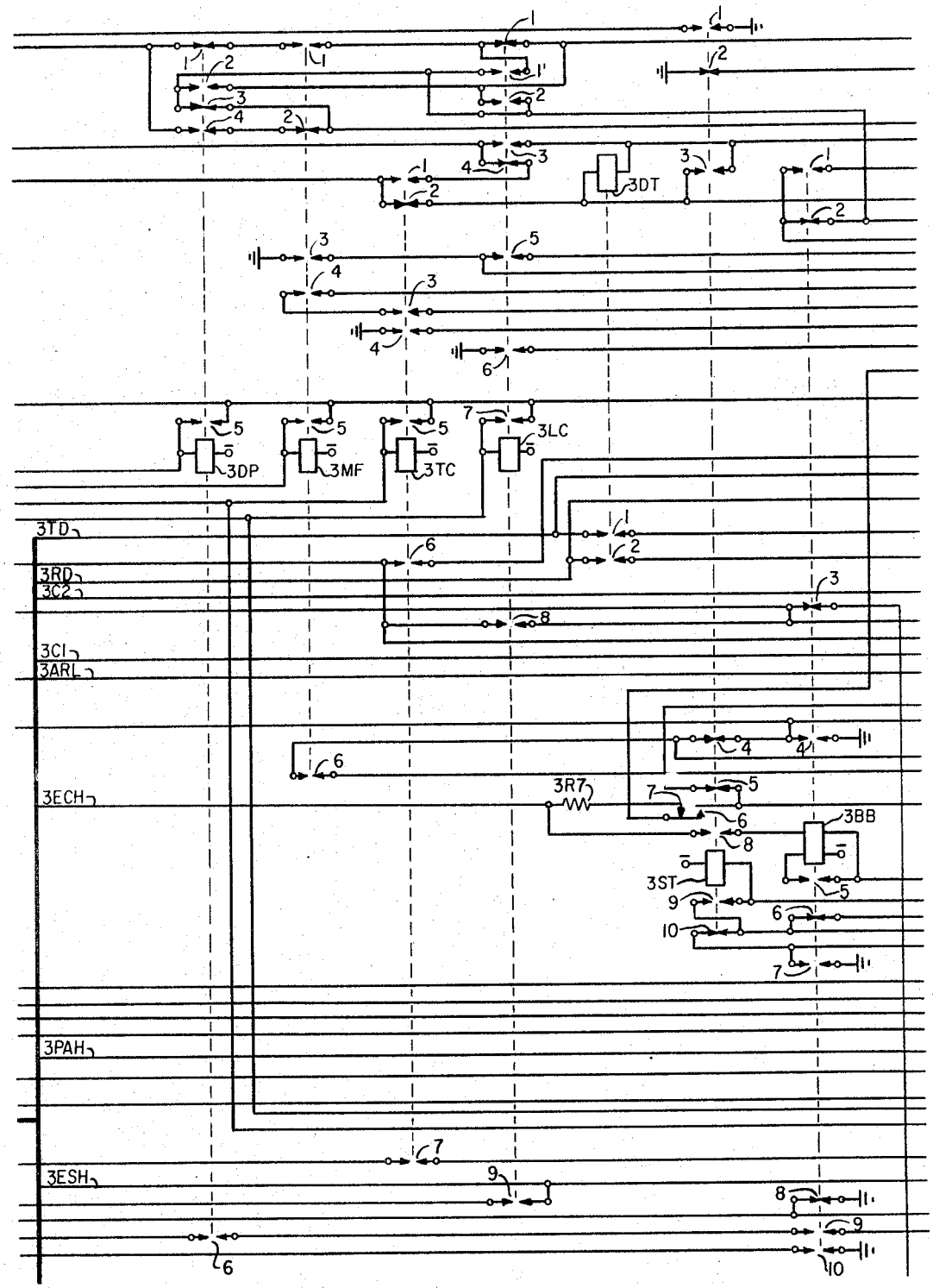
Figure 4:
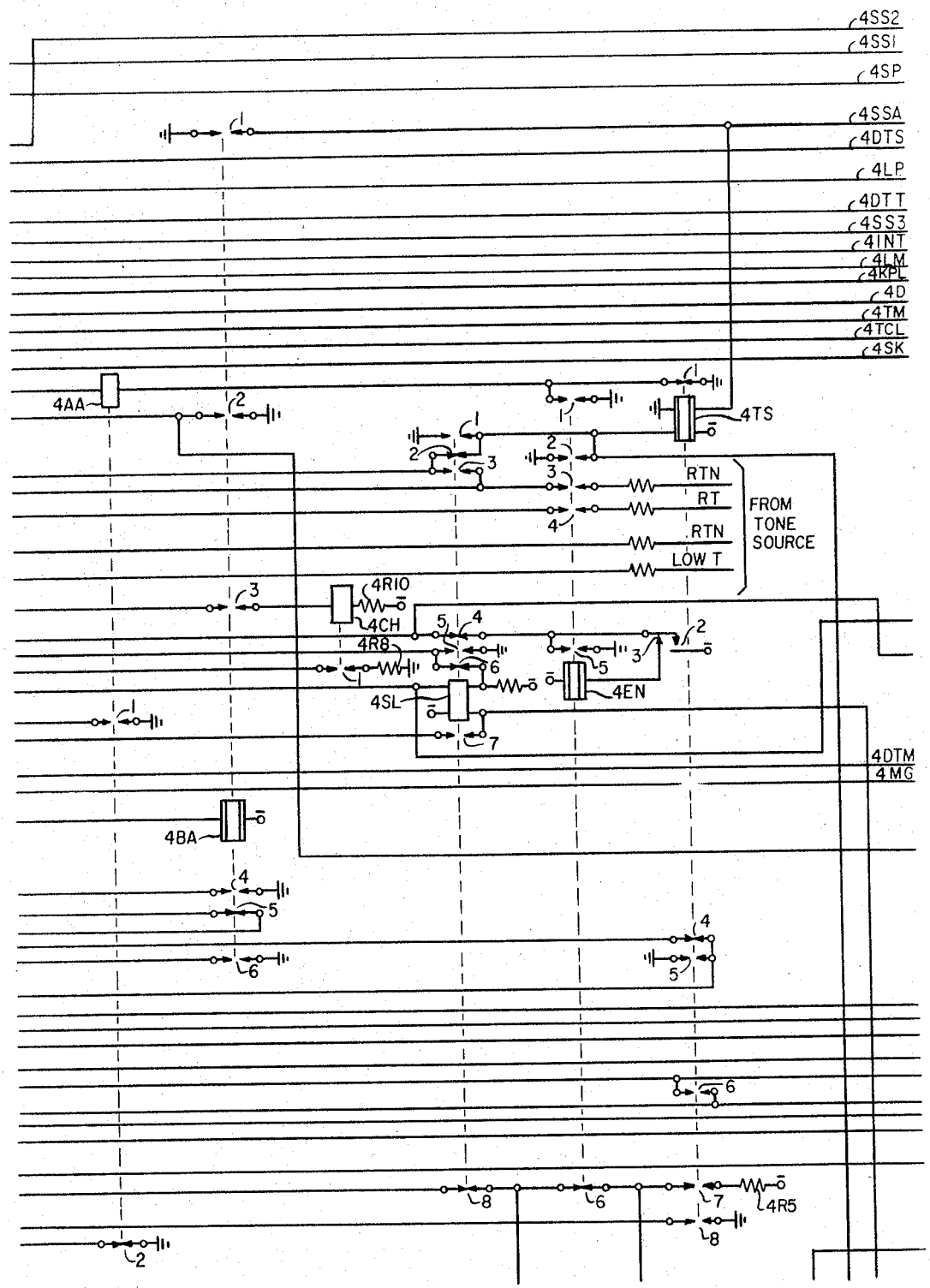
Figure 5:
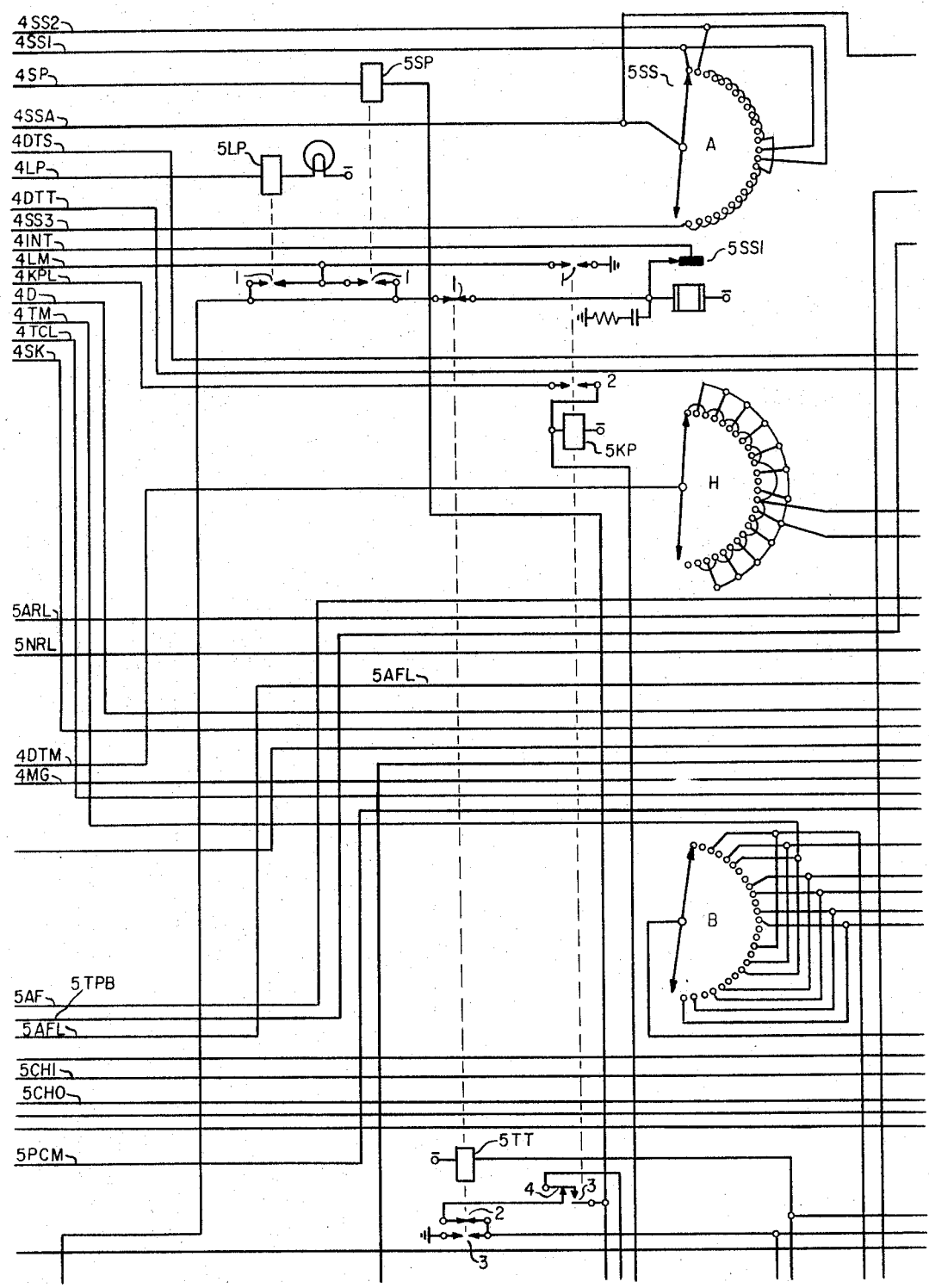
Figure 6:
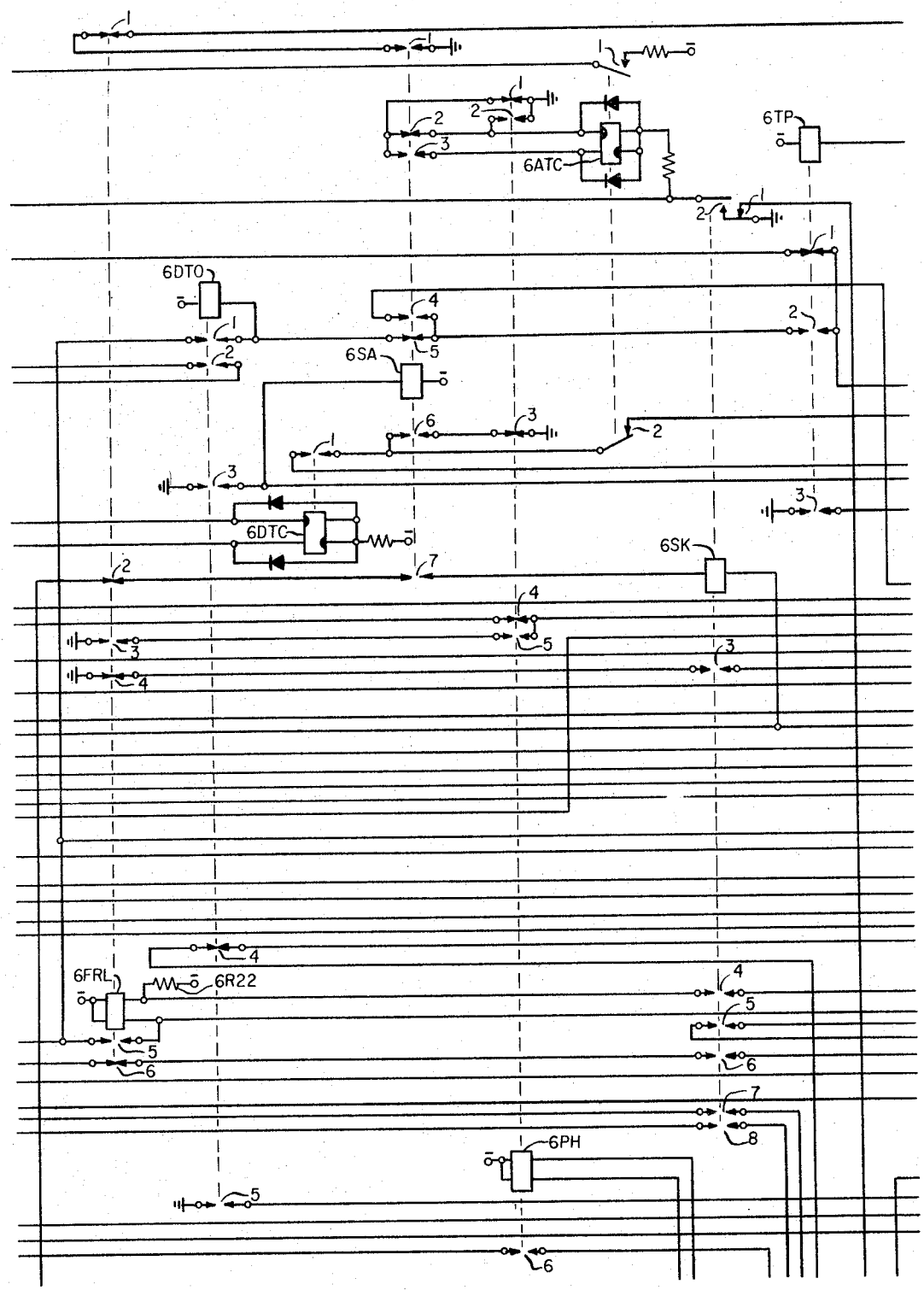
Figure 7:
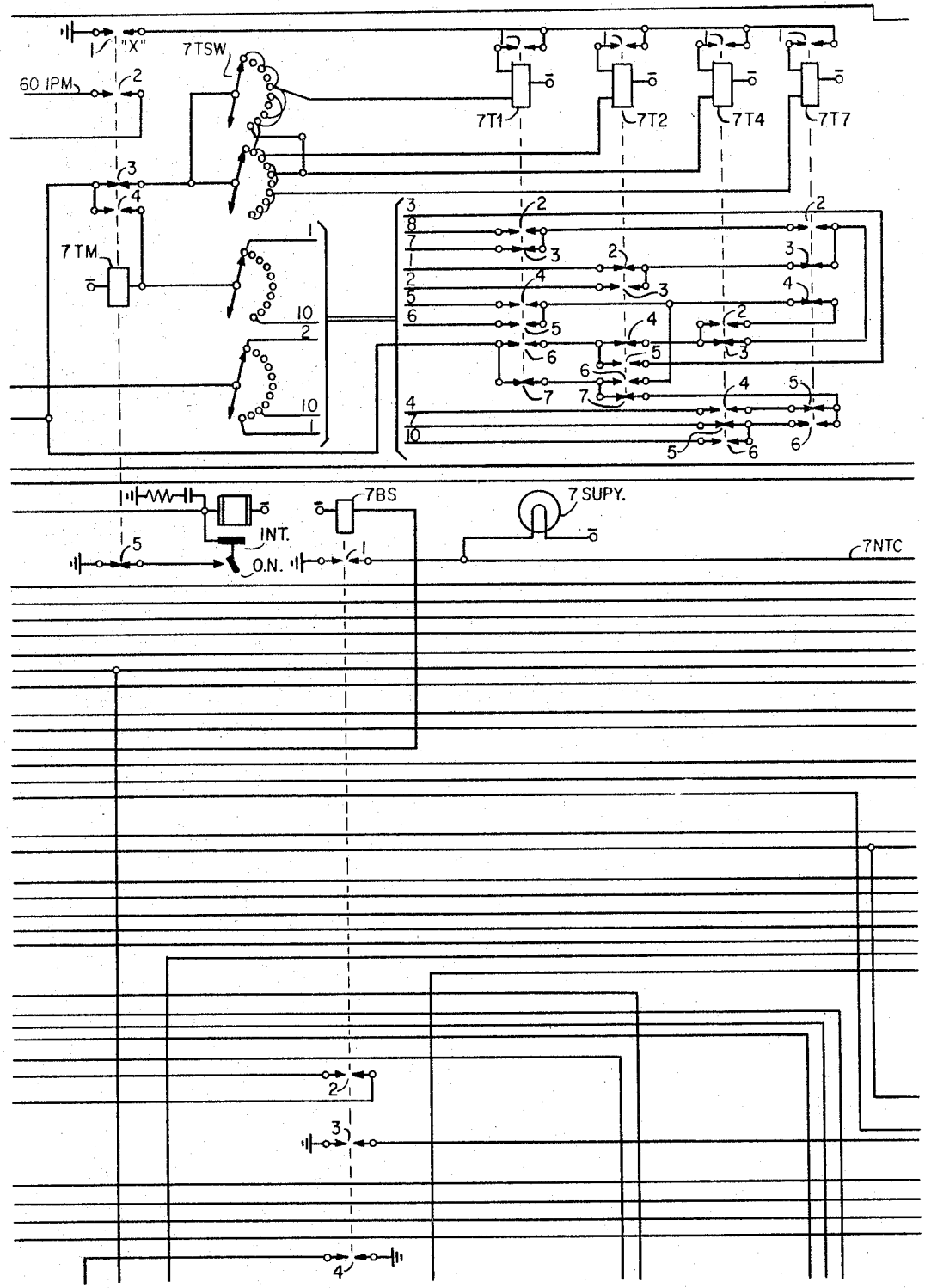
Figure 8:
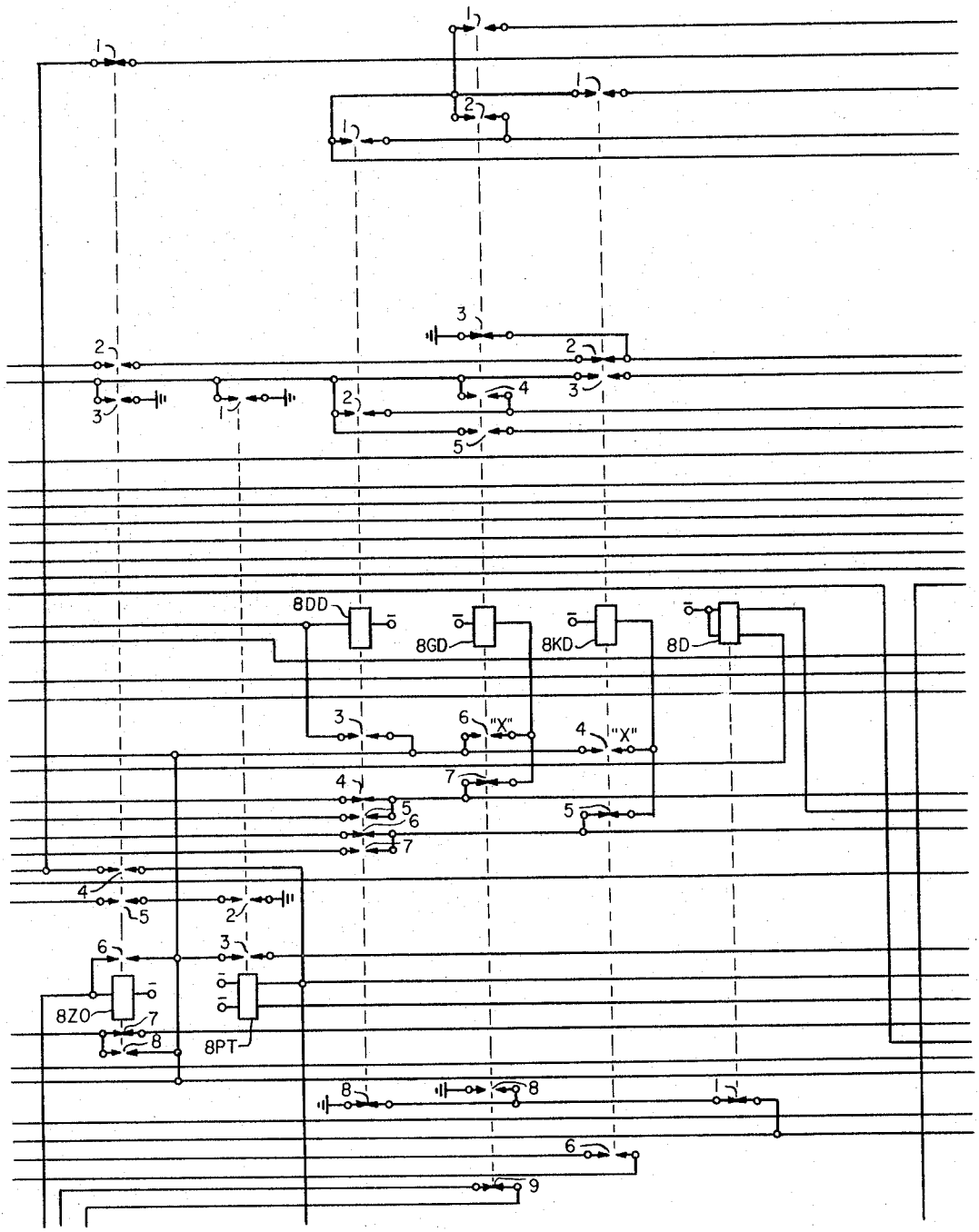
Figure 9:
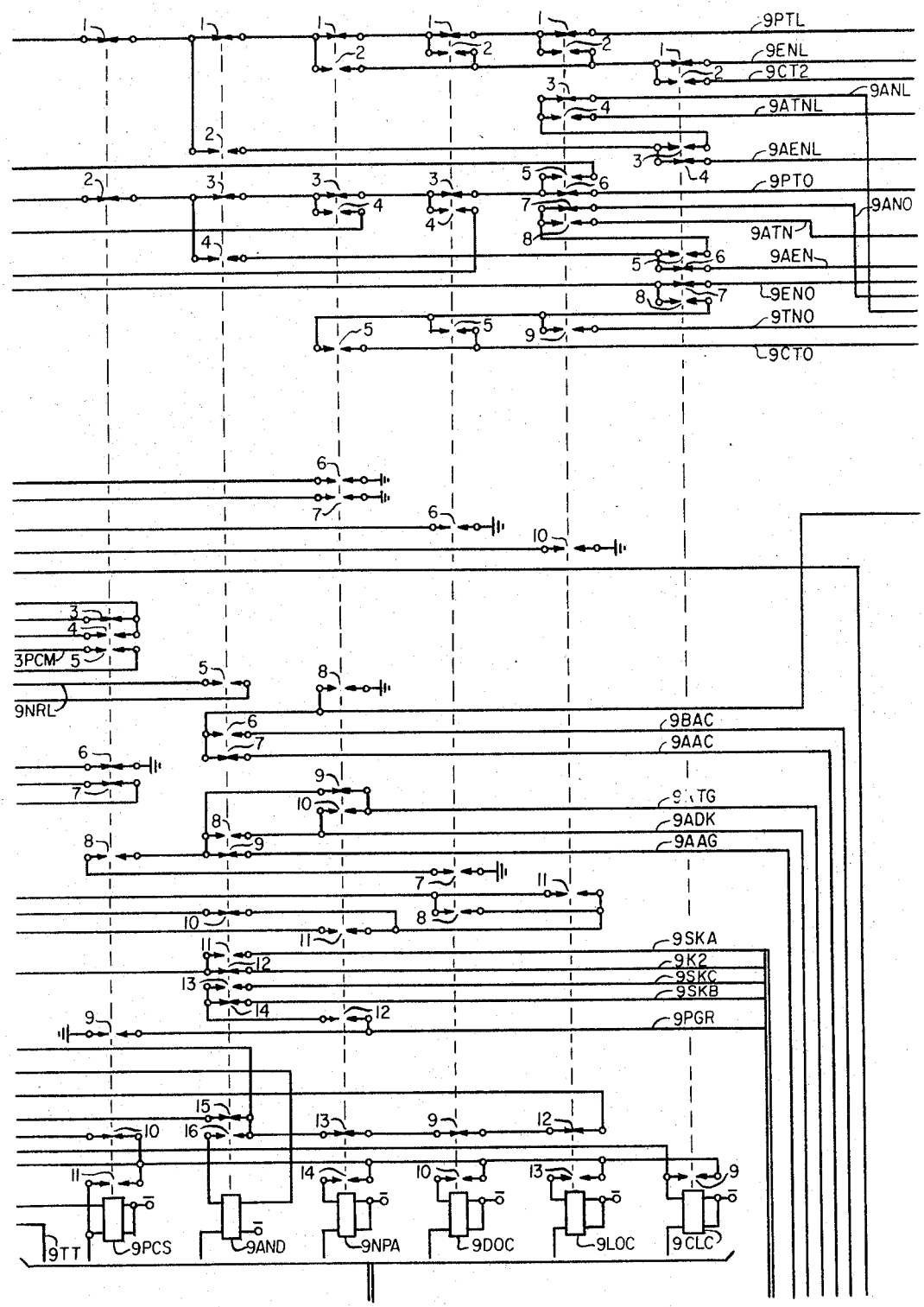
Figure 10:
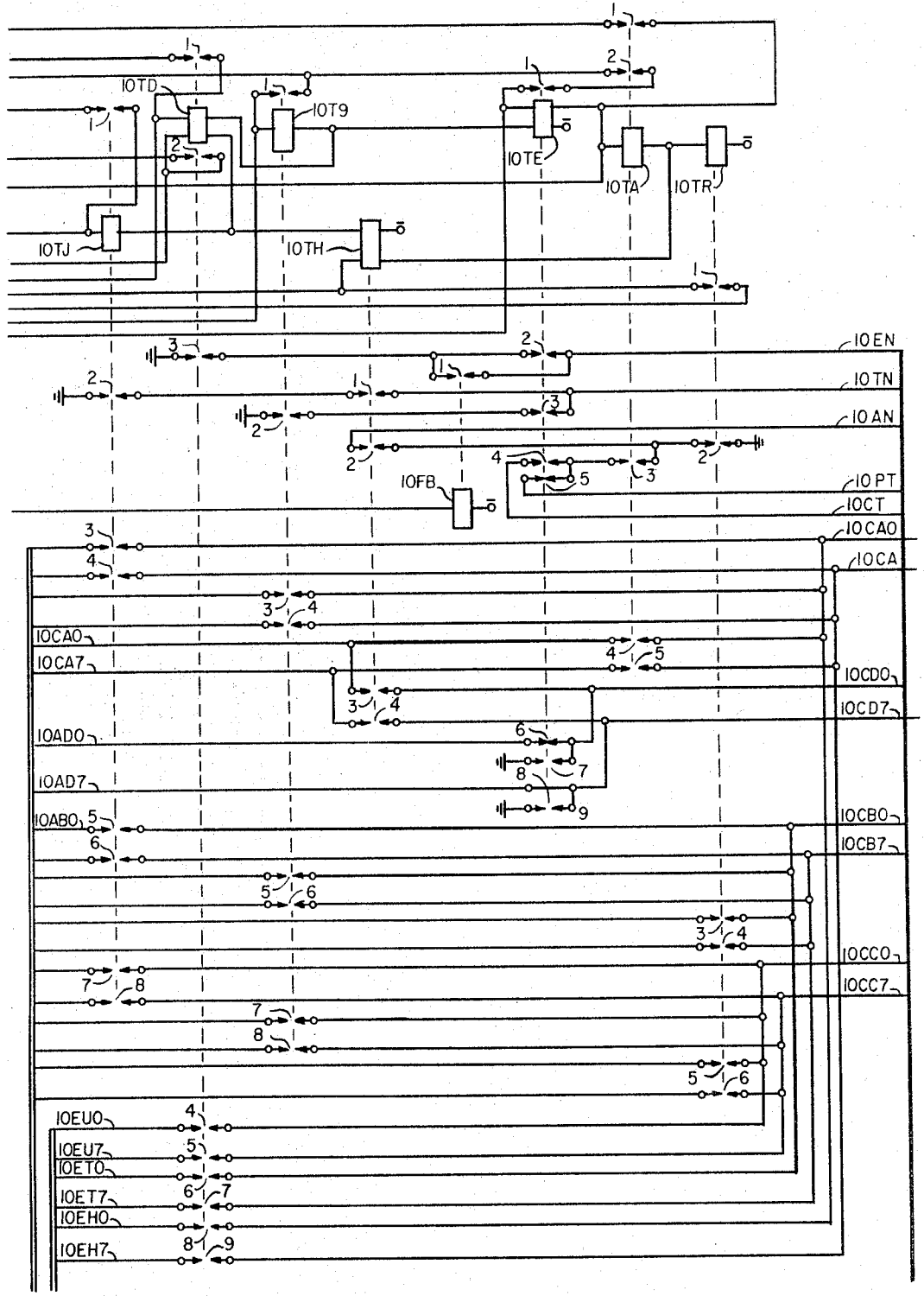
Figure 11:
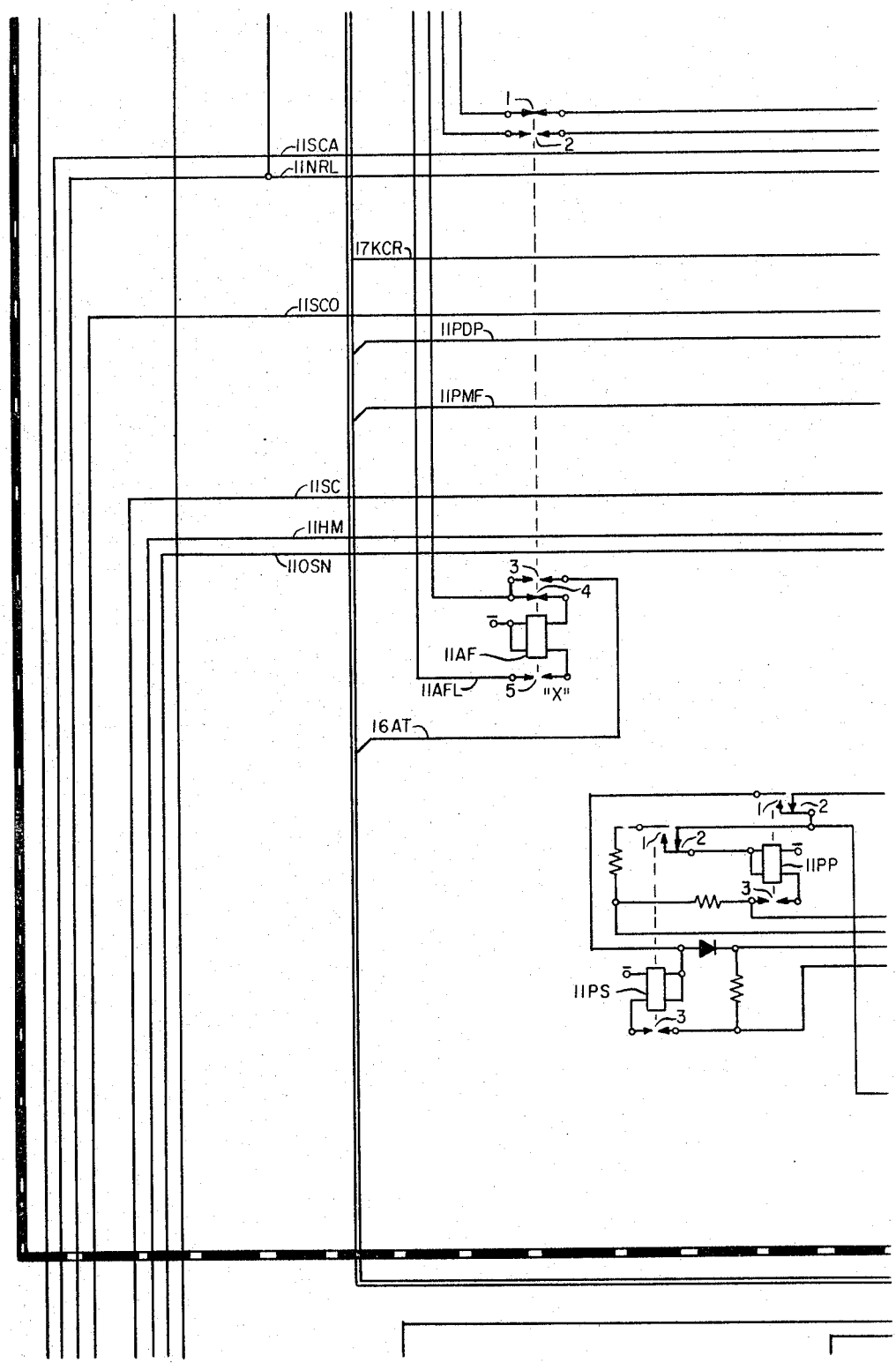
Figure 12:
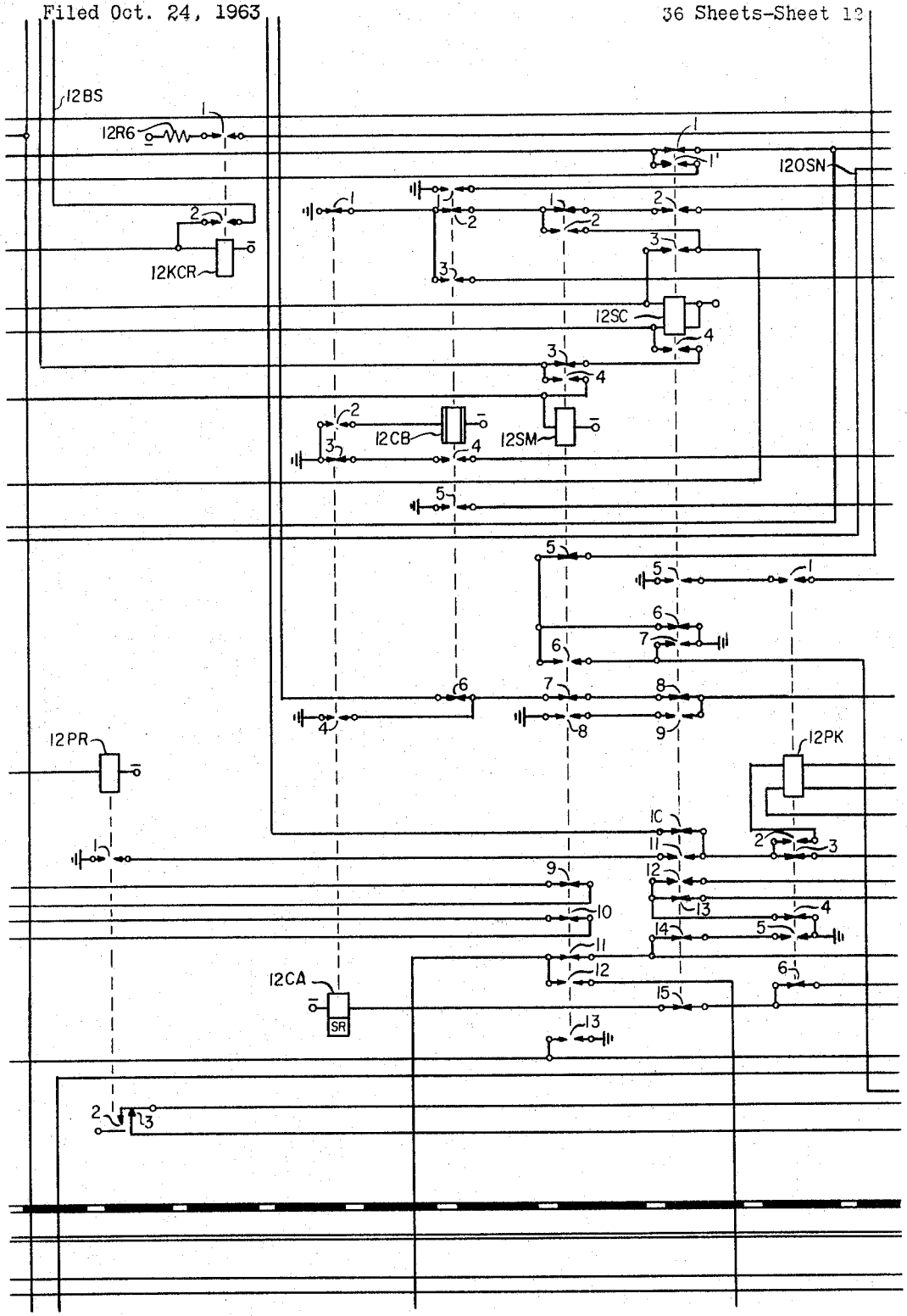
Figure 13:
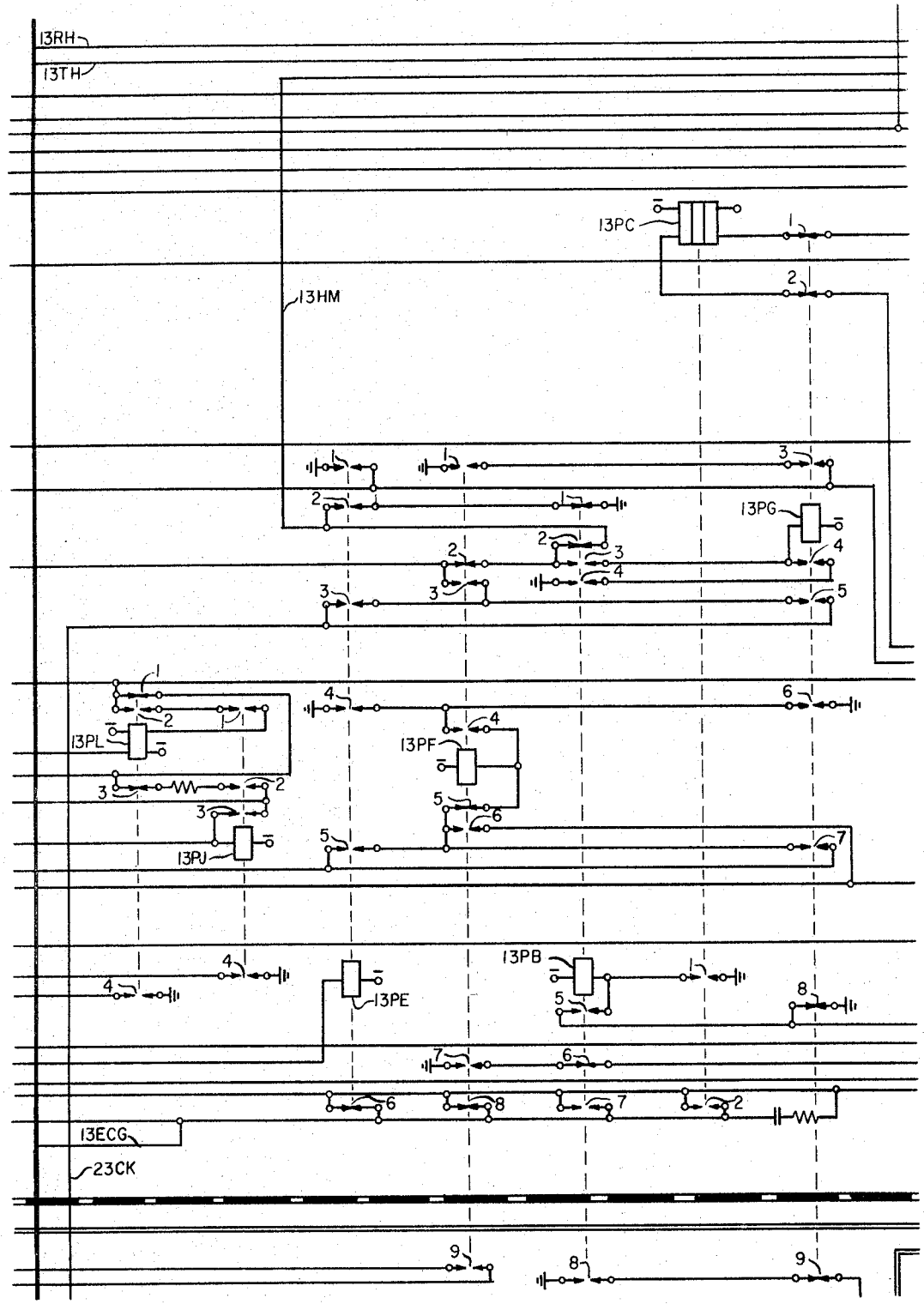
Figure 14:
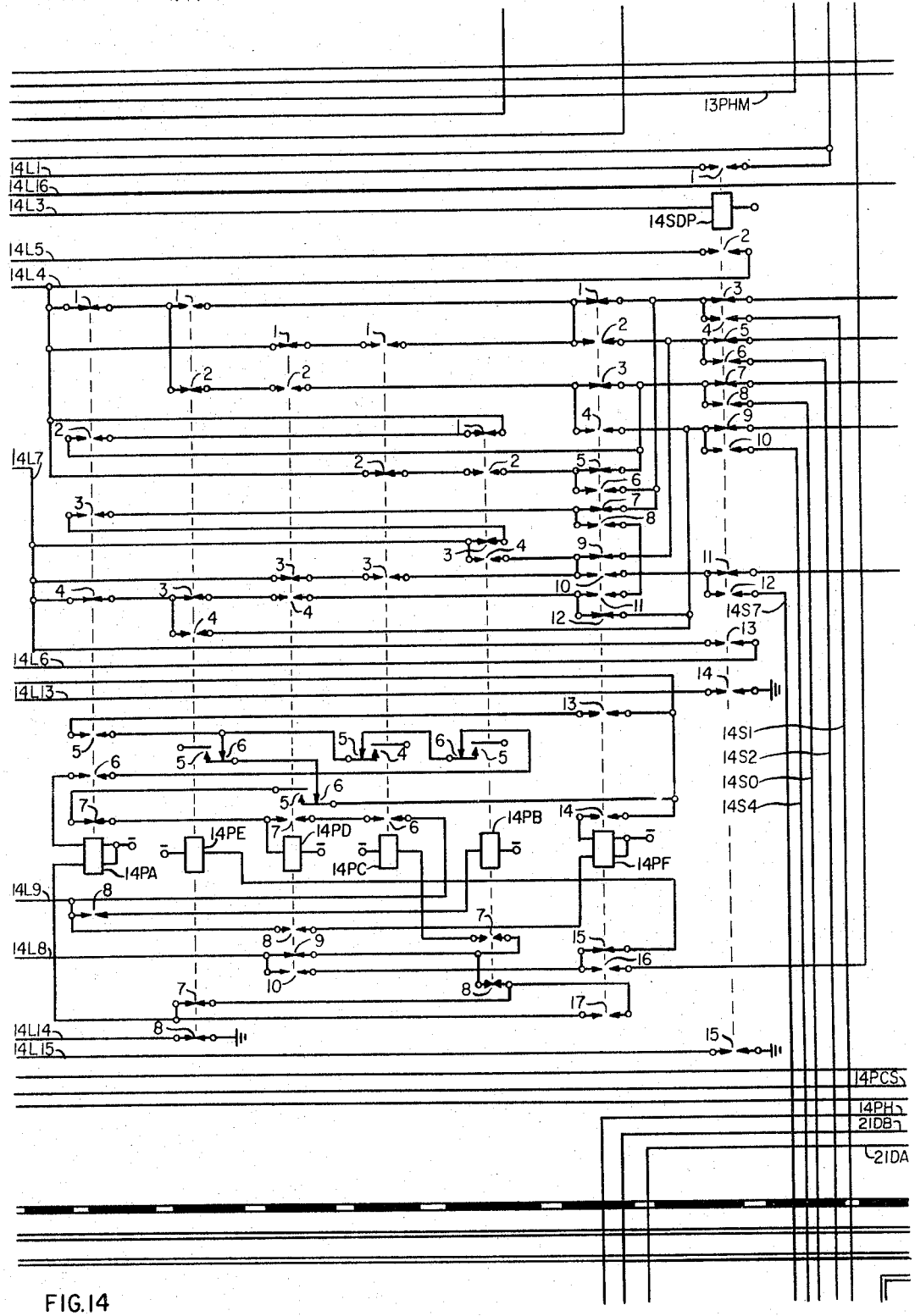
Figure 15:
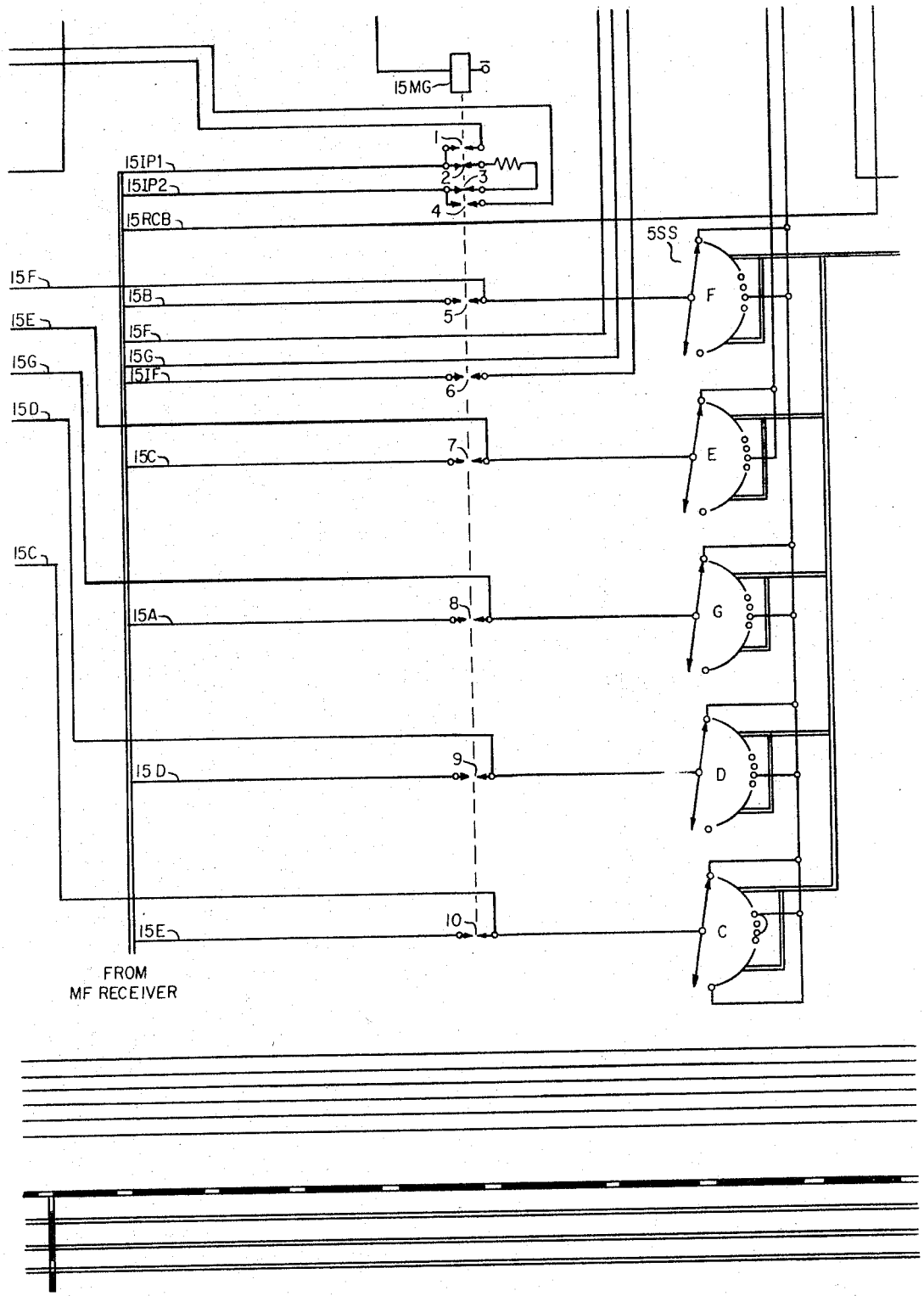
Figure 16:
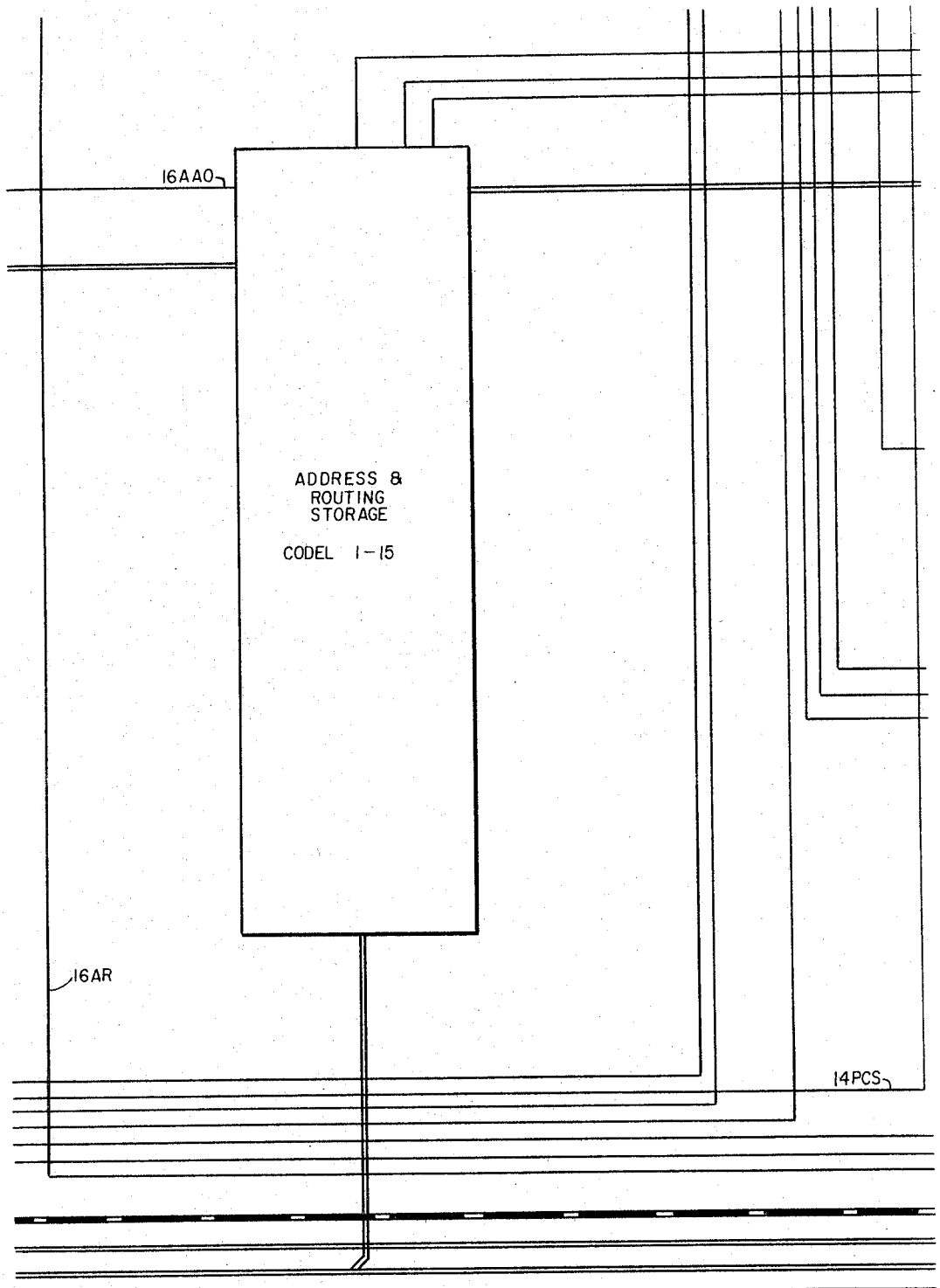
Figure 17:
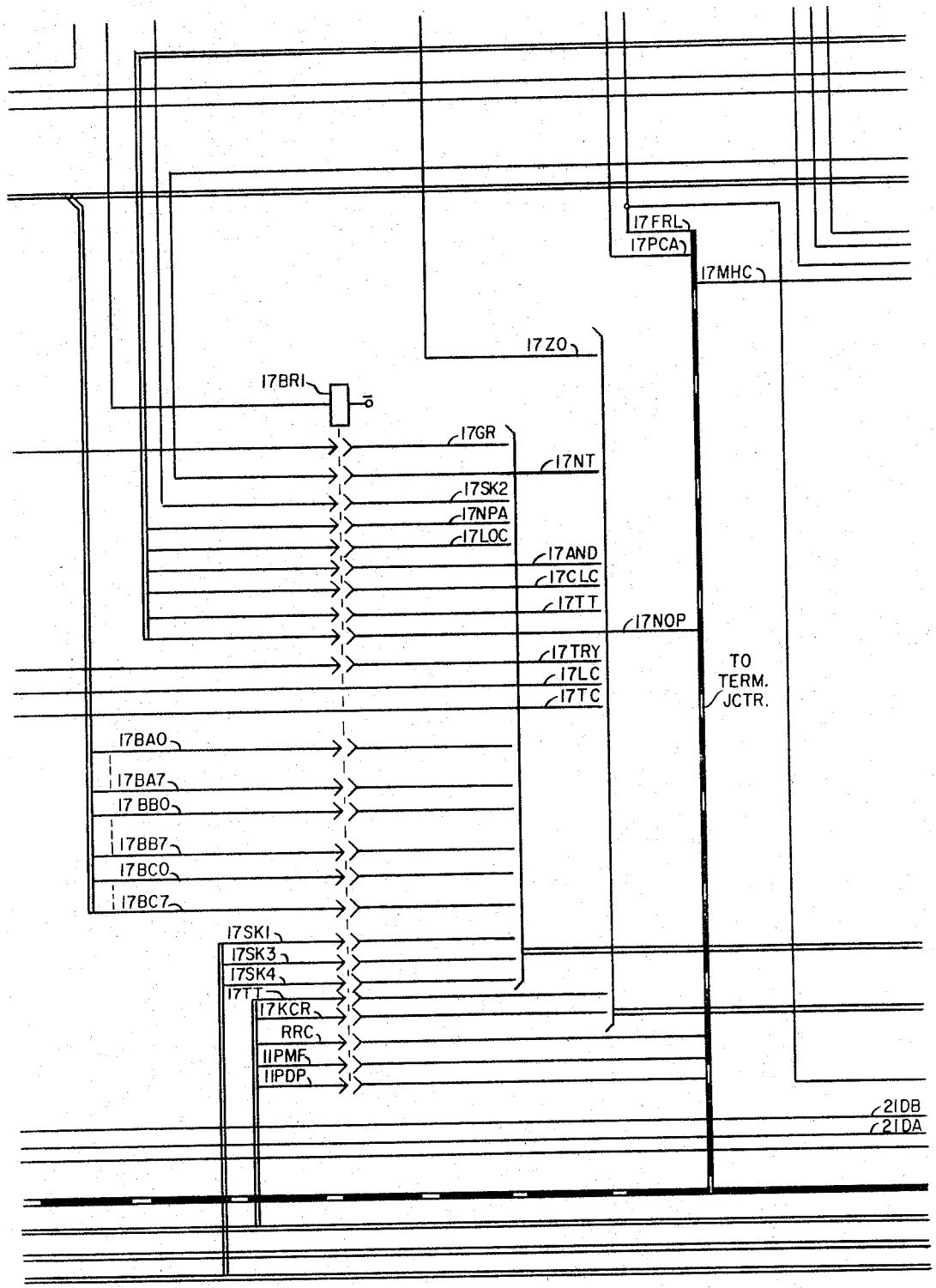
Figure 18:
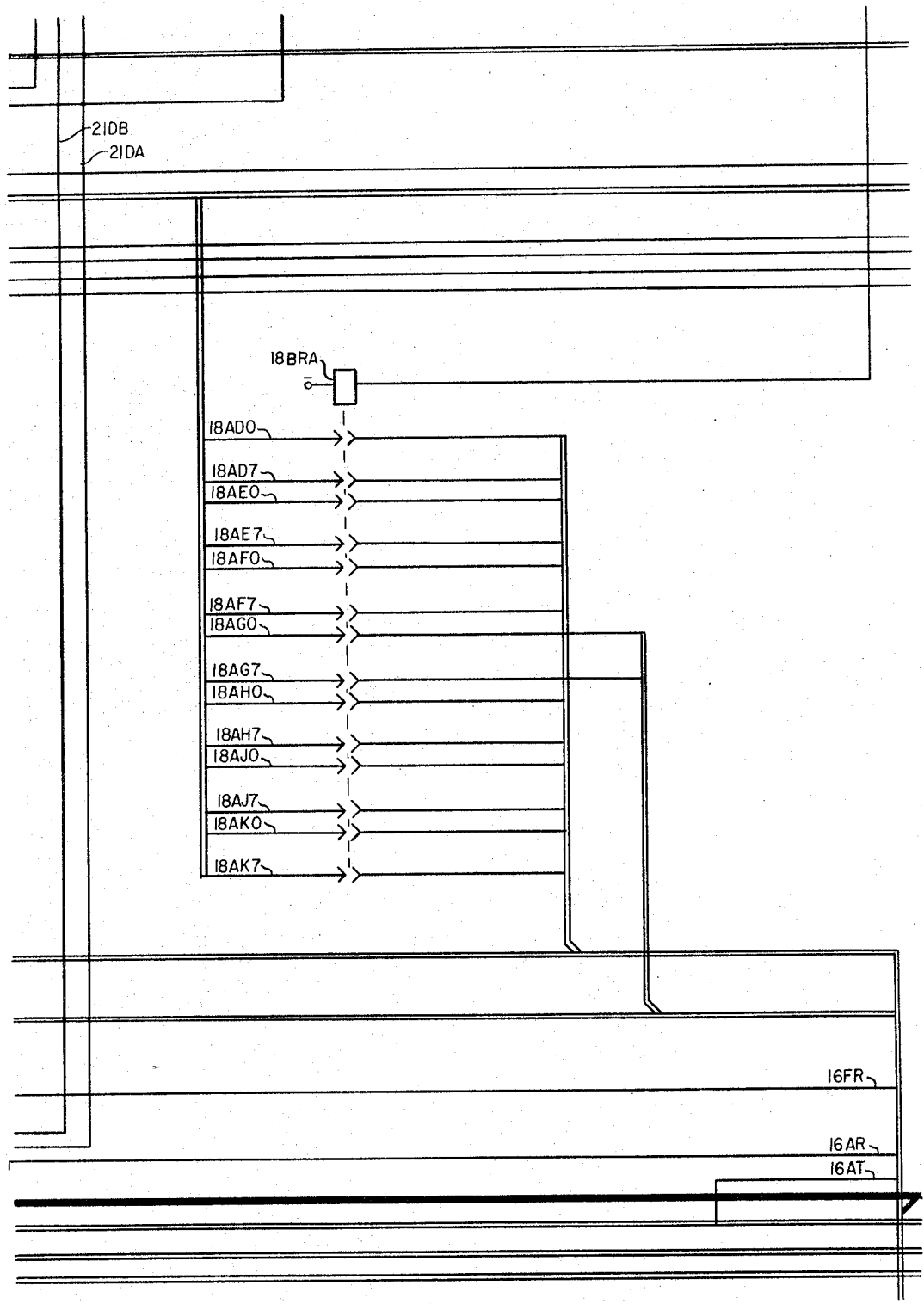
Figure 19:
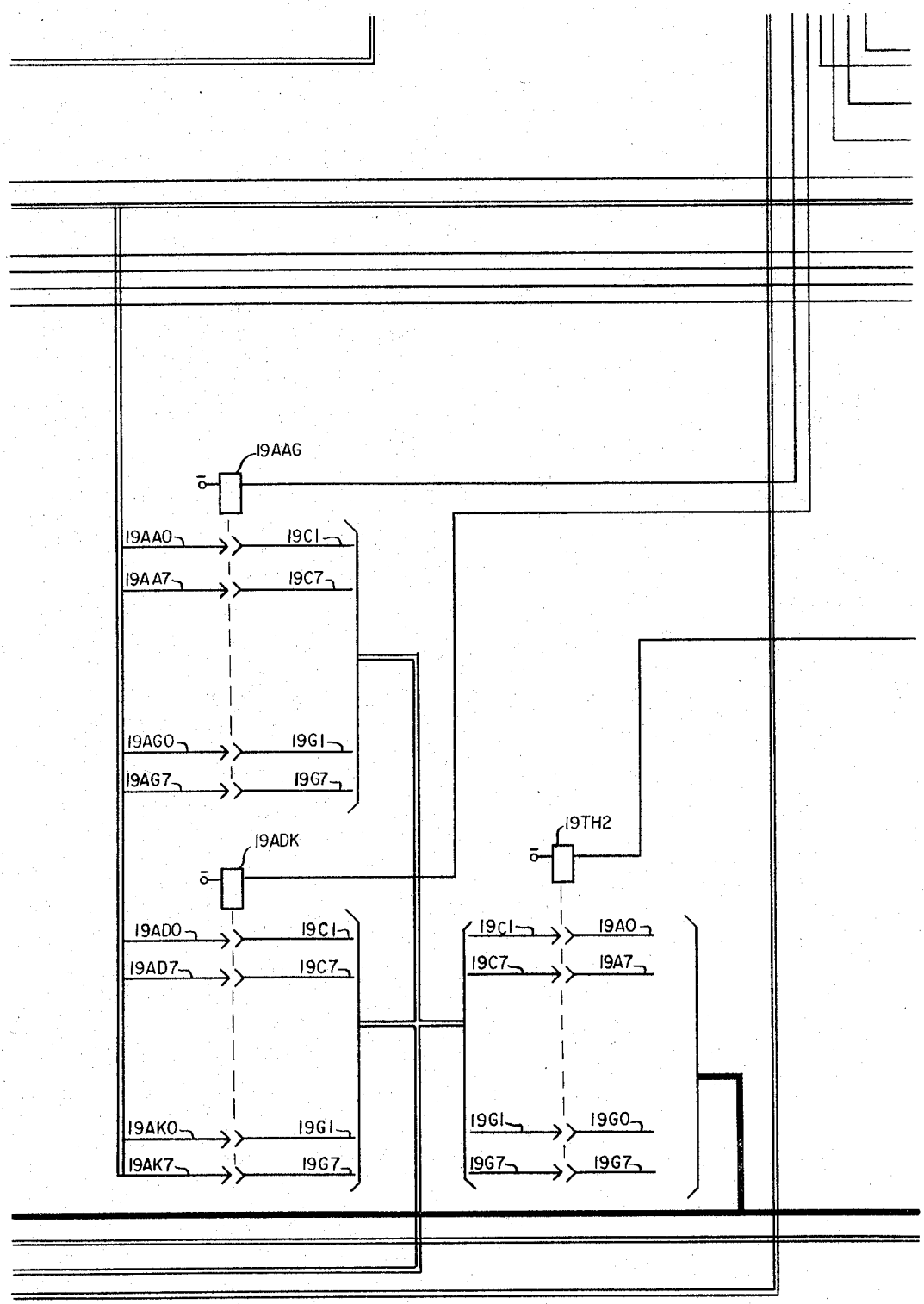
Figure 20:
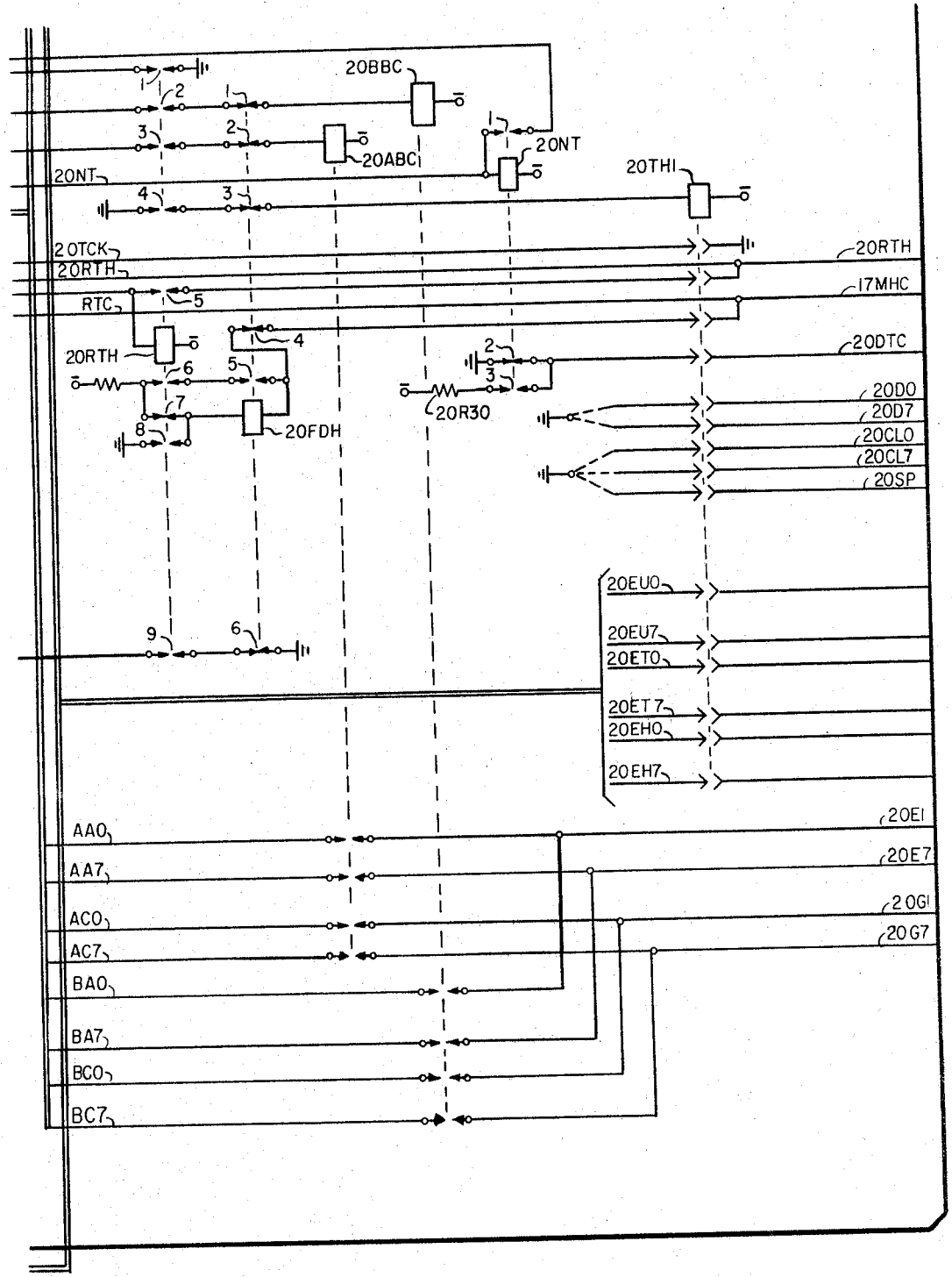
Figure 21:
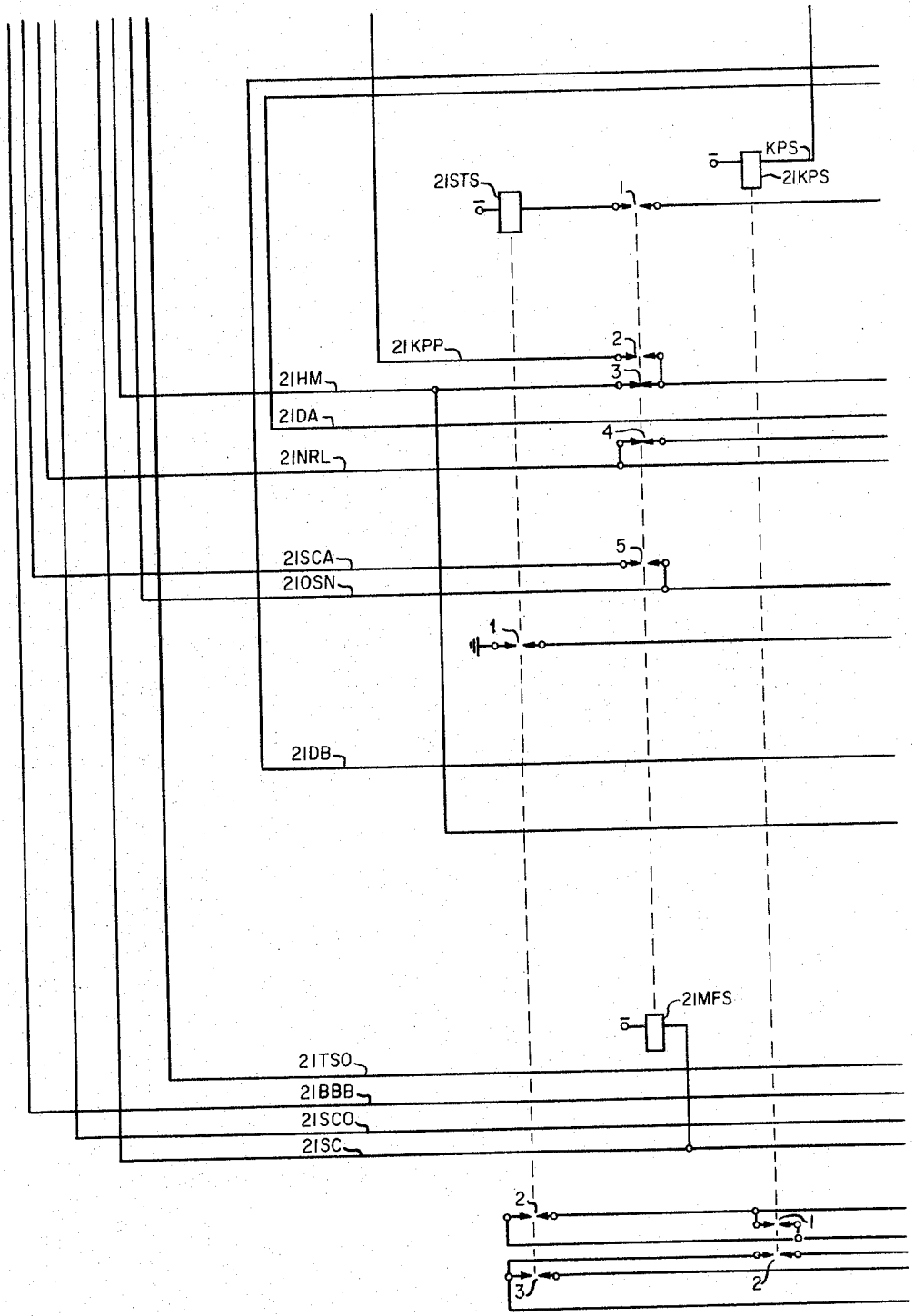
Figure 22:
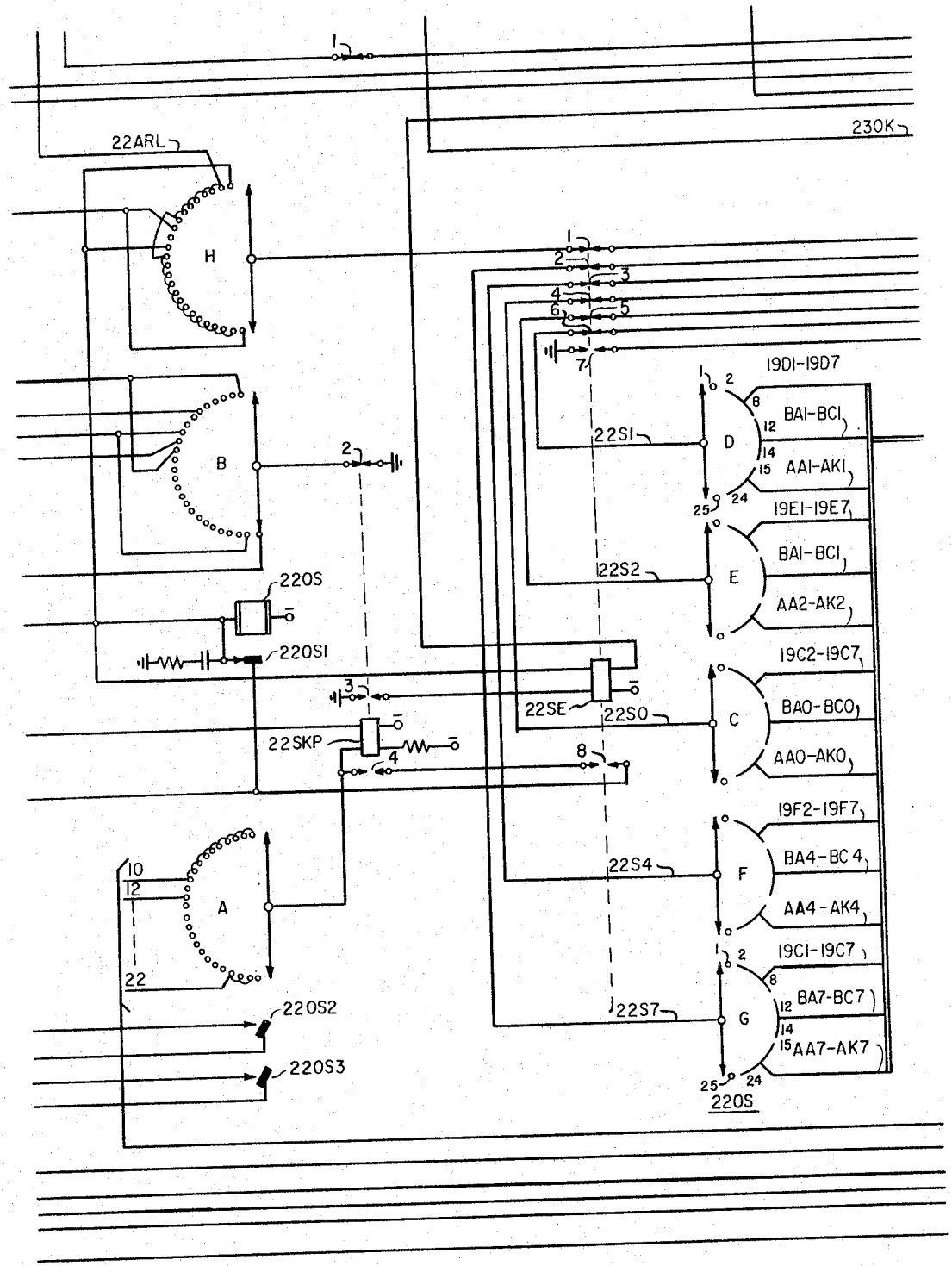
Figure 23:
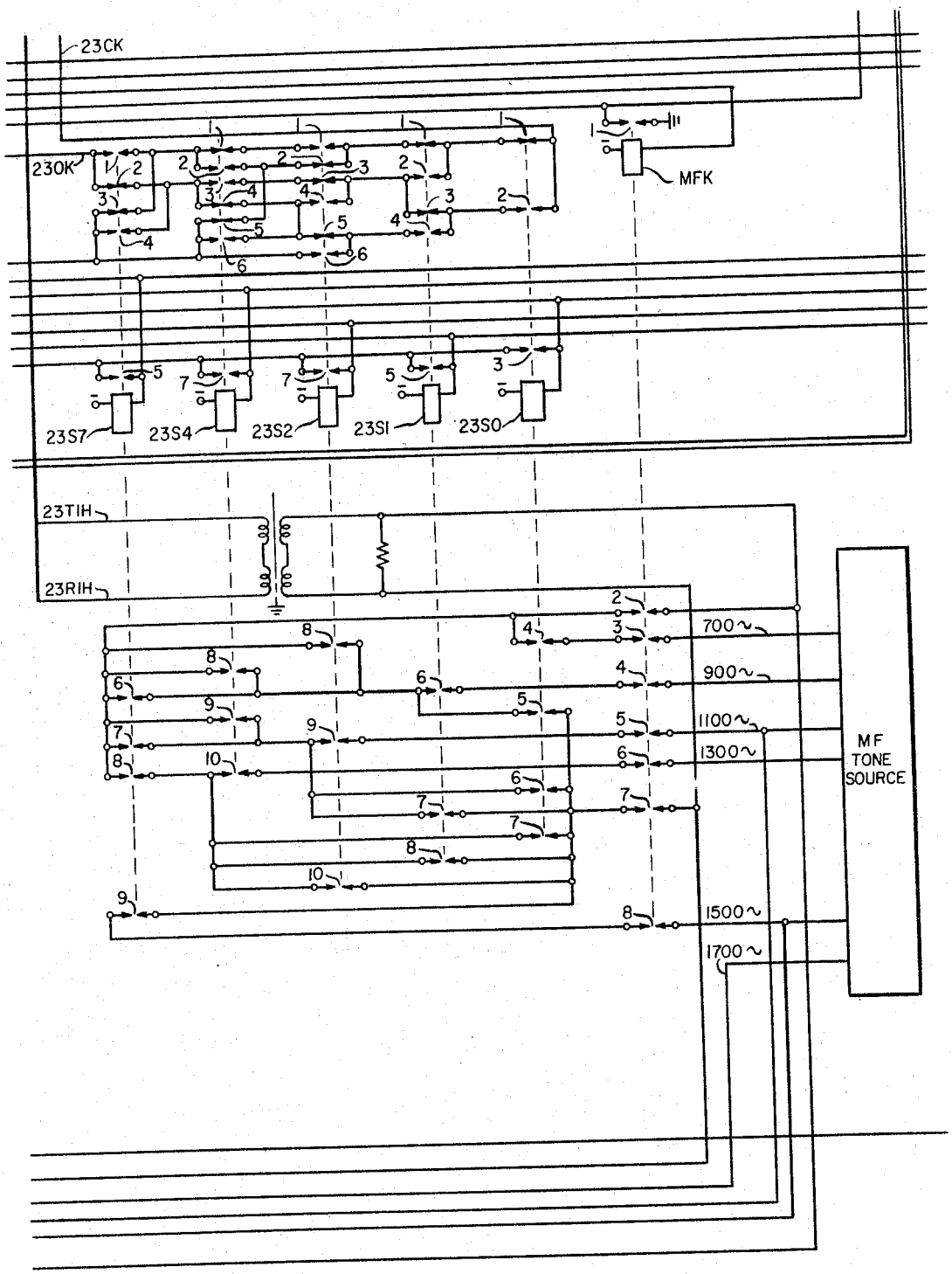
Figure 24:
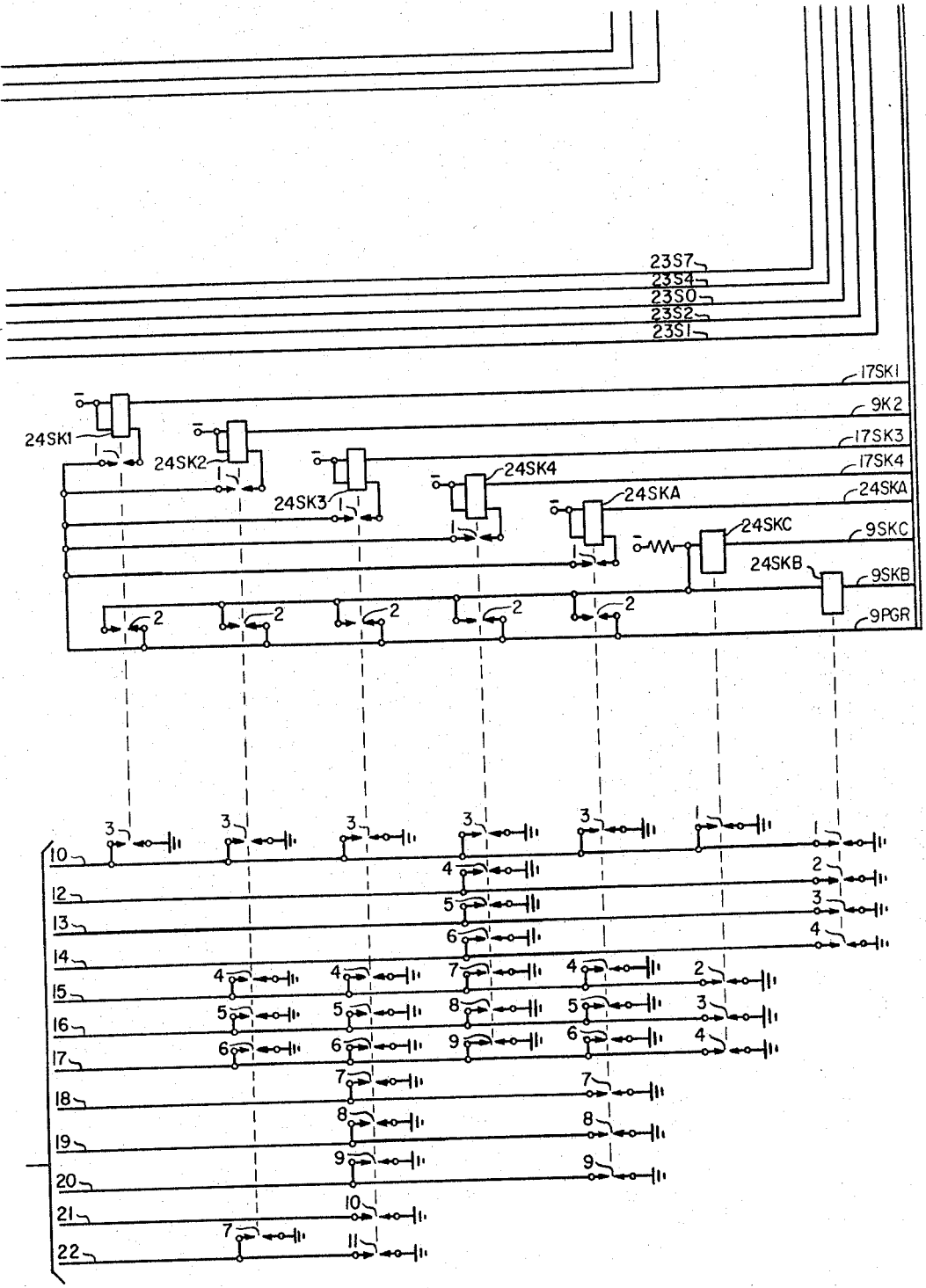
Figure 25:
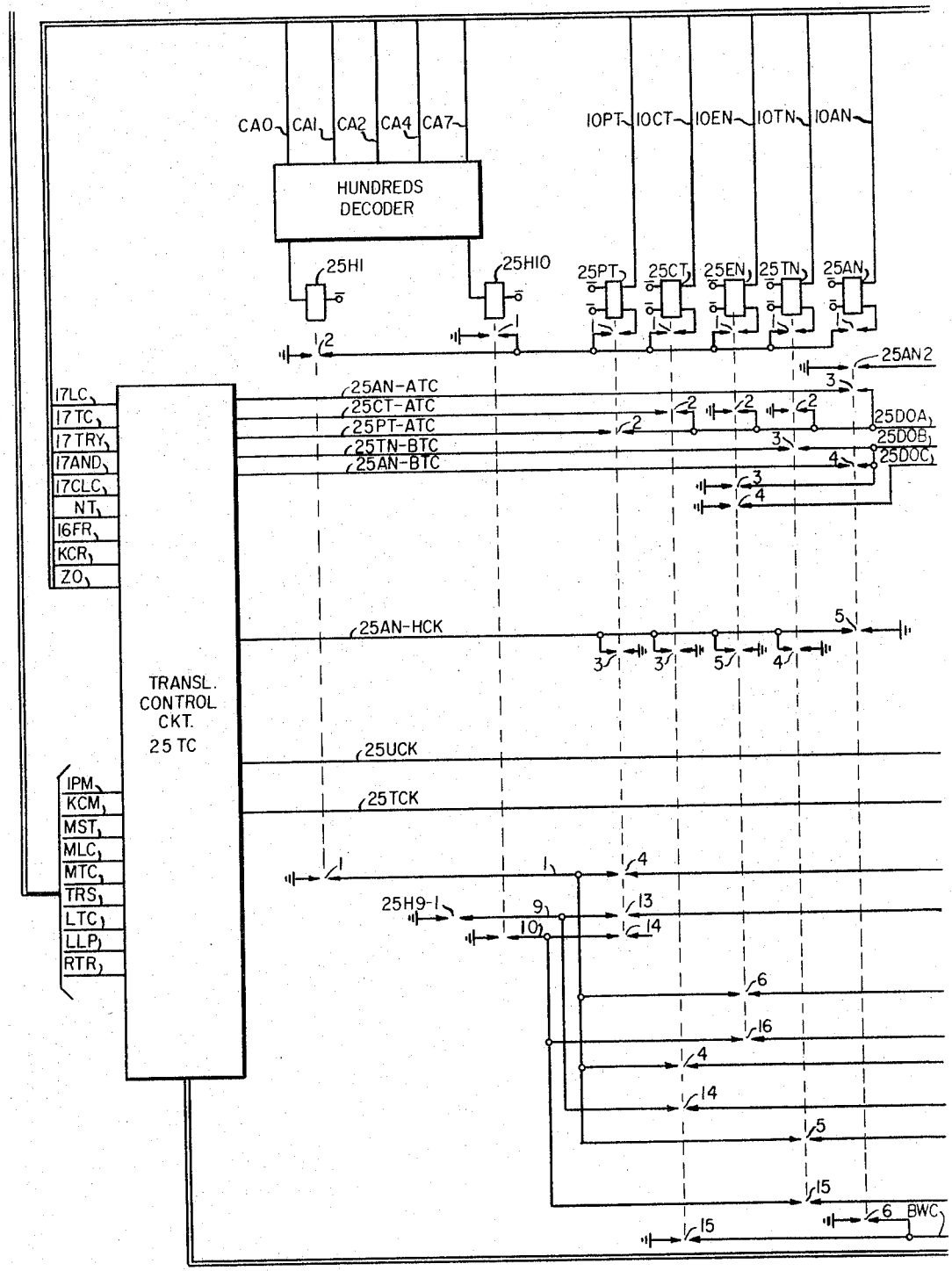
FIGS. 25 to 30 show the translator circuit in schematic form.
Figure 26:
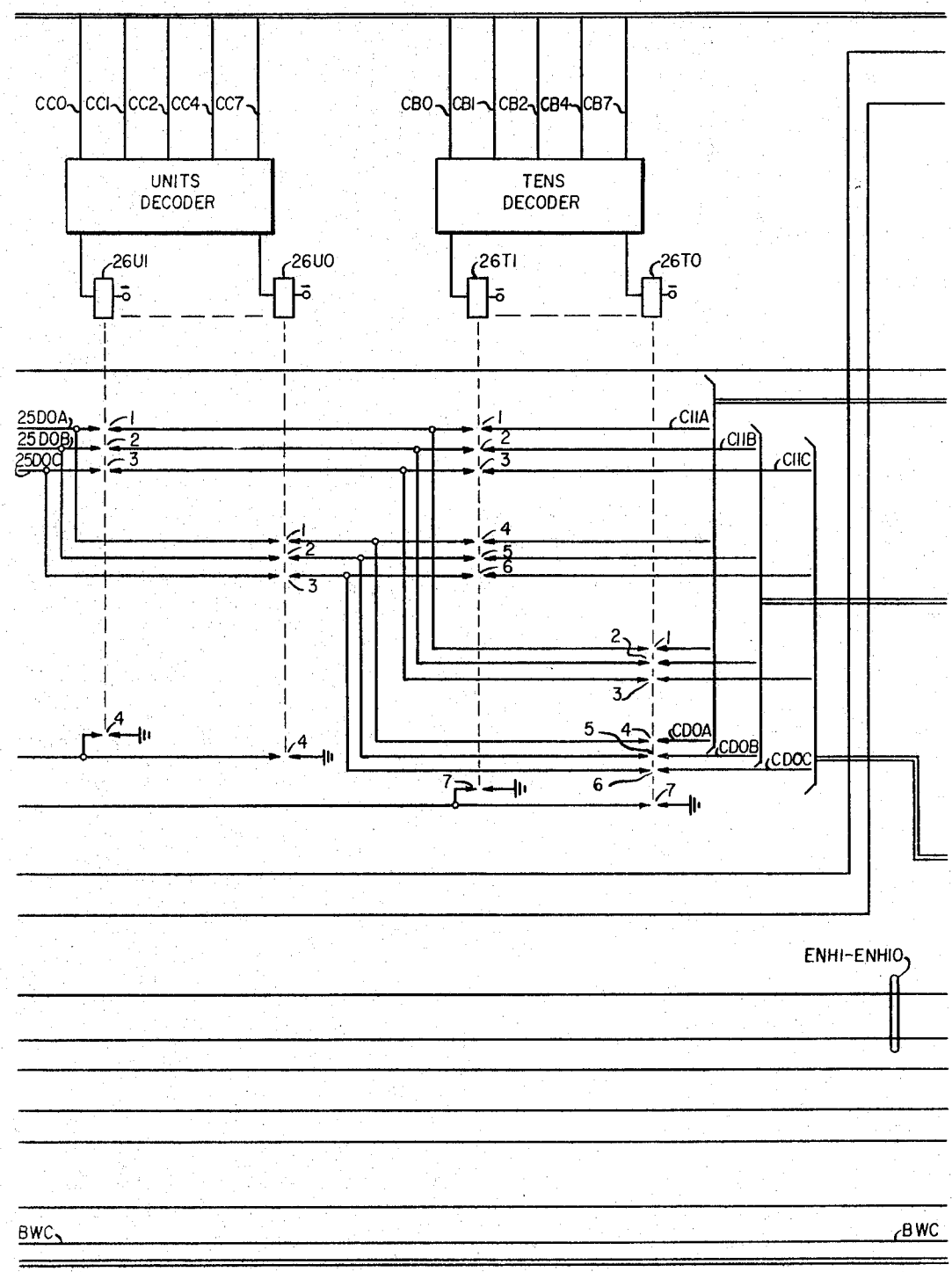
Figure 27:
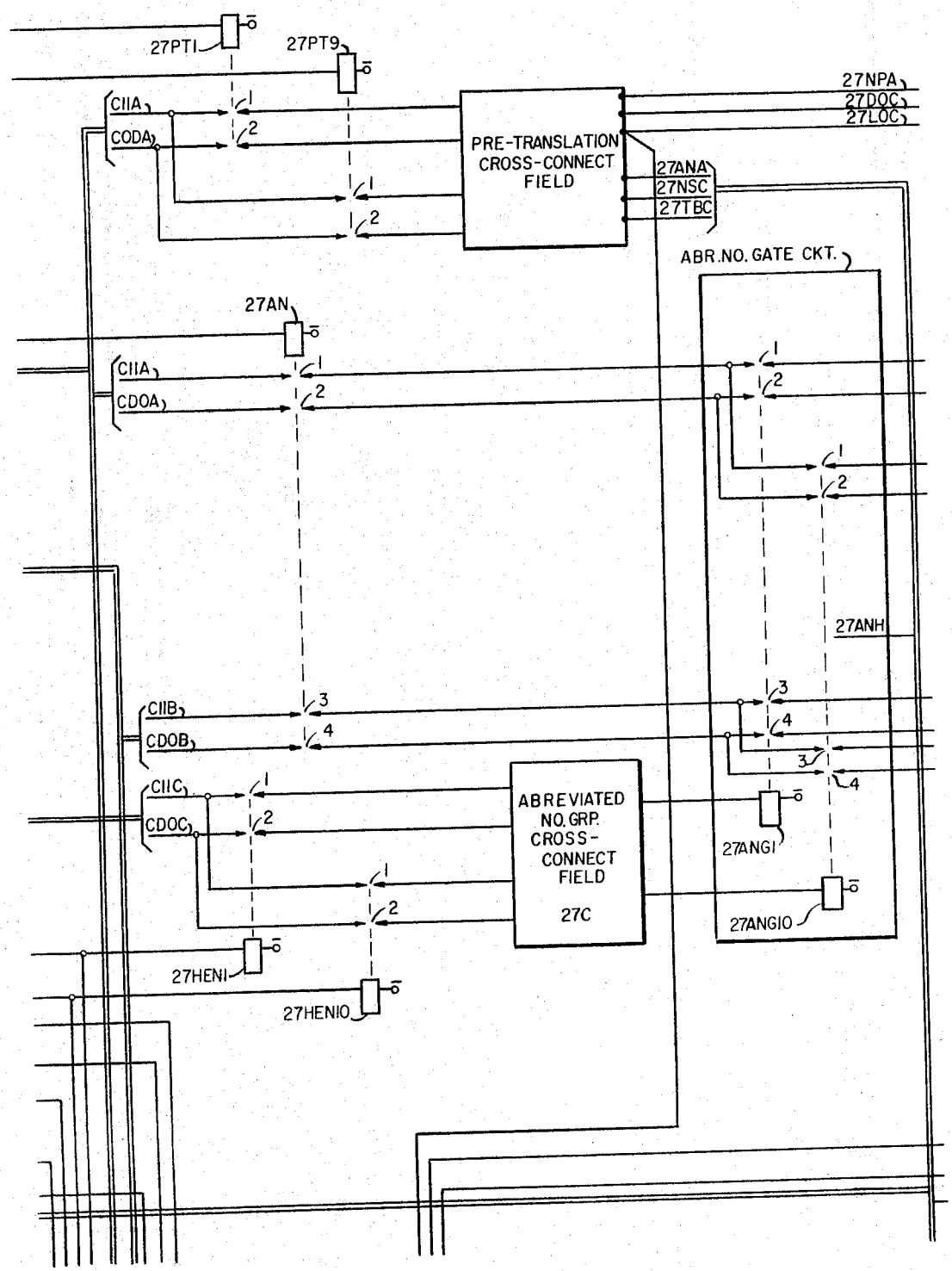
Figure 28:
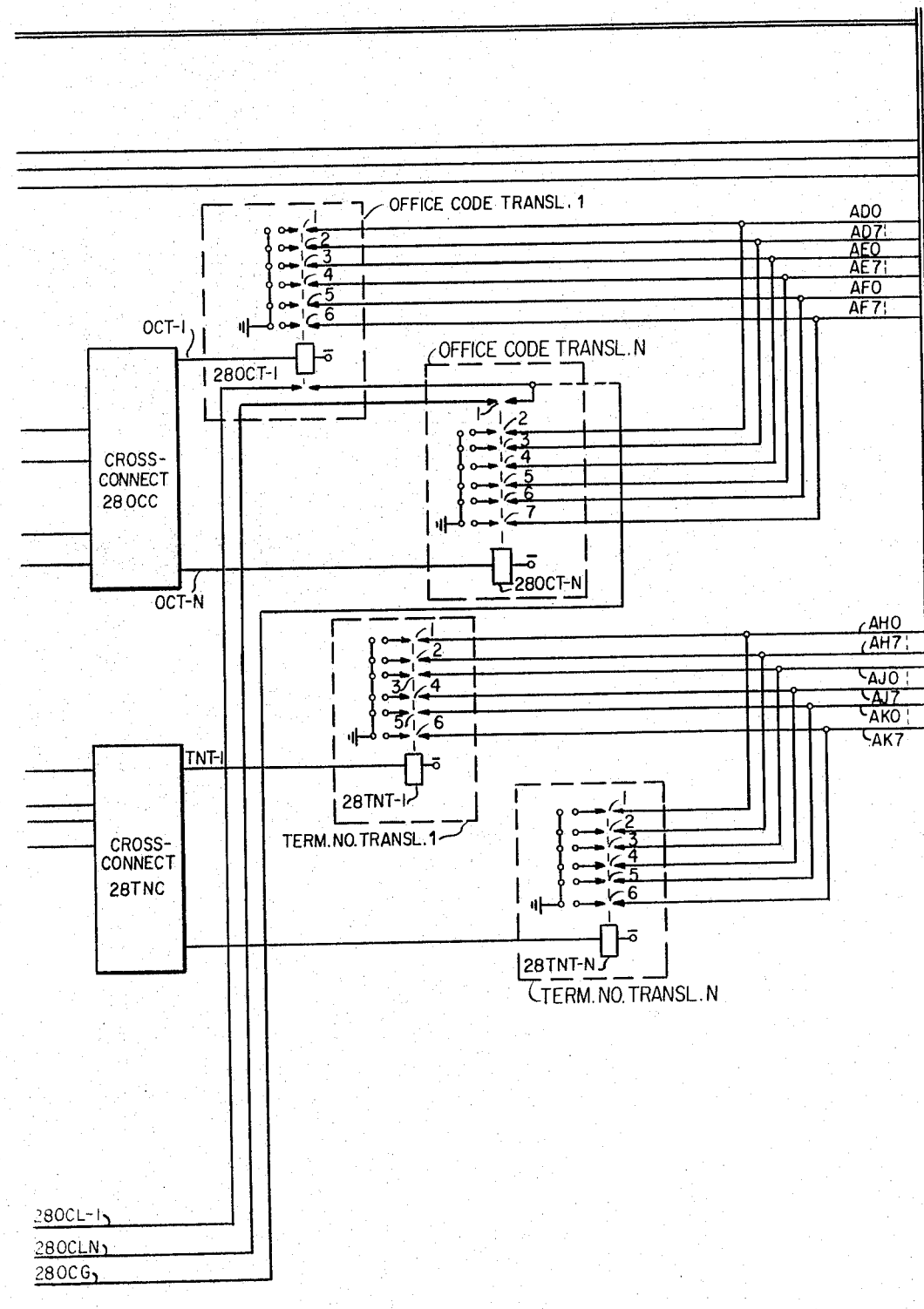

Ground via two of the leads 15A through 15E closes a circuit to a corresponding pair of route storage relays (FIG. 16), which operate and lock. Battery via lead 15G close a circuit to relay 5SP. Relay 5SP operates and closes a circuit to the motor magnet of rotary switch 5SS. When battery is removed from lead 15G, rotary switch 5SS steps its wipers to bank position 3 opening the circuits to relays 1RN and 3DT. Relay 1RN restores. Relay 3DT restores and removes dial tone from the line. Other storage relays operate and lock and rotary switch 5SS steps its wipers to bank position 4 in the same manner as above to allot another group of five storage relays. Other storage relays operate and lock and rotary switch 5SS steps its wipers to bank position 5 in the same manner as above.

When rotary switch 5SS steps its wipers to bank position 5, it closes circuits to the second windings of relays 8DD and 8PT via level B. Relay 8DD operates. Relay 8PT operates, locks, and closes a circuit to relay 6SA. Relay 6SA operates, opens the circuit to the first winding of relay 6ATC and closes to the second winding, and closes ground potential via relay 6SK to lead 16AR to call for a translator.

*DP Addressing* (Operated: Relays appropriate ones of (1EH0–1EH7, 2ET0–2ET7, 2EU0–2EU7), 3DP, 3LC, 4AA, 3DT, 3BB, 4BA, 4CH, 6DTC and 6ATC)

After the calling party receives dial tone, the calling party dials the called number. The pulses are repeated by the line circuit via lead 3ECH pulsing relay 4AA. On the first pulse, relay 4AA restores, opens the circuit to relay 4BA, and closes the circuit to relay 13PJ. Relay 4BA remains operated during pulsing due to its slow to release characteristics. Relay 13PJ operates, short circuits the first winding of relay 12PK, and closes a circuit to relay 12CA. Relay 12CA operates and closes a circuit to relay 12CB at contacts 12CA2. Relay 12CB operates and closes a circuit to the motor magnet of rotary switch 5SS. When relay 4AA reoperates, the short circuit is removed from the first winding of relay 12PK closing a circuit to relay 13PJ and the first winding of relay 12PK in series. Relay 12PK operates, opens the circuit of 12CA, and closes a circuit to the first winding of relay 14PA. Relay 14PA operates and locks. The next time that relay 4AA restores, it closes a circuit to the second winding of relay 12PK and the number one winding of relay 13PL. Relay 13PL operates, locks via its second winding, opens the circuit to the first winding of relay 12PK and 13PJ, and recloses the circuit to relay 12CA before it restores. Relay 13PJ restores and opens the circuit to the second winding of relay 13PL. When relay 4AA again reoperates, the circuits to the second winding of relay 12PK and the second winding of relay 13PL are opened. Relay 13PL restores and reopens the circuit to relay 12CA. Relay 12PK restores opens the circuit to the first winding of relay 14PA, and closes the circuit to 14PB. Relay 14PB operates, locks, and opens the circuit to the second winding of relay 14PA. Relay 14PA restores.

Relay 4AA continues to pulse and relays 12PK, 13PL and 13PJ operate in the same manner as previously described, grounding lead 14L8 or lead 14L9. The next ground on lead 14L8 closes a circuit to relay 14PC, which operates, locks, and opens the circuit to relay 14PB. Relay 14PB restores. The next ground on lead 14L9 closes a circuit to relay 14PD, which operates, locks, and opens the circuit to relay 14PC. Relay 14PC restores. Relay 14PE operates on the next ground pulse via lead 14L8, locks and opens the circuit to relay 14PD. Relay 14PD restores. The next ground pulse via lead 14L9 closes the circuit to the first winding of relay 14PF. Relay 14PF operates, locks via its second winding, and closes a circuit to relay 14PF. Relay 14PG operates.

After the last pulse of the digit (the sixth according to the assumption) relay 4AA reoperates, and relays 12PK and 13PL restore as previously described. After its slow to release interval relay 12CA also restores, and closes ground to leads 14L4 and 14L7 to close the circuit to the corresponding storage relays, FIG. 16, via rotary switch 5SS, bank levels E and D. The storage relays operate and lock. After its slow to release interval relay 12CB restores, removes ground from leads 14L4 and 14L7, removes ground from lead 14L10 opening the circuit to relay 14PE, the second winding of relay 14PF, and opens the motor magnet of rotary switch 5SS to step the wipers to bank terminals 3 opening the circuits to relays 1RN and 3DT. Relay 1RN restores. Relay 3DT restores and removes dial tone from the line. Relays 14PE and 14PF restore.

Further digits are pulsed in the same manner as described above, except the storage relays corresponding to the bank terminal on which the wipers of rotary switch 5SS is connected operate. Therefore, according to the number assumed, the corresponding storage relays operate and lock.

When rotary switch 5SS steps its wipers to bank position 5, it closes a circuit to the second windings of relays 8DD and 8PT via level B. Relay 8DD operates. Relay 8PT operates, locks and closes a circuit to relay 6SA. Relay 6SA operates, opens the circuit to the first winding of relay 6ATC and closes the circuit to the second winding of relay 6ATC, and closes ground via relay 6SK to lead 16AR to call for a translator.

*Translator Assigned* (Operated: Relays, appropriate ones of (1EH0–1EH7, 2ET0–2ET7, 2EU0–2EU7), 3MF or 3DP, 3LC, 4AA, 3BB, 4BA, 4CH, 15MG (MF pulsing only), 6DTC, 6SA, 6ATC, 8PT, 8DD and 7BS)

When the register is connected to a translator, the translator assigner returns low resistance battery via lead 16AR to operate relay 6SK, which short circuits relay 6ATC, closes resistance 6R22 battery to leads 16FR and 17FRL, grounds lead 17LC to start the translator, closes lead 17PCA to lead 3PAH, closes a circuit to relay 17BRI. Relay 6ATC restores to stop timing. Relay 17BRI operates and closes the register commons to the translator and monitor circuit.

*Pre-Translation* (Operated: Relays, appropriate ones of (1EH0–EH7, 2ET0–ET7, 2EU0–EU7) 3MF or 3DP, 3LC, 4AA, 3BB, 4BA, 4CH, 15MG, (MF pulsing only), 6DTC, 6SA, 6SK, 17BRI, 8PT, 8DD and 7BS)

When the translator is ready for the pre-translation, it returns ground on lead 17TRY closing an operating path to relays 10TA and 10TB. Relay 10TA operates, locks, and closes the address storage relays to send ground to the translator via leads 10CA0 and 10CA7. Relay 10TB operates, grounds lead 10PT to the translator, and closes the stored ground markings of the storage relays to leads 10CB0 to 10CB7 and leads 10CC0 to 10CC7 to the translator.

*Abbreviated Number Call* (Operated: Relays 10TA, 10TB, appropriate ones of (1EH0, 1EH7, 2ET0, 2ET7, 2EU0, 2EU7), 3MF or 3DP, 3LC, 4AA, 3BB, 4BA, 4CH, 15MG (MF pulsing only), 6DTC, 6SA, 6SK, 17BRI, 8PT, 8DD and 7BS)

If the pre-translation results in an abbreviated number translation indication, ground is returned via lead 17AND, closing an operating path to the first winding of relay 9AND. Relay 9AND operates, locks via its second winding in series with the first winding of relay 8PT and closes a circuit to relay 18BRA, transfers lead 17TRY from lead 9PTO to lead 9AEN, removes ground from lead 9PTL opening the circuit to relays 10TA and 10TB, grounds lead 9AENL, closes lead 17SK2 to lead 9SKA, and closes a path to the second winding of relay 10TD and the first winding of relay 10TH to lead 17TRY. Relay 10TA restores, removes ground lead 10PT, and removes the ground marks from the leads of the group 10CA0 and 10CA7. Relay 10TB restores and removes ground from the marked leads 10AB of the group 10AB7, 10AC0 and AC7. Relay 18BRA operates.

Then the translator is ready to start its equipment number translation, it returns ground via lead 17TRY closing circuits to the second winding of relay 10TD and the first winding of relay 10TH. Relay 10TD operates, closes the locking circuit to 10TD and 10TH, and closes the 10CA leads to the equipment number storage relays grounding leads of the group 10CA and 10CA7. Relay 10TD operates and closes the CB and CC leads to the equipment number storage relays grounding leads of groups 10CB0, 10CB7, 10CC0 and 10CC7. Relay 10TH operates, grounds lead 10EN to call for an equipment number translation, and closes the first digit of the address storage relays to the CD leads grounding leads of group 10CD0 and 10CD7.

The calling equipment number is checked by the translator to determine if the service requested is subscribed to by the calling party. If the requested services are within the caller's capability, ground is returned via lead 17CLC closing a path to relay 9CLC indicating a "classing complete." Relay 9CLC operates, locks, removes from lead 9AENL opening the circuit to the second winding of relay 10TD and to the first winding of relay 10TH, and closes lead 17TRY to lead 9ANO. Relay 10TD restores, removes ground from lead 10EN, and removes ground from leads of group 10CA, 10CA7, and from the leads of the groups 10CB, 10CB7, 10CC0 and 10CC7. Relay 10TH restores and removes ground from the leads of the group 10CD0 and 10CD7.

When the translator is ready to start the abbreviated number translation, it returns ground via lead 17TRY closing a path to the second winding of relay 10TH and to relay 10TB. Relay 10TH operates and grounds leads 10CD0 and 10CD2. Relay 10TB operates, closes the locking circuit of relays 10TH and 10TB, grounds lead 10AN, and grounds the leads of the groups 10CB0, 10CB7, and 10CC0, 10CC7.

The translator returns a reconstituted address via the AD, AE and AF leads. Assuming the office code is 650, ground is returned via leads 18AD2, 18AD4, 18AE1, 18AE4, 18AF4 and 18AF7, to operate the corresponding address and routing storage relays. Assuming the terminal number is 134, ground is returned via leads 18AH0, 18AH1, 18AJ1, 18AJ2, 18AK0 and 18AK4, to operate the corresponding address and routing storage relays. The translator also returns a ground via lead 17LOC closing a path to the first winding of relay 9LOC. Relay 9LOC operates, locks, opens the circuit to the second winding of relay 8PT, closes lead 9ATN to lead 17TRY, grounds lead 9ATNL, and opens the circuit to the second winding of relay 10TH and to relay 10TB. Relay 10TH restores, removes ground from lead 10AN, and removes ground from the leads of group 10CD0 and 10CD7. Relay 10TB restores and removes ground from the leads of the groups 10CB0, CB7, and 10CC0, CC7.

When the translator is ready to start the terminal number translation, it returns ground via lead 17TRY closing a path for relay 10TJ and the first winding of relay 10TH. Relay 10TJ operates, closes the locking circuit for 10TJ, and the first winding of relay 10TA, and grounds the leads of the groups 10CB0–10CB7, 10CC0–10CC7, 10CA0–CA7. Relay 10TH operates, grounds lead 10TN, and grounds the leads of the group 10CD0–10CD7.

*Local Office Call* (Operated: Relays 10TA, 10TB, appropriate ones of 1EH0–1EH7, 2ET0–2ET7, 2EU0, 2EU7, 3MF or 3DP, 3LC, 4AA, 3BB, 4BA, 4CH, 15MG (MF pulsing only), 6DTC, 6SA, 6SK, 17BRI, 8PT, 8DD and 7BS)

If the pre-translation results in a local office code translation, ground is returned via lead 17LOC, closing a path to the first winding of relay 9LOC. Relay 9LOC operates, locks, opens the circuit to the second winding of relay 8PT, and grounds lead 9ENL.

If the seventh digit of the address had not yet been pulsed, relay 8PT restores and opens the circuit to relay 6SA. Relay 6SA restores, removes ground from lead 9ENL, removes ground via relay 6SK from lead 16AR, and opens the circuit of relay 6SK. Relay 6SK restores, removes the short circuit from relay 6ATC, removes the resistance R22 battery from leads 16FR and 16FRL, opens lead 20RTH from lead 20RTC, removes ground from lead 17LC, opens lead 3PAH from lead 17PCA, and opens the circuit of relay 17BRI. Relay 17BRI restores and releases the translator and the terminating marker commons.

When the seven digits have been pulsed as described in the sections titled "M.F. Addressing" or "D.P. Addressing" except for closing the address storage relays corresponding to leads 18AD0–18AD7, 18AE0–18AE7, 18AF1–18AF7, 18AG0–18AG7, rotary switch 5SS steps its wipers to the ninth bank contacts, closing circuits to relay 8GD and the first winding of relay 8DD. Relay 8DD operates. Relay 8GD operates, locks via its "X" contacts 8GD6, operates fully, removes ground from the timing circuit at contacts 8GD3, closes a circuit to relay 6SA at contacts 8GD5, and opens lead 21DB from lead 21DA. Relay 6SA operates, grounds lead 9ENL, restarts the timing circuit timing the translator assigner, and closes ground via relay 6SK to lead 16AR to call for a translator.

The translator is connected as described in the section titled "Translator Assigned."

The translator returns ground via lead 17TRY closing circuits to the first windings of relays 10TD and 10TE. Relay 10TD operates and extends grounded ones of leads 9EH0–9EH7, 9ET0–9ET7, 8EU0–9EU7 and locks in series with the first winding of relay 10TE. Relay 10TE operates, grounds lead 10EN, and extends grounded ones of leads 10AD0–10AD7.

When the translator completes its equipment number translation, it returns ground via lead 17CLC closing a circuit to the first winding of relay 9CLC. Relay 9CLC operates, locks, and removes ground from lead 9ENL, opening the circuit to the first windings of relays 10TD and 10TE. Relay 10TD restores, removes ground from the leads 10CA0–10CA7, 10CB0–10CB7, 10CC0–10CC7, and removes ground from lead 10EN. Relay 10TE restores and removes ground from leads 10CD0 and 10CD2.

When the translator is ready to start the terminal number translation, it returns ground via lead 17TRY closing a circuit to relay 10TG and the first winding of relay 10TE. Relay 10TG operates, closes the locking circuit of 10TG and the first winding of relay 10TE, and grounds leads 10CB0–10CB7, 10CC0–10CC7 and 10CA0–10CA7. Relay 10TE operates and grounds lead 10TN and the leads of group 10CD0–10CD7.

*Pull Complete* (Operated: Relays for an "AND" call, 10TJ, 10TH, appropriate ones of (1EH0–1EH7, 2ET0–2ET7, 2EU0–2EU7, 3MF or 3DP, 3LC, 4AA, 3BB, 4BA, 4CH, 15MG (for MF calls only), 6DTC, 6SA, 6SK, 8PT, 9AND, 9LOC, 9CLC, 8DD, 7BS, 17BRI and BRA; for a seven digit "LOC" calls, 10TG, 10TE (appropriate ones of 1EH0–1EH7, 2ET0–2ET7, 2EU0–2EU7, 3MF or 3DP, 3LC, 4AA, 3BB, 4BA, 4CH, 15MG (for MF calls only), 6DTC, 6SA, 6SK, 9LOC, 17CLC, 8DD, 7BS and 18BRA)

When the translator completes the terminal number translation and the "pull" is complete, the terminating marker returns ground via lead 17NOP closing a circuit to the second winding of relay 9PCS. Relay 9PCS operates, locks, grounds lead 9PGR, removes ground from lead 9CT2 opening the circuit to relay 10TG and to the first winding of relay 10TE (AND call only), removes ground from lead 9ATNL opening the circuit to relay 10TJ, and to the first winding of relay 10TH (seven digit call only), opening the circuit to relay 15MG (MF calls only), opens the circuit to relay 6SK, and removes resistance (relay 6SK) ground from lead 16AR. Relay 10TJ restores, removes ground from the leads of groups 10CB0–10CB7, 10CC0–10CC7, and removes ground from lead 10TN. Relay 10TJ or 10TG restores and removes ground from the leads of group 10CA0–10CA7. Relay 10TH or 10TE restores and removes ground from the leads of group 10CD0–10CD7. Relay 15MG restores and opens the circuit from the multi-frequency receiver. Relay 6SK restores, grounds lead 17GR, recloses the circuit to relay 6ATC, opens lead 20RTH from relay 20RTC, removes resistance R22 battery from leads 16FR and 17FRL, removes ground from lead 17LC to release the translator, opens the circuits to relays 18BRA and 17BRI and opens lead 3PAH from lead 17PCA. Relay 6ATC reoperates. Relay 17BRI restores and releases the translator and the terminating marker commons. Relay 18BRA restores and opens the translator commons.

*Ticketer Connected* (Operated: Relays same as in preceding section)

After the ticketer is seized, it returns ground via lead 20RTH to close a circuit to relay 20RTH. Relay 20RTH operates, closes a circuit to relay 19TH2 for an abbreviated number call (i.e. 9AND operated) closes a circuit to relay 19ADK for seven digit calls closes a circuit to relay 19AAG, and closes a circuit to relay 20TH1. Relay 20TH1 operates, closes the equipment number leads to the register commons grounding leads in the groups 20A0–20A7, 20B0–20B7, 20C0–20C7, closes the locking circuit of relay 20RTH, grounds lead 20DTC, closes ground via relay 20FDH to lead 20MHC, grounds two of the five 20D0–20D7 leads to identify the register, closes a circuit to the second winding of relay 6FRL, and grounds two of the five 20CL0–20CL7 leads or 20SP to indicate the class of service. Relay 19TH2 operates. For abbreviated number calls relay 19ADK operates or for seven digit calls relay 19AAG operates and closes the marking grounds to the leads of groups 19A0–19A7, 19B0–19B7, 19C0–19C7, 19D0–19D7, 19E0–19E7, 19F0–19F7, and 19G0–19G7.

After the ticketer has had sufficient time to receive the information from the register, it removes ground from lead 20RTH opening the circuit of relay 20RTH. Relay 20RTH restores, opens the circuit to relay 19TH2, removes ground from lead 9RTG opening the circuit to either 19ADK or 19AAG, opens the circuit to relay 20TH1, and removes ground via relay 20FDH from lead 17MHC. Relays 20TH1, 19TH2 and 19ADK or 19AAG restore opening the register-ticketer common highway.

*Release* (Operated: Relays appropriate ones 1EH, 2ET0, 2ET7, 2EU0, 2EU7, 3MF or 3DP, 3LC, 4AA, 3BB, 4BA, 4CH, 6FRL, 6DTC, 6SA, 8PT (AND call only), 8GD (7 digit calls only), 9BCS, 9AND (AND calls only), 9LOC, 9CLC, 8DD, 7BS, appropriate ones of the address and routing storage relays)

When the switch-through relay in the line circuit operates, ground via relay 4AA, resistor 3R7, lead 3ECH, the "AR" matrix, the line circuit and lead 13ECG closes a circuit to the first winding of relay 6PH. Relay 6PH operates and restarts the timing circuit.

Relay 4EN operates, locks, closes a circuit to the second winding of relay 4TS, removes resistance 4R5 battery from lead 3ESH, and closes the 1200 cycle continuous tone source to the calling line as enabling tone. Relay 4TS operates, opens the circuit to relay 4EN, and closes ground. After its slow-to-release interval, relay 4EN restores, opens the circuit to the second winding of relay 4TS, removes the 1200 cycle continuous tone source from the calling line, closes low resistance 4R5 battery to lead 3ESH to indicate switch-through, and opens the circuit to relay 4AA. Relay restores, opens the circuit to relay 4BA, and closes the circuit to relay 13PJ. Relay 13PJ operates and closes a circuit to relay 12CA. Relay 4BA restores, removes the short circuit from the first winding of relay 4TS, opens the circuit to the second winding of relay 3BB, opens the circuit to relay 7BS, removes the locking ground from the equipment storage relays, opens the circuit to relay 3MF or 3DP, opens the circuit to relay 3LC, and opens the circuit to relay 4CH. The storage relays restore. Relays 3MF or 3DP restore. Relay 3LC restores, removes ground from lead 4SK, and opens lead 4INT from lead 4SS1. Relay 4TS remains operated on its first winding. Relay 3BB restores, opens the circuit to relay 13PJ4, opens the circuit to relay 6DTC, and closes the circuit to the motor magnet of rotary switch 5SS via its interrupter springs 5SS1 and the first winding of relay 4TS. Relay 13PJ restores and reopens the circuit of relay 12CA. Relay 4CH restores and removes resistance 4R8 ground from lead 3C1 to release the "AR" matrix. Rotary switch 5SS steps its wipers "self-interruptedly" to the fourteenth bank terminals opening the circuit to the first winding of relay 8DD on the first step and the circuit to the first winding of relay 4TS on the fourteenth step. The next call will use the banks 14 to N position as the previous call used banks 1 to the thirteenth positions. Relay 7BS restores, opens the circuit to the second windings of relays 9CLC, 9LOC and 9PCS and to relay 8GD, for an abbreviated number call, opens the circuit to the second winding of relay 9AND and to the first winding of relay 8PT, opens all the operated address and routing storage relays, removes ground from lamp 7SUPY and from lead 7NTL, relay 2ONT, and opens the circuit to the second winding of relay 6FRL. Relay 9AND restores. When the "AR" matrix releases, ground is removed from lead 13ECG opening the circuit to the first winding of relay 6PH. Relays 8PT or 8GD and 9LOC restore and open the circuit to relay 6SA. Relays 8DD, 9CLC, 6PH, 9PCS and the address and routing storage relays restore. Relay 6DT restores and stops timing. Relays 6SA and 6FRL restore. Relay 4TS restores, recloses ground via relay 4AA and resistor 3R7 to lead 3ECH, removes ground from lead 1DR to mark the circuit idle, removes low resistance 4R5 battery from lead 3ESH, opens lead 1CHO from lead 1CHI of the all trunks busy chain.

Trunk to Line

*Seizure* (Operated: Relay 6ATC)

Seizure is the same as described in the section titled "Line to Line" up to the point of relay 3LC operating. Instead of relay 3LC operating, relay 3TC operates and locks.

If it is a MF (multi-frequency) pulsing trunk, relay 3MF operates, locks, and closes a path to relay 1RN. Relay 1RN operates and further operation is the same as described in the section titled "Line to Line," except relay 3DT does not operate for trunk calls.

If it is a DP (dial pulse) pulsing trunk, relay 3DP operates, locks and closes the motor magnet of rotary switch 5SS via its interrupter springs 5SS1, lead 4SS1, the rotary switch wipers and lead 4SSA. Rotary switch 5SS steps its wipers to bank contacts 2 closing a circuit to relay 1RN. Relay 1RN operates and further operation is as described in the section titled "Line to Line," except relay 3DT does not operate.

Addressing

*MF Addressing* (Operated: Relays 1RN, appropriate ones of the storage relays 1EH0, 1EH7, 2ET0, 2ET7, 2EU0, 2EU7, 3MF, 3TC, 4AA, 3BB, 4BA, 4CH, 14MG, 6DTC and 6ATC)

When lead 3ECH is transferred to low resistance ground, the trunk recognizes this as a "go" signal and the M.F. signals are sent via leads 13TH and 13RH to leads 15IP2 and 15IP1. Two frequencies sent to the M.F. receiver are converted to ground marks, according to the two out of five code, over leads 15A, 15B, 15C, 15D, 15E, and 15F. Interdigital battery is returned via the lead 15G. The M.F. receiver grounds lead 15C and 15F as a "key pulse" signal, closing a circuit to relay 5KP. After its slow-to-operate interval, relay 5KP operates and locks. Battery via lead 15G closes a circuit to relay 5SP. Relay 5SP operates and closes the motor magnet of rotary switch 5SS. When battery is removed from lead 15G, rotary switch 5SS steps its wipers to bank 2 opening the circuit of relay 1RN. Relay 1RN restores. Further pulsing takes place as described in the earlier section titled "M.F. Addressing," except it gives an extra "stop" signal, battery on leads 15E and 15F closing a circuit to relay 5SP. Relay 5SP operates and steps the wipers of rotary switch 5SS to the next bank contacts.

*DP Addressing* (Operated: Relays appropriate ones of the storage relays 1EH0–1EH7, 2ET0–2ET7, 2EU0–2EU7, 3DP, 3TC, 4AA, 3BB, 4BA, 4CH, 6DTC and 6ATC)

After the trunk receives a "go" signal, it repeats the pulses via lead 3ECH pulsing relay 4AA. Further operation is the same as described in the earlier section titled "DP Addressing," except relay 3DP is not operated.

*Translator Assigned* (Operated: Relays appropriate ones or the storage relays 1EH0–1EH7, 2ET0–2ET7, 2EU0–2EU7, 3MF or 3DP, 3TC, 4AA, 3BB, 4BA, 4CH, 15MG and 5KP (MF pulsing only), 6DTC, 6SA, 6ATC, 8PT, 8DD and 7BS)

The operation is the same as described in the earlier section titled "Translator Assigned," except ground is closed to lead 17TC instead of 17LC.

*Pre-Translation* (Operated: Relays appropriate ones of the storage relays 1EH0–1EH7, 2ET0–2ET7, 2EU0–2EU7, 3MF or 3DP, 3TC, 4AA, 3BB, 4BA, 4CH, 15MG and 5KP (MF pulsing only), 6DTC, 6SA, 6SK, 17BR, 8PT, 8DD, and 7BS)

The operation is the same as described in the earlier section titled "Pre-Translation."

*Local Office Termination* (Operated: Relays 10TA, 10TB appropriate ones of the storage relays 1EH0–1EH7, 2ET0–2ET7, 2EU0–2EU7, 3MF or 3DP, 3TC, 4AA, 3BB, 4BA, 4CH, 15MG and 5KP (MF pulsing only), 6DTC, 6SA, 6SK, 17BRI, 8PT, 8DD, 7BS, appropriate ones of the address storage relays of FIG. 16)

The operation is the same as described in the earlier section titled "Local Office Call," except ground is removed from lead 17TC instead of lead 17LC.

*Pull Complete* (Same as for the earlier section titled "Pull Complete," except relay 3TC instead of 3LC and also 5KP (for MF calls only)

The operation is the same as described in the reference section, except when relay 9PCS operates it also closes ground via lead 3PCM to lead 9NRL to close a path to the second winding of relay 4TS, and ground is removed from lead 17TC instead of lead 17LC.

*Release* (Relays operated same as in the earlier section titled "Release," except 17TC is operated instead of 17LC and also 5KP is operated for MF calls)

The operation is similar to that described in the reference section except relay 4EN is not operated and relay 4TS is already closed. Relay 5KP circuit is opened when relay 3MF restores.

*Line to Trunk, Seizure, Addressing, Translator Assigned, Pre-Translation*

These operations are the same as explained in the sections for a "Line to Line" call.

*Abbreviated Number Call* (Relays operated are the same as listed for the earlier section of like title)

The operation is similar to that described in reference section, except instead of a terminal number translation the translator selects a trunk route. Further operation is the same as described in the section following, titled "Pull Complete Signal."

*Distant Office Call* (Relays operated are the same as described in the section titled "Local Office Call")

If the pre-translation results in a distant office code translation, ground is returned via lead 17DOC, closing a circuit to relay 9DOC. Relay 9DOC operates, locks and opens the circuit to the second winding of relay 8PT.

If the seven digits of the address have not yet been pulsed, the operation continues as described in the reference section, except instead of a terminal number translation, a code translation is made.

When the translator is ready to start the distant office translation, it returns ground via lead 17TRY closing a circuit to the second winding of relay 10TE, 10TA and 10TB. Relay 10TE operates and grounds appropriate leads of the group 10CD0–10CD7. Relay 10TA operates, closes the locking circuit of 10TE, 10TA and 10TB, and grounds appropriate leads of the group 10CA0–10CA7. Relay 10TB operates, grounds lead 10CT, and grounds appropriate leads of the groups 10CB0–10CB7 and 10CC0–10CC7. Further operation is similar to that described in a following section.

*Number Plan Area Call* (Same as listed for the section titled "Local Office Call")

If the pre-translation results in a number plan area translation, ground is returned via lead 17NPA, closing a circuit to the first winding of relay 9NPA. Relay 9NPA operates, locks, opens the circuit to the second winding of relay 8PT, and closes a circuit to relay 10FB. Relay 10FB operates. Further operation is similar to that described in the penultimate preceding section, except no other bandwidth but 4 kc. is supplied for this type of call.

*Pull Complete Signal* (Operated: Relays, for an "AND" call: 10TH, 10TB, appropriate ones of the storage relays 1EH0–1EH7, 2ET0–2ET7, 2EU0–2EU7, 3MF or 3DP, 3LC, 4AA, 3BB, 4BA, 4CH, 15MG (for MF calls only), 6DTC, 6SA, 6SK, 8PT, 9AND, 9CLC, 8DD, 7BS, 17BRI, 18BRA, appropriate ones of the storage relays of FIG. 16; for seven or ten digit "DOC" or "NPA" calls: 10TE, 10TA, 10TB, appropriate ones of the storage relays 1EH0–1EH7, 2ET0–2ET7, 2EU0–2EU7, 3MF, or 3DP, 3LC, 4AA, 3BB, 4BA, 4CH, 15MG (for MF calls only), 6DTC, 6SA, 6SK, 9NPA, or 9DOC, 9CLC, 8DD, 7BS, 17BRI, appropriate ones of the storage relays of FIG. 16).

When the translator completes the distant office code, number plan area code or abbreviated number translation and the "pull" is completed, the terminating marker returns ground via lead 11PDP or 11PNF closing a path to relay 12SM or to the second winding of relay 12SC respectively.

If MF outpulsing is required, relay 12SM operates, locks, closes a circuit to relay 21MFS, closes a path to the first winding of relay 9PCS, and closes a path to relay 12PR and the second winding of relay 11PP. Relay 12PR operates. Relay 11PP operates, opens the circuit of relay 12PR4, and closes a circuit to the second winding of relay 11PS. Relay 11PS operates, shunts its first winding, opens the circuit to relay 11PP, and shunts the first winding of relay 11PP. Relay 12PR restores. Relay 11PP restores, removes the shunt from its first winding, recloses a circuit to relay 12PR, and opens the circuit of relay 11PS. Relay 11PS restores and recloses the circuit to relay 11PP. Relay 12PR operates and the pulsing cycle continues as above. Relay 9PCS operates, for "NPA" calls closes a circuit to relay 24SKB, removes ground from lead 9CT2 or lead 9ANL, opening the circuit to the second winding of relay 10TE, 10TA and 10TB (for an NPA or DOC call) or to the second winding of relay 10TH and 10TB (for an ABN call), respectively, opens 15MG (for an MF call) opens 6SK, and removes resistance (relay 6SK) ground from lead 16AR. Relay 6SK restores, recloses the circuit to relay 6ATC to start timing the "stop sending" signal, opens leads 20LRTH from relay 20RTH, removes ground from lead 1TC or 1LC, opens lead 17FRL from the first winding of relay 6FRL, opens the circuit to relays 17BRI and 18BRA (for AND calls only), and opens lead 17PCA from lead 3PAH. Relays 17BRI and 18BRA restore and release the translator. Relay 21MFS operates and grounds lead 21SCA to close the motor magnet of 22OS via its interrupter springs 22OS1 and lead 21HM. Rotary switch 22OS steps self-interrupted to the first bank contact, removes ground from lead 21SCA opening the circuit to the motor magnet of rotary switch 5SS, and operates its off-normal springs 22OS3 closing a circuit via lead 21SC to relay 12SC. Relay 12SC operates, locks, and closes a circuit for relay 13PJ to pulsing ground from relay contacts 12PR1. Relay 13PJ operates. When relay 21PR restores, relay 12PK operates its first winding in series with relay 13PJ and grounds lead 13PHM. When relay 12PR operates, it closes the circuits to the second winding of relay 12PK and the first winding of relay 13PL in series. Relay 13PL operates, locks and opens the circuit of relay 13PJ and the first winding of relay 12PK. When relay 12PR restores, it opens the circuit to the second winding of relay 12PK and the first winding of relay 13PL. Relay 13PJ restores and opens the circuit to the second winding of relay 13PL. Relays 13PJ and 13PL restore. When relay 12PR operates, it closes a circuit to relay 13PJ. This pulsing cycle will continue as described above.

When the succeeding equipment is ready to receive pulses low resistance ground is returned via lead 13ECG closing a circuit to the first winding of relay 6PH. Relay 6PH operates, stops timing and closes a circuit to relay 13PE. Relay 13PE operates and locks. When relay 12PR4 operates and closes the circuit to the second winding of relay 12PK and the first winding of relay 13PL in series, relay 13PL operates, locks, and opens the circuit of relay 13PJ and to the first winding of relay 12PK. When relay 12PR restores, it opens the circuit to the second winding of relay 12PK and the first winding of relay 13PL. Relay 13PJ restores and opens the circuit to the second winding of relay 13PL. Relay 13PL restores. Relay 12PK restores and closes a circuit to relay 13PF. Relay 13PF operates, locks via its "X" contacts 13PF4, and closes lead 21KPP at contacts 13PF9 to close a circuit to relay 31KPS. Relay 21KPS operates and closes appropriate ones of the tones for example leads 1100 and 1700 to the line. When relay 12PR operates, it closes a circuit to relay 13PJ. The operation continues as described above, except when relay 12PK operates, it closes ground to lead 23CK closing a circuit to the motor magnet of rotary switch 22OS. When relay 12PK restores, it removes ground from lead 23CK, stepping the wipers of rotary switch 22OS to the second bank contacts. If the call was a seven digit (DOC) call, ground via leads 15E and 15F close circuits to relays 23S2 and 23S4. Relays 23S2 and 23S4 operate, and close a path to relay 23MFK via lead 23OK, when ground is closed to lead 23CK. Relay 23MFK operates, closes a circuit to the first winding of relay 23SE and to the motor magnet of rotary switch 22OS in series, and closes leads 1100 and 1300 to the line. Relay 22SE operates and closes the locking circuit to relays 23S2 and 23S4. When ground is removed from lead 23CK, relay 23MFK restores, removes the M.F. tone circuit from the line, and opens the circuit to the motor magnet of rotary switch 22OS and to the first winding of relay 22SE. Relay 22SE restores and opens the circuits to relays 23S2 and 23S4. Relays 23S2 and 23S4 restore. Rotary switch 22SS steps its wipers to the third bank contacts. When ground is closed to lead 23CK, relays 23S1 and 23S4 operate and the operation continues as described above until the entire address is sent and the wipers of rotary switch 22OS step to bank nine. The next ground pulse via lead 23CK closes a circuit to relay 21STS to indicate end of sending. Relay 21STS operates, closes the circuit to the motor magnet of rotary switch 22OS, and closes leads 1500 and 1700 to the line. When ground is removed from lead 23CK, the circuit to relay 21STS is opened. Relay 21STS restores, opens leads 1500 and 1700 from the line, and steps the wipers of rotary switch 22OS to the tenth bank contacts to ground lead 21NRL to close a path to relay 4EN.

If DP outpulsing is required, relay 21SC operates, locks, and closes a circuit to relay 14SDP, and closes another circuit to the first winding of relay 9PCS. Relay 14SDP operates, closes circuits to the second winding of relay 11PP and relay 12PR, and closes ground via the wiper of level C of rotary switch 22OS lead 21OSN and lead 21HM to the motor magnet of rotary switch 22OS via its interrupter springs 22OS1. Rotary switch 22OS steps self-interruptedly to bank contact one, operates its off-normal springs and recloses the circuit to the motor magnet of rotary switch 22OS via its interrupter springs. Rotary switch 22OS steps its wipers self-interruptedly to the third bank contact. If this is a seven digit call two of the five relays 23S0–23S7 are operated. The pulsing scheme and "go" signal of relays 11PS, 11PP, 12PR, 13PJ, 13PL, 12PK, 13PE, 13PF, and 6PH is similar to that for MF outpulsing. Relay 9PCS operates as described for MF outpulsing. Relays 23S2 and 23S4 operate and ground leads 23S2 and 23S4. Relay 12PK operates and grounds via lead 23CK, the two out of five checking circuit, lead 23OK and lead 8 closes a path to the first winding of relay 14PA. Relays 14PA–14PF operate in a manner similar to that described in the earlier section titled "DP Adressing," except in this case the leads 5 and 6 are checked for "stopping ground." Relay 12PR pulses resistance battery via lead 13ECG. When ground via leads 23S2 and 23S4 are closed to leads 14L5 and 14L6 (relays 14PE and 14PF operated), the relay 13PC circuit is closed. Relay 13PC operates, closes steady resistance battery to lead 13ECG, and closes the circuit to relay 13PB. Relay 13PB operates, locks, opens the circuit to relay 13PE, opens the circuit to the second winding of relay 6PH, and extends ground to close a circuit to the first winding of relay 22SE in series with the motor magnet of 22OS. Relay 13PE restores, opens the circuit of operated relays 14PA–14PF, and also opens the circuit to relay 13PF. Relay 22SE operates and closes a locking ground to the operated ones of the relays 23S0–23S7. Relay 13PE restores and closes a circuit to relay 13PG. Relays 14PA–14PF restore and open the circuit to relay 13PC. Relay 13PG operates, locks, opens the circuit to relays 13PC and the first winding of relay 22SE and the motor magnet of 22OS. The next time relay 12PK restores, relay 13PF is closed. Rotary switch 22OS steps its wipers to the next bank contacts. Relay 22SE restores and opens the circuit to the 23S0–23S7 relays corresponding to the first digit and closes a circuit to the 23S0–23S7 relays corresponding to the second digit. Relay 13PC restores and opens the circuit to relay 13PB. Relay 13PF operates, locks via its "X" contacts 13PF4, closes ground to relay 21KPS (13PK operated), and closes a circuit to the first winding of relay 14PA (13PK restored). The 14PA–14PF relays are pulsed as previously described until relay 14PE operates and opens the circuit to relay 13PB. Relay 13PB restores, opens the circuit to relay 13PG, and closes the circuit to the second winding of relay 6PH. Relay 13PG restores, opens the circuit to relay 13PF, and opens the circuit to relay 14PE. Relay 13PF restores, reopens the circuit to the second winding of relay 6PH, and the next operation of relay 12PK closes a circuit to relay 13PE. The other digits are pulsed in a similar manner. When rotary switch 22OS steps its wipers to bank terminal nine, ground via lead 21NRL closes a circuit to relay 4EN.

Relay 10TH restores, removes ground from lead 10AN, and removes ground from marked leads of the group 10CD0–10CD7. Relay 10TB restores and removes ground from marked leads of the group 10CB0–10CB7 and 10CC0–10CC7.

Relay 10TA restores, removes ground from lead 10CT, and removes ground from marked leads of the group 10CA0–10CA7. Relay 10TE restores and removes ground from marked leads of the group 10CD0–10CD7. Relay 10TB restores and removes ground from marked leads of the group 10CB0–10CB7 and 10CC0–10CC7.

Relay 15MG restores and opens the circuit from the M.F. receiver. Relay 6SK restores, grounds lead 6GR, recloses the circuit to relay 6ATC, opens lead 20LRTH from relay 20RT, removes resistance 6R22 battery from leads 16FR and 17FRL, removes ground from lead 17LC to release the translator, opens the circuits to relay 18BRA and 17BRI, and opens lead 3PAH from lead 17PCA. Relay 6ATC reoperates. Relay 17BRI restores and releases the translator and the terminating marker commons. Relay 18BRA restores and opens the translator commons.

Ticketer connected

After the ticketer is seized, it returns ground via lead 20LRTH to close a circuit to relay 20RTH. Relay 20RTH operates, closes paths to relays 19TH2, 20ABC and 19AAG for NPA calls, closes path to relay 20BBC for abbreviated number plan area calls, closes 19ADK for ABN or NPA calls, closes 19AAG for DOC calls (non-abbreviated), and closes 20TH1. Relay 20TH1 operates, closes the equipment number leads to the register commons, closes the locking circuit of relay 20RTH, ground lead 20DTC, closes ground via relay 20FDH to lead 17MHC, grounds two of the five leads 20D0–20D7 to identify the register, closes a circuit to the second winding of relay 6FRL, and grounds two of the five 20CL0–20CL7 leads or lead 20SP to indicate the class of service. Relay 19TH2 operates. For an abbreviated number or number plan area call, relay 19ADK operates or for a seven digit distant office call relay 19AAG operates and closes ground to two of the five leads in each of the groups 19A0–19A7, 19B0–19B7, 19C0–19C7, 19D0–19D7, 19E0–19E7, 19F0–19F7 and 19G0–19G7. For a number plan area call, relays 20ABC and 19AAG also operate and close the area code digits to the ticketer via the register commons. For an abbreviated number plan area call, relay 20BBC operates and closes the reconstituted area code digits to the ticketer. Relay 6FRL operates and locks.

After the ticketer has had sufficient time to receive the information from the register, it removes ground from relay 20RTH. Relay 20RTH restores, opens the circuit to relays 19TH2, 20ABC and 19AAG (NPA calls), opens 20BBC (abbreviated NPA calls), opens 19ADK (ABN or NPA calls), 20TH1, and removes resistance ground from lead 17MHC. Relays 19TH2, 20ABC, 19AAG, 20BBC, 19ADK and 20TH1 restore opening the register-ticketer common highway.

*Release* (Operated: Relays, selected ones of the groups 1EH0–1EH7, 2ET0–2ET7, and 2EU0–2EU7, 3MF or 3DP, 3LC, 4AA, 3BB, 4BA, 4CH, 12SM or 12SC, 6FRL, 6DTC, 6SA, 8PT, (AND calls only, 8GD (7 digit calls only), 8KD (10 digit calls only, 9PCS, 9AND (AND calls only), 9NPA (NPA calls only), 9DOC (seven digit DOC calls only), 9CLC, 8DD, 7BS, operated ones of the address and routing storage groups, 21MFS (MF outpulsing only), 19ADK (ABN or NPA calls only) and possibly 11PS, 11PP, 12PR, 12SM, 12SC, 12PK, 13PL, 13PJ, 13PE, 13PF, 14SDP (DP outpulsing only).)

Relay 4EN operates, locks, closes a circuit to the second winding of relay 4TS, removes resistance 4R5 battery from lead 3ESH, and closes the 1200 cycle continuous tone source to the calling line as enabling tone. Relay 4TS operates, opens the circuit of relay 4EN. After its slow-to-release interval, relay 4EN restores, opens the circuit to the second winding of relay 4TS, removes the 1200 cycle tone source from the calling line, closes low resistance 4R5 battery to lead 3ESH to indicate switch-through, and opens the circuit to relay 4AA. Relay 4AA restores, opens the circuit to relay 4BA, and closes the circuit to relay 13PJ. Relay 13PJ operates and closes a circuit to relay 12CA. Relay 4BA restores, removes the short circuit from the first winding of relay 4TS, opens the circuits to the second winding of relay 3BB, and to relay 7BS, removes the locking ground from the equipment storage relays 1EH0–1EH7, 2ET0–2ET7, 2EU0–2EU7, and opens the circuit to relay 3MF or 3DP and of relays 3LC, and 4CH. The equipment storage relays restore. Relay 3MF or 3DP restore. Relay 3LC restores, removes ground from lead 4SK, and opens lead 4INT from lead 4SS1. Relays 4TS remains operated on its first winding. Relay 3BB restores, opens the circuit to relay 13PJ, opens the circuits to relays 6DTC, 12SM and 12SC, and closes the circuit to the motor magnets of rotary switches 5SS and 22OS via its interrupter springs 22OS1 and the first winding of relay 4TS. Relays 12SM (if operated) and relay 12SC restore and open the circuit of relay 21MFS or 14SDP. Relays 21MFS or 14SDP restore. The rotary switches 5SS and 22OS "home" and further release is similar to that described in the section titled "Release."

*Trunk to Trunk*

SEIZURE

Seizure is similar to that described in the earlier section similarly titled.

ADDRESSING

Addressing is similar to that described in the earlier section similarly titled.

TRANSLATOR ASSIGNED

The operation is similar to that described in the earlier section titled "Translator Assigned."

PRE-TRANSLATION

The operation is similar to that described in the earlier section titled "Pre-Translation," except no abbreviated number translation can be received.

DISTANT OFFICE CALL

The operation is similar to that described in the section for a "Number Plan Area Call."

NUMBER PLAN AREA CALL

The operation is similar to that described in the earlier section for a "Number Plan Area Call."

PULL COMPLETE SIGNAL

The operation is similar to that described in the section titled "Pull Complete Signal," except 3TC is operated instead of 3LC. Also for tandem calls, when rotary switch 5SS steps to bank position 6 a circuit to relay 8DD is closed. Relay 8DD operates, locks, transfers relay 8GD and 8KD to the succeeding bank contact positions of rotary switch 5SS.

If rotary switch 22OS steps its wipers to bank terminal 6 before relay 8GD operates, a circuit to the second winding of relay 22SKP is closed. Relay 22SKP operates, closes a circuit to the second winding of relay 22SE, and opens the circuit to relay 13PE. Relay 22SE operates its "X" contacts 22SE7, closing the locking ground for the 23S0–23S7 relays, operates fully and opens the circuit to the wipers of rotary switch 22OS from the 23S0–23S7 relays. Relay 13PE restores and stops sending pulses via lead 23CK.

When relay 8GD operates, the circuit of relay 22SKP is opened. Relay 22SKP restores, recloses the circuit to relay 13PE to start sending pulses again via lead 23CK, and opens the circuit to the second winding of relay 22SE. Relay 22SE restores, removes the locking ground from the 23SO–23S7 relays, and recloses the wiper of rotary switch 22OS to the 23S0–23S7 relays.

RELEASE

Release is similar to that described in the earlier section by the same title except relay 3TC is operated instead of relay 3LC.

ASSISTANCE OPERATOR

The operation is the same as for another line or trunk call up to dialing. If the first digit dialed is "0," relay 8ZO and the first winding of relay 8PT circuits are closed via the contacts of the address and routing storage relays. Relay 8ZO operates, locks, closes a circuit to the second winding of relay 8DD, and closes a circuit to relay 6SA. Relay 8PT operates, locks, and grounds lead 17ZO to call for an assistance operator translation. Relay 6SA operates as described in the section titled "Addressing" to call for a translator. The register returns ground via lead 17NT closing a circuit to relay 20NT. Relay 20NT operates and locks.

When the "pull" is completed, release will take place in the usual manner, except resistance 20R30 battery is on lead 20DTC instead of ground.

*Time Out*

DIALING TIME OUT

When relay 6DTC operates before addressing begins, the circuit to relay 7T1 is closed. Relay 7T1 operates and closes a circuit to relay 7TM. Relay 7TM operates, locks, closes a circuit to the second winding of relay 7T1 via its "X" contacts 7T11, opens the circuit to the first winding of relay 7T1 and closes relay 6TP to lead 60 IPM. Relay 6 TP operates from the ground pulses and pulses the rotary switch 7TSW. As long as relay 6DTC remains operated, rotary switch 7TSW continues to step its wipers once every second.

If the first digit is not pulsed before rotary switch 7TSW steps its wipers to bank contact N and relay 6TP operates, a circuit to relay 6DTO is closed. Relay 6DTO3 operates, locks, opens lead 17TRY from lead 9PTO, grounds lead 17TT to call for trouble translation, closes the circuit to relay 6SA, short circuits relay 3DT. Relay 6SA operates, opens the circuit to the first winding of relay 6ATC and closes the second winding of relay 6ATC in magnetic opposition, grounds via 6SK to lead 16AR to call for a translator, and closes a circuit to the first winding of relay 11AF.

Relay 11AF operates, locks via its "X" contacts, closes lead 5AF to lead 16AT, and closes the circuit of relay 4SL to the "A" level wiper of rotary switch 7TSW. Relay 6ATC restores, opens the circuit of relay 7TM, and removes ground from lead 16AT before an assigner transfer takes place. Relay 6TP restores and opens the circuit to the motor magnet of rotary switch 7TSW. Rotary switch 7TSW steps its wipers to bank contact one. When a translator is assigned, relay 6SK operates, as described in the section titled "Translator Assigned." Relay 7TM restores and opens the circuit to relay 7T1. Relay 7T1 restores.

The terminating marker returns ground via lead 17FRL closing a circuit to the first winding of relay 6FRL. Relay 6FRL operates, locks via its second winding, opens the circuit of relay 6SK, closes the circuit to relay 4EN (line calling) or to the second winding of relay 4TS (trunk calling) via ground on lead 1NRL, opens the circuit to relay 17BRI, and opens lead 17PCA from lead 3PAH. Relay 6SK restores, opens lead 17FRL from the first winding of relay 6FRL, recloses a circuit for relay 6ATC, and removes ground from lead 1TC or 1LC. Relay 17BRI restores and opens the register-translator commons. Relays 4EN and/or 4TS restore and release is similar to that described in the earlier sections titled "release."

Ten seconds are allowed between registrations of succeeding digits, if a longer period is taken, a time out occurs as described above.

If the ten seconds is not exceeded, after every digit relay 6DTC restores momentarily, and opens the circuit to relay 7TM. Relay 7TM restores, opens the circuit to relay 6TP from lead 60 IPM, and opens the operated relays of the group 7T1–7T7. The operated relays of the group 7T1–7T7 restore. Relay 6DTC reoperates and closes the relays of the group 7T1–7T7 corresponding to the banks on which the wipers of level C and level D of rotary switch 7TSW rest. Relays of the group 7T1–7T7 operate and close a circuit to relay 7TM and timing continues for another ten second period.

ASSIGNMENT TIME OUT

When calling for assignment of a translator, relay 6SA operates, momentarily opens the circuit of relay 6ATC3, and closes ground via relay 6SA to lead 16AR. Relay 6ATC restores and opens the circuit of relay 7TM. Relay 7TM restores, opens the circuit of relay 6TP from lead 60 IPM, and opens the circuits to relays of the group 7T1–7T7 which restore. Relay 6ATC reoperates and closes the relays of group 7T1–7T7 corresponding to the bank on which the wipers of level C and level D of 7TSW rest. Relays of the group 7T1–7T7 operate and close a circuit to relay 7TM. Relay 7TM operates, locks and closes the circuit of relay 6TP to lead 60 IPM. Rotary switch 7TSW steps its wipers once every second as described.

If a translator has not been assigned (i.e. relay 6SK has not been operated) after ten seconds relay 6TP reoperates and grounds lead 5AF to close a circuit to relay 11AF. Relay 11AF operates its "X" contacts, locks, operates fully and grounds lead 15AT. Ground on lead 16AT calls for an automatic transfer to the standby translator-assigner.

When relay 6TP restores, the rotary switch 7TSW steps its wipers to the next bank contacts and timing continues as described.

If the register is still not assigned after the rotary switch steps its wipers for the tenth time (relay 6TP restored), ground on lead 5TPB closes a circuit to the first winding of relay 4SL. Relay 4SL operates, locks via its second winding, closes a circuit to the second winding of relay 4TS.

The circuit releases similar to a trunk calling, except low resistance 4R5 ground is not closed to lead 3ESH and relays 4SL and 11AF release when relays 3BB and 7BS restore.

STOP SENDING TIME OUT

After relay 6SK restores relay 6ATC reoperates as described in the preceding section and rotary switch 7TSW steps its wipers once every second as described in the pen-ultimate preceding section.

If the "wait" or "stop send" signal is not removed before rotary switch 7TSW steps its wipers ten times and relay 6TP reoperates, ground via lead 3ARL closes a circuit to the first winding of relay 4SL. Relay 4SL operates, locks via its second winding, closes a circuit to the second winding of relay 4TS.

The circuit releases similar to a trunk calling, except low resistance 4R5 ground is not closed to lead 3ESH and relay 4SL releases when relay 3BB restores.

OUTPULSING FAILURE

A two-out-of-five parity check is made for outpulsing should a fault exist ground is closed to lead 3ARL via the level H of rotary switch 22OS to close a circuit to the first winding of relay 4SL. Relay 4SL operates, locks via its second winding, closes a circuit to the second winding of relay 4TS, prevents low resistance ground from being closed to lead 3ESH. Relay 4TS operates and releases is similar to that described in an earlier section.

If an overrun is detected (train of 11 pulses), when relay 12PK operates, it closes ground to leads 23CK, 23OK, the contacts of 14PD10 and 14PE16 to close a circuit to the second winding of relay 4SL. Relay 4SL operates as described above.

CODE CONVERSION

The register can be wired to accept special instructions from the translator, if variation from the standard outpulsing pattern is required. The relays 24SK1–24SK4 could provide the following variations:

(1) Delete first three digits of 7 digit number, substitute converted code supplied by translator (relay 24SK2 operated).

(2) Delete first three digits of 10 digit number (relay 24SK4 operated).

(3) Delete entire address, send 3 digit routing supplied by translator (relay 24SK3 operated).

NOTE: As a possible aid in the understanding of outpulsing the following information is added concerning the banks of rotary switch 22OS used for outpulsing:

(1) Bank positions 2–8 are connected to the leads corresponding to routing storage relays 16AD0–16AK7 (i.e. 19ADK operated) and are used for AND distant office calls.

(2) Banks 2–8 are also connected to leads corresponding to routing storage relays 16AA0–16AG7 (i.e. 19AAG operated) and are used for DOC calls.

(3) Banks 12–14 are used for routing digits supplied by the translator and are used for converted codes.

(4) Banks 15–24 are used for NPA calls.

Relay 22SKP is closed either by its first winding from level A of rotary switch 22OS or by its second winding from level A bank position 6 of rotary switch 22OS (relay 8GD not operated). Relay 22SKP operates, opens the circuit to relay 13PE, and closes a circuit to the first winding of relay 22SE. Relay 22SE operates its "X" contacts to lock the operated relays of the group 23S0–23S7, operates fully, opens the 23S0–23S7 relays from the wipers of rotary switch 22OS, and closes the motor magnet of rotary switch 22OS via its interrupter springs 22OS1. Rotary switch 22OS steps its wipers "self-interruptedly" to the next bank contact.

Rotary switch 22OS continues to step "self-interruptedly" until the circuit to relay 22SKP is opened. Relay 22SKP restores, opens the circuit to the motor magnet of 22OS, opens the circuit to the first winding of relay 22SE, and closes a circuit to relay 13PE. Relay 22SE restores, recloses the 23S0–23S7 relays to the wipers of rotary switch 22OS, and removes the locking ground from the 23S0–23S7 relays.

48KC BANDWIDTH REQUESTED

If a 48KC bandwidth is requested, the translator returns ground via lead 17KCR after the path is completed. Ground via lead 17KCR closes a path to operate relay 12KCR. Relay 12KCR operates, locks and closes high resistance 12R6 battery to lead 3ESH, calling for combining the order wire circuit (about 4KC) and the 48KC circuit into the same path through the switching matrix.

RELEASE FROM AN ABANDONED CALL

Should the calling party abandon the call, resistance battery is removed from lead 3ECH opening the circuit to relay 4AA. Relay 4AA restores and release of the circuit is similar to that described in the "Release" sections.

FORCED RELEASE OF THE TICKETER

If the ticketer is not released by the register (i.e. 20RTH operated), when resistance battery is returned via lead 17MHC from the terminating marker then a circuit is closed to relay 20FDH. Relay 20FDH operates its "X" contacts and locks, operates fully and opens the circuits to relays 19TH2, 20ABC, and 19AAG (NPA calls only), 20BBC (abbreviated NPA calls only) and 20TH1. Relays 19TH2, 20ABC and 19AAG or 20BBC and 20TH1 restore as described in the section titled "Ticketer Connected," except when 20TH1 restores it also opens the circuit of relay 20RTH. Relay 20RTH restores and opens the circuit of relay 20FDH. Relay 20FDH restores.

FORCED RELEASE

Either the terminating marker or the translator can force the register to withdraw and release by ground via lead 17FRL or 16FR, respectively, closing a circuit to the first winding of relay 6FRL. Relay 6FRL operates as described in the section titled "Dialing Time Out" and the circuit releases.

APPENDED DIGITS

A digit appended to a 3, 7 or 10 digit address will cause rotary switch 5SS to step its wipers to the next bank contact causing relay 8DD to restore. Relay 8DD restores and (provided the final routing has not been made (i.e. 9PCS not operated)) grounds lead 17TT to call for a trouble translation.

If this was a ten digit trunk call using MF pulsing the appended digit will also close a circuit to relay 5TT. Relay 5TT operates, locks and opens the circuit to the motor magnet of 5SS to prevent it from stepping further.

BUSY KEY AND PULSE TEST

The circuit can be manually marked busy by transferring the key from IN SERV. to BUSY, grounding lead 1DR and closing lead 1CH1 to lead 1CH0.

TRANSLATOR

*Line to line call*

SEIZURE

This circuit is seized by ground via lead 17LC from the register-sender and ground via lead 25TST from the translator assigner. The translator control circuit returns ground on lead 17TRY, resistance ground on lead 25CLH, to the assigner and battery to lead 17TT.

PRE-TRANSLATION

Ground on lead 17TRY to the register causes a ground mark to be sent back on lead 10PT to close a circuit to relay 25PT, calling for pre-translation. The register also returns ground via appropriate ones of the leads CA2, CA7, CB0–CB7 and CC0–CC7 to the hundreds, tens and units decoding relays, respectively, indicating the first three digits of the called number. The selected ones of these relays operate and close an operating path to the corresponding decoded decimal relay. The units and tens decimal relays operate. Relay 25PT operates, locks via its second winding, closes ground from the control circuit, lead PT–ATC, through the units decoding relay contacts and the tens decoding relay contacts to one of the leads C11A to C00A, and closes the hundreds relay selected lead ground to the appropriate one of the PT1 through PT9 relays. The selected one of the PT1–PT9 relays operate, and close ground via the selected tens decoding relay leads to a selected lead to the pre-translation cross-connect-field. This lead is cross connected to either leads 27LOC or 27ANA to give either a local office code or an abbreviated number pre-translation to the register. Resistance battery over one of the above-mentioned leads will complete a circuit in the translator control circuit 25C to remove ground from lead 17TRY.

The pre-translation mark causes the register to remove ground from leads 10PT, the marked CA0–CA7, CB0–CB7, CC0–CC7 leads, the circuit to the first winding of relay 25PT and the decoding relays respectively. The decoding relays and the operated decimal relays restore. The marked hundreds relay restores, opens the circuit to the second winding of relay 25PT, and removes ground from the marked hundreds lead opening the circuit of the operated PT1–PT9 relays. These relays restore, remove the ground from the selected lead and hence the pre-translation lead to which it is cross connected. The tens and units decoding relays restore. Relay 25PT restores. A relay in the control circuit 25C restores in response to this and grounds lead 17TRY to the register. Another relay in the translator control circuit 25C restores and removes ground from lead 17AND (for abbreviated number calls only).

EQUIPMENT NUMBER TRANSLATION

Ground returned to the register via lead 17TRY results in ground returned to leads EN, marked pairs of the CA0–CA7, CB0–CB7, CC0–CC7 and CD0–CD7 leads to close circuits to relay 25EN, the units, tens and hundreds decoding relays and the bandwidth decoder relays. The hundreds decoder relays operate and close a circuit to an appropriate decimal hundreds relay of the group 25H1–25H10. The tens decoder relays operate and close a circuit to an appropriate tens decimal relay of the group 26T1–26T10. The units decoder relays operate and close a circuit to an appropriate units decimal relay of the group 26U1–26U10. The bandwidth decoder relays operate and close a circuit to one of the 29F1–29F0 relays. Relay 25EN operates. The selected hundreds relay operates, closes a circuit to the second winding of relay 25EN, and grounds corresponding leads to the contacts 25EN5–25EN15 to close an operating path for the corresponding ones of the 27HEN1–27HEN10 and the 29HEN1–29HEN10 in parallel. Assuming relay 29F2 is selected to operate in the bandwidth checking circuit 29C and the tens and units decimal relays operate, close leads 25TCK and 25UCK, respectively, and close ground via leads 25DOA, 25DOB and 25DOC to appropriate ones of the leads in each of the groups 26C11A–26C00A, 26C11B–26C00B and 26C11C–26C00C. Selected ones of the relays 29HEN1–29HEN10 and 27HEN1–27HEN10 operate, and forward ground via the marked ones of the leads in the groups 26C11A–26C00A, 26C11B–26C00B and 26C11C–26C00C to the equipment number bandwidth 29A cross-connect field, the class of service cross-connect field 29B and to the abbreviated number group cross-connect field 27C respectively.

For this description for the sake of clarity, it is assumed the calling party subscribes to: a bandwidth of 16KC, a class of service of 4 and belongs to the abbreviated number group 1.

Ground on one of the leads 26C11A–26C00A is closed via a strap to lead 16KC to lead 16KC of 29FC to close a path to lead 29FCK (since the 4KC requested is not more than the 16KC subscribed to). A relay in the control circuit 25TC operates, grounds leads 25MST and 25MLC to start the terminating marker, and grounds lead SCG and locks the 30AR relay circuit in the state that it is in at this time, to indicate the idle trunk groups.

Ground on one of the leads 26C11B–26C00B is closed via a strap in the cross-connect field 29B and through 30CL4. The class of service control circuit completes a path to relay in the class of service selection circuit 30CS. Relay 30CL4 operates.

For a call which is not an abbreviated number call, a relay in the control circuit 25TC operates, from lead 29C1H and grounds lead 17CLC to indicate to the register "classing complete" indicating the bandwidth requested is within the calling party's capability.

For an abbreviated number call, ground on one of the leads 26C11C–26C00C is closed via a strap in the abbreviated number group cross-connect field 27C to a lead to close a circuit to relay 27ANG. Relay 27ANG operates, locks. A relay in the translator control circuit operates in response to a mark on lead 27ANH and grounds lead 17CLC to indicate to the register "classing complete" indicating the bandwidth reported is within the calling party's capability, and removes ground from lead 17TRY to the register.

The "classing complete" mark causes the register to remove ground from lead EN and the marked ones of the leads in groups opening the circuit to the first winding of relay 25EN, operated relays of the hundreds, tens and units decoding relay groups and also the operated relays of the bandwidth decoder group 29BD. These relays restore and open the circuits to the corresponding decimal relays. The hundreds decimal relay of group 25H1–25H10 restores, and opens the circuit to the relays of the group 2HEN1–27HEN10. The bandwidth checking relays of the group restore and open the circuit to the corresponding decimal relay. The tens and units decimal relays restore, and remove ground from leads in the groups 26C11A–26C00A, 26C11B–26C00B and 26C11C–26C00C and hence from their corresponding relays, resulting in the removal of ground potential from leads 17CLC and 17TRY to the register.

ABBREVIATED NUMBER TRANSLATION

In this description it is assumed for clarity the abbreviated number for this particular calling party to reach the called party is 234.

After receiving ground via lead 17TRY, the register returns ground via leads AN, marked ones of the groups 25CB0–25CB7, 26CC0–26CC7 and 30CD0–30CD7 to close circuits to corresponding decoding relays. Relay 25AN operates, closes a circuit to relay 29BWC and grounds a lead at contact 25AN2 to close the circuit to relay 27AN. Relay 27AN operates. The tens decoder relays operate and close a circuit to decimal relay 26T3. The units decoder relays operate and close a circuit to decimal relay 26U4. The bandwidth decoder relays operate and close a circuit to bandwidth relay 29F2. Relay 29F2 operates. Relays 26T3 and 27U4 operate, close leads TCK respectively, and extend ground via said relays in the control circuit 25TC through leads AN–ATC and AN–BTC, contacts of the units decimal relay, contacts of the tens decimal relay and through the contacts of relay 27AN to the cross connect fields 28OCC and 28TNC, respectively. Ground via a strap in the field 28OCC is closed to one of the "OCT" leads (assume lead OCT–1) to close a circuit to relay OCT1. Ground via a strap in the field 28TNC is closed to one of the "TNT" leads (assume lead TNT–25) to close a circuit to relay 28TNT. Relay 28OCT operates, closes lead 28OCG to lead 25OCL, and grounds leads corresponding to the strapping to give the reconstituted office code to the register-sender. Assuming the office code is 650, ground is strapped to leads AD2, AD4, AE1, AE4, AF4 and AF7. Relay 28TNT (not shown) operates and grounds leads corresponding to the strapping to give the reconstituted terminal number. Assuming the terminal number is 134, ground is strapped to leads AH0, AH1, AJ1, AJ2, AK0 and AK4. Relay 29BWC operates, grounds a lead to close a circuit to relay 29BW2A. A pair of relays in the control circuit 25TC operate, and ground a lead which marks the bandwidth requested in the reconstituted called number, and closes ground via a lead 28OCG, to lead 28OCL1 to the cross connect field 29CTC and removes ground from lead 17TRY. Lead 29OCL1 is strapped to lead LOC.

The local office code mark causes the register to remove ground from the leads to the relays 25AN, the tens, units and bandwidth decoding groups. The relays restore and return ground over lead 17TRY to the register.

TERMINAL NUMBER TRANSLATION

If the call is an AN call, lead 28OCL1 is strapped to lead LOC, and ground, via lead 28OCL1 as described in the penultimate preceding section is closed to lead LOC to indicate a local call.

If it is not an AN call after addressing is completed, the register recalls the translator.

Figure 29:
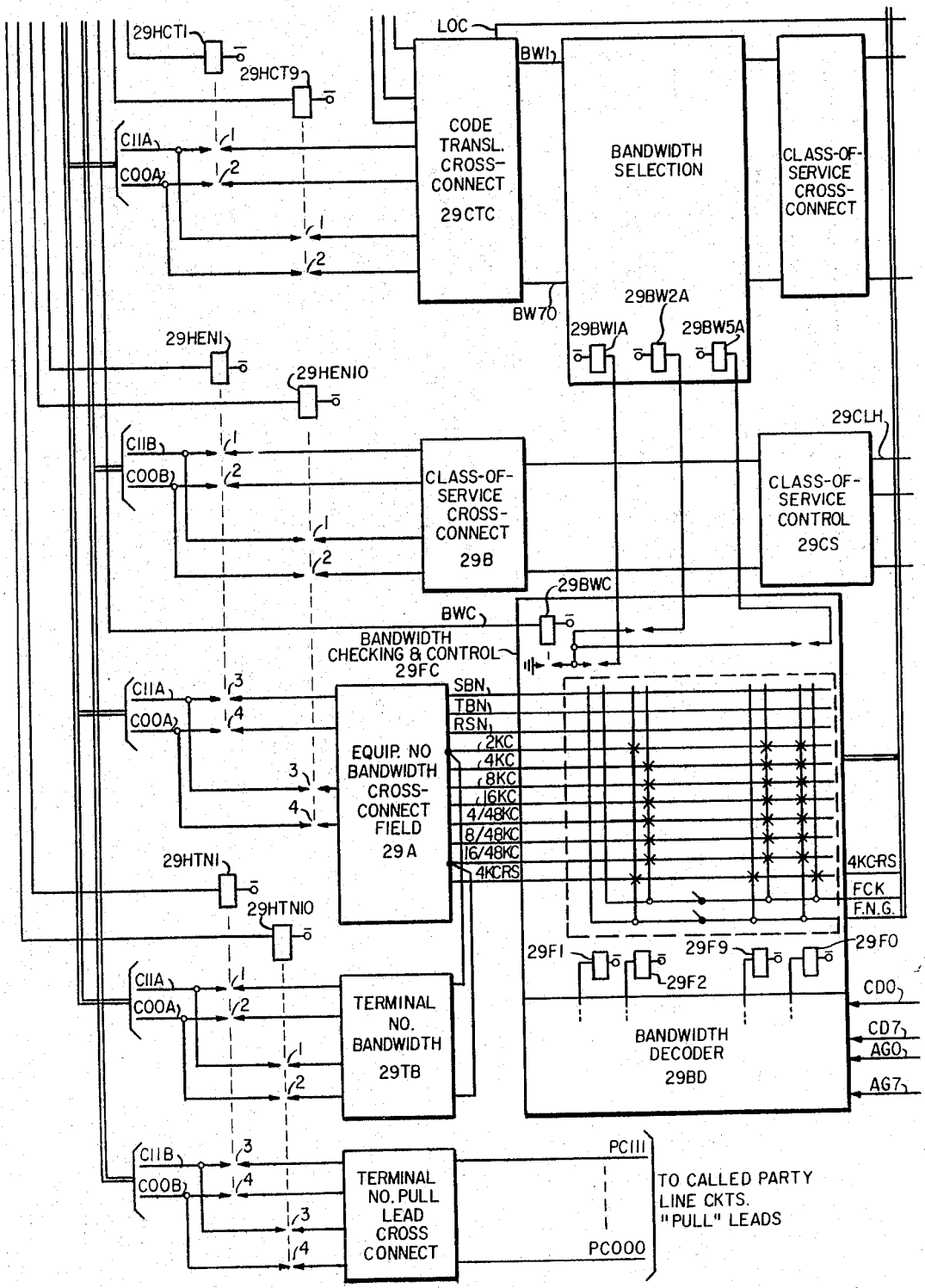
Figure 30:
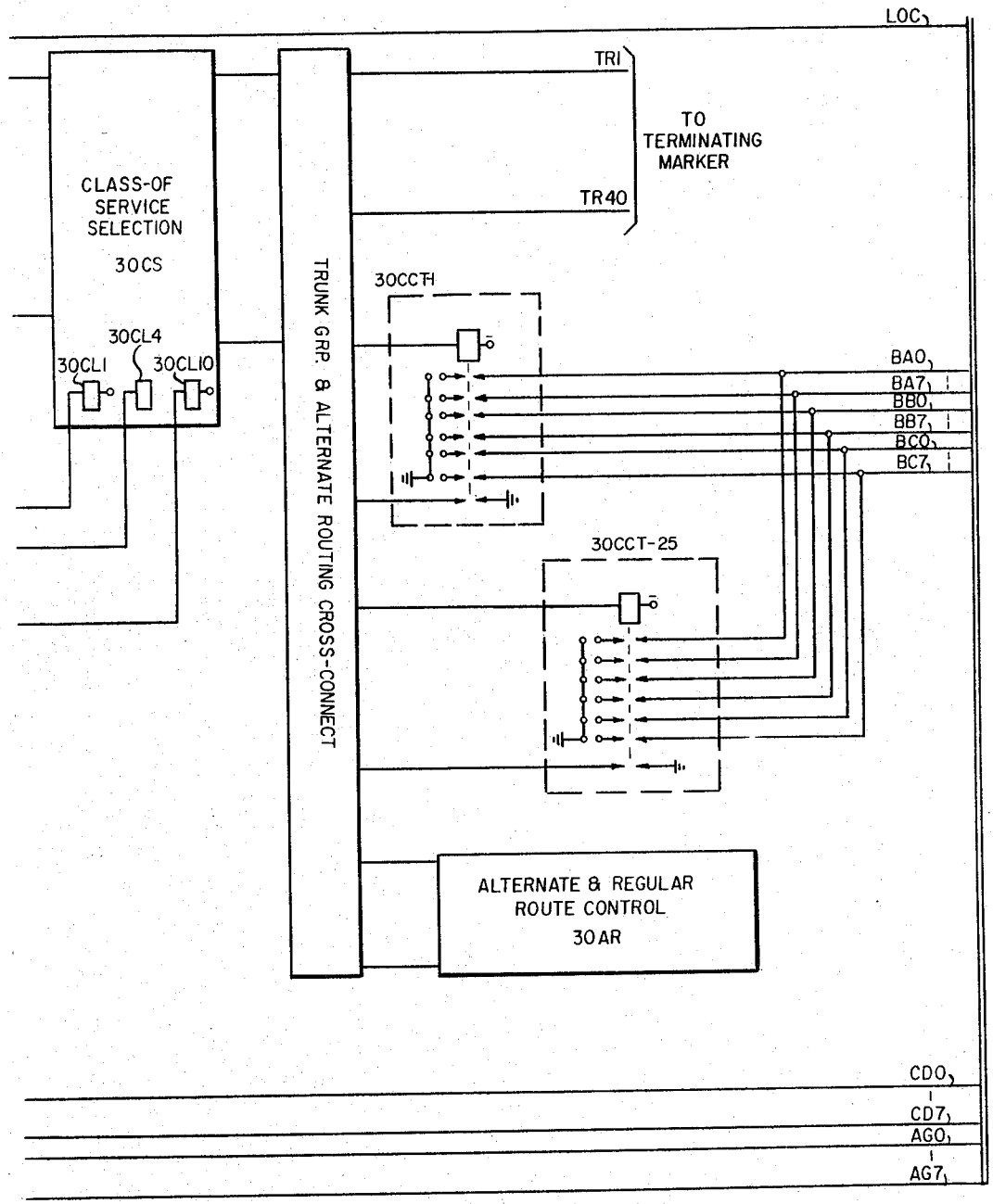

In any case, ground via lead 17TRY causes the register to return ground via the lead 10TN and the hundreds, tens units and bandwidth code leads to operate the associated relays. The associated relays operate. The hundreds relay H1 operates, closes a circuit to the second winding of the 25TN relay and extends ground at contacts 25H1–10. The tens and units relays 26T3 and 26U4 operate, close 25TCK and 25UCK leads, respectively, closes lead LLP from the terminating marker through the control relays circuit 25TC to lead 25AN–BTC to one of the leads in each of the groups C11A–C00A and C11B–C00B. Relay 29F2 operates in the bandwidth circuit 29FC. Relay 29TN1 operates and extends ground via lead C34A to a lead (assuming the called party subscribes to 4KC service) via a strap from terminal number bandwidth cross connect field 29TB to lead 4KC, lead FCK to indicate an allowable bandwidth, and grounds lead LTC to indicate to the terminating marker a "line terminating complete." Resistance battery from the "path complete" relay in the terminating marker via lead LLP is closed to lead 25TN–BTC to the "PC" lead, FIG. 29 of the called line circuit. (NOTE: If a 48KC bandwidth is requested, i.e. 29F9 operated, ground is closed to lead KCM to operate a relay in the terminating marker circuit.) A relay in the control circuit 25TC operates and removes ground from lead 17TRY.

The "path complete mark" causes the register to remove the marking grounds from the various marked leads. The relays corresponding to the marked leads restore, open lead LLP from lead 25TN–BTC, and ground lead 17TRY.

RELEASE

The register sender, after receiving a signal from the terminating marker indicating the pulsing required (in this case "no outpulsing"), removes ground from lead 17LC causing the translator control relays 25TC to remove ground from lead MST to stop timing in the terminating marker. The remaining operated relays restore. The circuit is now at normal.

*Trunk to line call or trunk*

The operations for a trunk originated call are the same as described in the preceding sections for a line to line call.

*Line to trunk call*

PRE-TRANSLATION

The operation is the same as described in the preceding similarly titled sections except that the signal to the register would be for a number plan area, distant office code or an abbreviated number pre-translation.

TERMINATING MARKER

In conjunction with the translator, the terminating marker performs the following functions:
 (1) Performs busy-idle test if termination is line.
 (2) Selects idle line in PBX group.

(3) Selects idle trunk if call is for distant termination.
(4) Selects idle path through matrix.
(5) Closes pull potential and checks for the hold condition.
(6) Controls register ticketer common highway.

Since the translator contains a tree for determining the class of the called line, rather than provide a similar tree in the marker, it was more economical to expand this tree to include the line pull leads needed by this marker. On a call that terminates on a line within the office, the translator closes the apex of this tree through to the marker, to allow it to perform an idle-busy test and to complete the pull function. If the line is busy, the marker operates the 60 IPM route relay in order to connect the calling line through to an idle 60 IPM tone source. If the line is idle, the marker proceeds to the path selection stage which is described later.

The marker is arranged to hunt for an idle PBX line when a pilot number is dialed. This PBX group does not have to be consecutively numbered, and the lines may be spread through the various "A" matrix stage groups. Each line in the group except the pilot number may be dialed directly, because the lines have an appearance on the translator tree as well as on the PBX group relay in the marker. When a pilot number is dialed, the marker performs an idle-busy test on a maximum of 20 PBX lines. In the case of PBX lines with 48 kc. capabilities, an extra lead is brought from each line to the marker, to allow control of the filters in the line circuit.

The translator determines the trunk route to be used on a particular call from the dialed office code. It contains the trunk group all trunks busy relays and will perform the alternate route function. Each trunk-route relay provides access to 20 or less trunks. A correed relay chain allows hunting of an idle trunk in a minimum time interval. As two-way trunks are used throughout the network, it will be possible for all idle trunks in the group to have become busy after the translator has given the route identification to the marker. The all trunks busy leads of each trunk group are cabled to the marker, to allow it to determine if this condition exists and to request the translator for an alternate route. If an all trunks busy condition exists on a trunk route, which is a single route, or if on a retranslate condition an idle trunk is not found, the calling party is routed to a recorder tone via the 20th outlet of the "A" matrix stage. The sequence-control circuit provides a varying trunk preference to provide even traffic distribution among a group of trunks. When an idle trunk has been found, it is made busy to turn down the distant end, and the marker proceeds with the path selection phase of its operation.

The path selector section shown in FIG. 35 of the marker functions to find an idle path between the calling line or trunk circuit and the called line or trunk. As a three-stage matrix is used, it is necessary for the marker to determine the "A" stage group that the originating line is located in, and the "C" stage that contains the terminating line. A potential applied to the pull leads operates the required stage-connect relays. The marker then determines both the designated "A" and "C" stages. As the trunk stage of the office is non-blocking, failure to find an idle path on a trunk-to-trunk call indicates a trouble condition. However, on line-to-trunk calls or trunk-to-line calls, failure to find an idle path does not necessarily indicate a fault condition.

The marker sequence control section controls the remainder of the marker operation. When an idle path is found, the pull potential is applied to the matrix. When the pull potential is removed, the matrix connection is checked to determine if the matrix relays hold operated. It is necessary to perform this function for both trouble recording purposes and for avoiding a collision on the two-way trunks as it is possible for such a trunk to be seized simultaneously from both ends. In case of a collision, the connection cannot be established to the outgoing trunk and the call is routed to overflow busy tone.

Upon seizure of this circuit from the translator a relay operates to close one of the group relays 35AB1, 35AB2 or 35AB3 via one of the "PAB" leads such as 32PAB of the "A" stage matrix and one of the line group relays 35BC1, 35BC2 or 35BC3 via one of the "PBC" pull leads of the "C" stage matrix. If, as shown on FIGS. 31–35, group one of both the "A" and "C" matrix are associated with local lines, then relays 35AB1 and 35BC1 have their circuits closed. Relay 35AB1 operates and closes the first group's "C" leads of the "A" stage of the matrix to relays 35A1–35A19. Relay 35BC1 operates and closes the first groups "PBC" leads to the "C" stage of the matrix to relays 35C1–35C19. The 35A1–35A19 and the 35C1–35C19 relays associated with busy paths operate and shirt circuit the 35B1–35B19 relays associated with their respective paths. Another connect relay (not shown) operates and closes the circuits to the 35B1–35B19 relays associated with idle paths. Ground from the sequence control circuit via the chain contacts of the 35B1–35B19 relays closes one of the 35S1–35S19 relays corresponding to the first operated 35B1–35B19 relay encountered. The 35S1 relay operates, for example, locks, opens the circuit to the connect relay and effects the grounding of the number 1 "PBC" lead to the "C" stage of the line matrix via lead 35PG from the sequence and control circuit to "pull" the correeds of the line matrices corresponding to the chosen path, via a lead through the translator, the line circuit, the correed of the "C" matrix and back to lead PBC. A relay operates, via ground on lead 31PLA through the register, the "AR" matrix, the line circuit through the "A" and "B" matrices and back to lead PBC of the marker. When the "pull" is thus completed, the 35A1 and 35C1 relays, corresponding to the path chosen, operate and cause the removal of ground from lead 35PG and hence, the "PBC" lead to the "C" matrix, restores and opens the operate circuits to the 35A1–35A19 relays. Relays 35A1–35A19 restore.

On a call originated by a line, it is necessary to connect the register serving the call to the ticketer assigned to the call via a common highway to allow the required information to be given to the ticketer for billing the call. The marker maintains control of this common highway and will force the release of a ticketer or register that fails to disconnect from the common highway. In addition, the monitoring of the highway allows the marker to print a trouble record if a ticketer fails to connect to this highway, as a continuous ticketer failure would result in a loss of revenue due to lack of a ticketer on the call.

Upon completion of the ticketing function, the marker expects to be released by the register. If the release is not received, the marker will force-release the ticketer and free itself for other calls.

The marker-sequence control circuit contains the trouble recording features required to pinpoint the exact nature of a trouble condition. It is able to do this by continuously following the progress of the other section of the marker. It also furnishes information to the automatic monitor circuit, to enable it to determine what equipment is serving the call that is being monitored.

The marker common start circuit provides the transfer function required to alternate markers. It also contains timing equipment to serve as a back-up of the alarm features included in the marker sequence control circuit, so that if a marker fails to react to a start signal, the call can be transferred to the other marker. It also monitors the fusing of each marker, so that a fuse failure will automatically transfer the call to another marker.

Automatic ticketing in the broadband switching system involves some new approaches from the "rate" point of view and the circuit techniques used to meet the requirements of this new communication system. These requirements include that every call from one subscriber to another be a ticketed call; that the minimum element of time for which a call can be charged is six seconds; and that rate structure is based on distance, time and bandwidth requested. The circuitry is based on operation in a four-wire common control system with a three-stage matrix as the switchboard.

The ticketer such as 32T1–32T19 is located between the "A" stage of the matrix associated only with lines and the "B" stage of the matrix. This places a ticketer in every call that is originated at the originating office only. Inter-office calls do not require the service of a ticketer in the terminating office or in tandem office, which merely pass on the call from the originating office to the terminating office.

The ticketer is called the basic unit of the ticketing circuitry because it collects the basic information for billing the call. This includes the following:

|  | Digits |
|---|---|
| (a) Calling equipment number | 3 |
| (b) Called number | 7 or 10 |
| (c) Bandwidth requested | 1 |
| (d) Time the called station answered | 7 |
| (e) Time the call was terminated | 7 |

At the termination of each call, the ticketer passes this information on to a tabulator which is used to rearrange this information in the order best suited for processing by various business machines or manually. The rearranged call information is then passed on sequentially, to a tape perforator. This tape is then used by the business machines or tape to print machine for preparing the final billing.

In addition to collecting the information listed above, the ticketer performs other functions as a result of its location in the switchboard. As described the matrix consists of six-wire crosspoints; four are used for transmission, one for holding ("C" lead) and sixth conductor (the "EC" lead) is used for supervision. The ticketer is primarily concerned with the "C" and "EC" leads. The ticketer is seized when the terminating marker closes a path from an originating line to a terminating line or outgoing trunk. This function is performed by the "C" lead control. The supervisory functions such as stop-sending, continue to send, called station off-hook and called station on-hook are performed by the "EC" lead control.

The ticketer does not require the first two supervisory signals (stop-send and continue to send) for ticketing purposes, but merely repeats them to the associated sender when an outgoing trunk is seized. However, should a stop-sending signal persist for six to nine seconds, the ticketer releases the connection forward by opening the "C" lead forward and returns a call trunk busy tone to the calling subscriber, and then releases.

When the ticketer is first seized, the ticketer receives the calling number, class, register number, called number and bandwidth requested, from the register-sender via a common highway. Since the terminating marker closes one and only one path through the matrix at any given time, this feature is used to associate the register-sender with the ticketers selected for transfer of all information between the register-sender and ticketer.

When the called station answers, the ticketer is notified via the "EC" lead. At that instant the ticketer looks at the clock" by momentarily closing its memory to a common highway to the chronopher in the block 32CE. During this short interval (less than 100 MS.) the ticketer receives the date, time (hour, minutes and tenth of minutes) and rate (day, night or late night). While the call is in progress or any time prior to connecting to a tabulator, the ticketer is ready to receive a "month transition mark" from the chronopher.

When the call is terminated the ticketer again looks at the clock by momentarily closing another area of its memory to the chronopher common highway, and the date and time are again recorded. With the call data required for billing in storage, the ticketer calls for a tabulator and associated perforator.

The tabulators are in a common pool of common equipment 32CE, permitting any one of ten tabulators to serve any one of one hundred ticketers. The assignment of tabulators is on a one-at-a-time basis and is supervised by a common allotter circuit. When a ticketer calls for a tabulator, the common allotter circuit gives a start signal to a preselected tabulator and causes a common highway to close between the selected ticketer and tabulator and between the tabulator and the chronopher. All call data plus the ticketer identity number and register-sender number are passed from the ticketer to the tabulator. The tabulator also closes to the chronopher and obtains the current month and previous month from the chronopher 32CE.

After passing call data to the tabulator in 32CE, the ticketer clears its memory and makes itself available for another call. The tabulator spills all information obtained from the ticketer and chronopher to the perforator also in 32CE. This spill will include the month, day, and time that the call was originated and terminated in, plus calling equipment number, called number, bandwidth used, class, rate, register-sender number, ticketer number and tabulator number.

As the tabulator spills to the perforator it checks each digit for two-out-of-five code. If an error exists, an alarm is sounded and a lamp lights to indicate the trouble. The error is printed on the tape, however, at the end of the spill, the tabulator adds a mark to indicate that there is an error in the call data. In reading the tape, this mark will make it possible to sort these calls for analysis of the fault.

CONNECTOR CIRCUIT

The connector circuit is used between the "B" and "C" stages of the line matrix on those lines associated only with subscribers lines on terminating calls. Its direct functions are: on seizure, interrupted tone ringing is forwarded to the called station and ringback tone is returned to the calling party; and when the called party answers, the connector forwards a splash of direct ring tone for transmitter enabling. Seizure and connector operation are derived solely from control leads extended through the line matrix units, that is, seizure via the hold lead, and off-hook indication via the extra control lead.

While we have described above the principles of our invention in connection with specific apparatus, it is to be clearly understood that this description is made only by way of example and not as a limitation to the scope of our invention.

What is claimed is:

1. A communication switching system comprising a plurality of switching groups, each group including a plurality of crospoint switching devices arranged in coordinate matrices;

marker apparatus for controlling the establishment of connections through said crosspoint matrices;

register-sender apparatus comprising a register means and a sender means;

translating means common to said plurality of switching groups, and means for transferring information directly between the register means and the translator means;

means including the marker apparatus, responsive to a calling line service request signal for identifying the calling line and connecting it to the register means, means for transmitting the information identifying the calling line from the marker apparatus to the register means for registration therein;

means for registering in said register means the called line directory number as transmitted over the calling line and for translating, under the control of said translating means, at least a part of said directory information into corresponding equipment location information;

means including the translator for marking said equipment location information for said marker apparatus; and means including the marker apparatus for completing a connection between the calling and called lines.

2. In a communication switching systems, a first set of terminals, a second set of terminals, a plurality of switching stages arranged in tandem for selectively electrically connecting terminals of the first set with terminals of the second set, each of said stages comprising a plurality of relays arranged in a coordinate array, links interconnecting adjacent stages, marker apparatus for controlling the establishment of connections through said crosspoint matrices;

register-sender apparatus comprising a register means and a sender means;

translating means common to said plurality of switching groups, and means for transferring information directly between the register means and the translator means;

means including the marker apparatus, responsive to a calling line service request signal for identifying the calling line and connecting it to the register means, means for transmitting the information identifying the calling line from the marker apparatus to the register means for registration therein;

means for registering in said register means the called line directory number as transmitted over the calling line and for translating, under the control of said translating means, at least a part of said directory information into corresponding equipment location information;

means including the translator for marking said equipment location information for said marker apparatus;

means including the marker apparatus for applying a first marking potential to a selected terminal of the first set and a second marking potential to a selected terminal of the second set which produces a potential difference between the two selected terminals through a series path including the winding of one coordinate point relay of each of said stages, which causes said relays in the path between the selected terminals to operate and thereby establish a communication path.

3. In a communication switching system, a first set of terminals, a second set of terminals, a plurality of switching stages arranged in tandem for selectively electrically connecting terminals of the first set with terminals of the second set, each of said stages comprising a plurality of relays arranged in a coordinate array, links interconnecting adjacent stages, marker apparatus for controlling the establishment of connections via said links and through said coordinate arrays;

register-sender apparatus comprising a register means and a sender means;

translating means common to said plurality of switching stages, and means for transferring information directly between the register means and the translator means;

means including the marker apparatus, responsive to a calling line service request signal for identifying the calling line and connecting it to the register means, means for transmitting the information identifying the calling line from the marker apparatus to the register means for registration therein;

means for registering the called line directory number in said register means as transmitted over the calling line and for translating, under the control of said translating means, at least a part of said directory information into corresponding equipment location information;

means including the translator for marking said equipment location information for said marker apparatus;

means including the marker apparatus for applying a first marking potential to a selected terminal of the first set and a second marking potential to a selected terminal of the second set via said translator which produces a potential difference between the two selected terminals through a series path including the winding of one coordinate point relay of each of said stages, which causes said relays in the path between the selected terminals to operate and thereby establish a communication path.

4. In a communication switching system, a first set of terminals, a second set of terminals, a plurality of switching stages arranged in tandem for selectively electrically connecting terminals of the first set with terminals of the second set, each of said stages comprising a plurality of relays arranged in a coordinate array, links interconnecting adjacent stages, marker apparatus for controlling the establishment of connections via said links and through said coordinate arrays;

register-sender apparatus comprising a register means and a sender means;

means including the marker apparatus, responsive to a calling line service request signal for identifying the calling line and connecting it to the register means, means for transmitting the information identifying the calling line from the marker apparatus to the register means for registration therein; translating means operatively associated with said register sender apparatus, said translating means comprising:
a digit decoding means,
a tree circuit having a plurality of output terminals operated by said decoding means to connect to a corresponding one of said terminals, means for registering the called line directory number in said register means as transmitted via the calling line and for transferring a part of said number to said translating means to operate said decoding means, means in said marker apparatus for applying a first marking potential to a selected terminal of the first set and a second marking potential to a selected terminal of the second set via said connected translator terminal which produces a potential difference between the two selected terminals through a series path including the winding of one coordinate point relay of each of said stages, whereby said relays in the path between the selected terminals operate to establish a communication path.

5. In a communication switching system, a first set of terminals, a second set of terminals, a plurality of switching stages arranged in tandem for selectively electrically connecting terminals of the first set with terminals of the second set, each of said stages comprising a plurality of relays arranged in a coordinate array, links interconnecting adjacent stages, marker apparatus for controlling the establishment of connections via said links and through said coordinate arrays;

register-sender apparatus comprising a register means and a sender means;

means including the marker apparatus, responsive to a calling line service request signal for identifying the calling line and connecting it to the register means, means for transmitting the information identifying the calling line from the marker apparatus to the register means for registration therein; translating means operatively associated with said register-sender apparatus, said translating means comprising:
a three digit decoding means, a three stage relay tree circuit,
said relay tree stages operated by said decoding means to extend a circuit connection to a unique terminal of said second set for each combination of three digits received from said register,
means for registering the calling line directory number in said register means as transmitted from the calling line and for transferring a part of said number to said translating means to operate said decoding means,
means in said marker apparatus for applying a first marking potential to a selected terminal of the first set and a second marking potential to a selected terminal of the second set via said translator which produces a potential difference between the two selected terminals through a series path including the winding of one coordinate point relay of each of said stages, whereby said relays in the path between the selected terminals operate to establish a communication path.

6. In a communication switching system, a first set of terminals, a second set of terminals, a plurality of switching stages arranged in tandem for selectively electrically connecting terminals of the first set with terminals of the second set, each of said stages comprising a plurality of relays arranged in a coordinate array, links interconnecting adjacent stages, register-sender apparatus, translating means operatively associated with said register-sender apparatus,
marker apparatus for establishing a connection to said register sender upon initiation of a call via any one of said first terminals, and for controlling the establishment of connections via said links and through said coordinate arrays;
said register-sender apparatus comprising;
a first means operated to receive the dialed digits upon establishment of a connection thereto,
a second means operated to call for a translator,
a first sending means to send a portion of said digits from said first means to said translator,
means including the marker apparatus, responsive to a call line service request signal for identifying the calling line,
and means for transmitting the information identifying the calling line from the marker apparatus to the register means for registration therein;
said translating means comprising:
a three digit decoding means operated upon receipt of said portion of said digits,
a three stage relay tree circuit,
said relay tree stages operated by said decoding means to extend a circuit connection to a unique terminal of said second set for each combination of three digits received from said register,
means in said marker apparatus for applying a first marking potential to a selected terminal of the first set and a second marking potential to a selected terminal of the second set via said translator selected terminal which produces a potential difference between the two selected terminals through a series path including the winding of one coordinate point relay of each of said stages, whereby said relays in the path between the selected terminals operate to establish a communication path.

7. In a communication switching system, a first set of terminals, a second set of terminals, a plurality of switching stages arranged in tandem for selectively electrically connecting terminals of the first set with terminals of the second set, each of said stages comprising a plurality of relays arranged in a coordinate array, links interconnecting adjacent stages, register-sender apparatus, translating means operatively associated with said register-sender apparatus,
marker apparatus for establishing a connection to said register-sender upon initiation of a call via one of said first terminals, and for controlling the establishment of connections via said links and through said coordinate arrays;
said register-sender apparatus comprising;
a first means operated to receive the dialed digits upon establishment of a connection thereto,
a second means thereafter operated to call for a translator,
a first sending means to send a portion of said digits from said first means to said translator upon receipt of a plurality of said digits,
a first code storage means operated by said translator,
a second sending means operated to send a second portion of said digits from said first means to said translator,
said translating means comprising:
a three digit decoding means,
a three stage relay tree circuit,
said relay tree stages operated by said decoding means to extend a circuit connection to a unique terminal of said second set for each combination of three digits received from said register,
said register-sender first sending means effective to operate said decoding means,
means in said marker apparatus for applying a first marking potential to a selected terminal of the first set and a second marking potential to a selected terminal of the second set via said translator selected terminal which produces a potential difference between the two selected terminals through a series path including the winding of one coordinate point relay of each of said stages, whereby said relays in the path between the selected terminals operate to establish a communication path.

8. In a communication switching system, a first set of terminals, a second set of terminals, a plurality of switching stages arranged in tandem for selectively electrically connecting terminals of the first set with terminals of the second set, each of said stages comprising a plurality of relays arranged in a coordinate array, links interconnecting adjacent stages, register-sender apparatus, translating means operatively associated with said register-sender apparatus,
marker apparatus controlling the establishment of connections via said links and through said coordinate arrays;
said register-sender apparatus comprising;
a first means operated to receive the dialed digits upon establishment of a connection thereto,
a second means thereafter operated to call for a translator,
a first sending means to send a portion of said digits from said first means to said translator upon receipt of a plurality of said digits,
a first code storage means operated by said translator,
a second sending means operated to send a second portion of said digits from said first means to said translator,
means including the marker apparatus, responsive to a calling line service request signal for identifying the calling line and connecting it to the register means,
means for transmitting the information identifying the calling line from the marker apparatus to the register means for registration therein;
said translating means comprising:
a three digit decoding means,
a three stage relay tree circuit,
said relay tree stages operated by said decoding means to extend a circuit connection to a unique terminal of said second set for each combination of three digits received from said register, said register-sender first sending means effective to operate said decoding means, means in said marker apparatus for applying a first marking potential to a selected terminal of the first set and a second marking potential to a selected terminal of the second set via said translator selected terminal which produces a potential difference between the two selected terminals through a series path including the winding of one coordinate point relay of each of said stages, whereby said relays in the path between the selected terminals operate to establish a communication path.

No references cited.

KATHLEEN H. CLAFFY, *Primary Examiner.*

WILLIAM C. COOPER, *Examiner.*